US 11,151,673 B1
Oct. 19, 2021

(12) United States Patent
Wray et al.

(54) CORRELATING EDUCATION PROGRAMS AND EMPLOYMENT OBJECTIVES

(71) Applicant: AstrumU, Inc., Kirkland, WA (US)

(72) Inventors: Adam Jason Wray, Medina, WA (US); Kaj Orla Peter Pedersen, Bellevue, WA (US); Xiao Cai, Kirkland, WA (US); Feng Zhang, Bellevue, WA (US)

(73) Assignee: AstrumU, Inc., Kirkland, WA (US)

( * ) Notice: Subject to any disclaimer, the term of this patent is extended or adjusted under 35 U.S.C. 154(b) by 0 days.

(21) Appl. No.: 16/898,177

(22) Filed: Jun. 10, 2020

(51) Int. Cl.
*G06Q 10/00* (2012.01)
*G06Q 50/20* (2012.01)
*G06Q 10/10* (2012.01)
*G09B 5/12* (2006.01)

(52) U.S. Cl.
CPC ..... *G06Q 50/2057* (2013.01); *G06Q 10/1053* (2013.01); *G09B 5/12* (2013.01)

(58) Field of Classification Search
CPC ... G06Q 10/1053; G06Q 50/2057; G09B 5/12
See application file for complete search history.

(56) References Cited

U.S. PATENT DOCUMENTS

| | | | |
|---|---|---|---|
| 6,199,062 B1 | 3/2001 | Byrne et al. | |
| 8,090,725 B1 * | 1/2012 | Cranfill | G06F 16/258 707/750 |
| 8,103,679 B1 * | 1/2012 | Cranfill | G06F 16/337 707/750 |
| 8,375,026 B1 * | 2/2013 | Elliott | G06F 16/24578 707/728 |

(Continued)

FOREIGN PATENT DOCUMENTS

| | | |
|---|---|---|
| WO | 2003054727 | 7/2003 |
| WO | 2020003325 A1 | 1/2020 |

OTHER PUBLICATIONS

Kayur Patel, Steven M. Drucker, James Fogarty, Ashish Kapoor, Desney S. Tan. "Using Multiple Models to Understand Data". Proceedings of the International Joint Conference on Artificial Intelligence (IJCAI 2011) | Jul. 2011.*

(Continued)

*Primary Examiner* — Gabrielle A McCormick
(74) *Attorney, Agent, or Firm* — John W. Branch; Branch Partners PLLC

(57) ABSTRACT

Embodiments are directed to managing data correlation over a network. Student information may be provided. Position information based on potential employers may be provided. Student profiles may be generated based on translation models and the student information. The student information may be translated into unified facts included in the student profiles. Position profiles may be generated based on the translation models and the position information. The position information may be translated into other unified facts in the position profiles. The student profiles may be correlated with the position profiles based on recommendation models, the unified facts, and the other unified facts. Each student profile and position profile pair may be associated with a score based on a strength of the correlation. Reports may be provided that include each pair of the student profile. A plurality of pairs may be ordered based on the score associated with each pair.

24 Claims, 26 Drawing Sheets

(56) References Cited

U.S. PATENT DOCUMENTS

| | | | |
|---|---|---|---|
| 8,688,694 B2 | 4/2014 | Dexter | |
| 8,943,062 B2 | 1/2015 | Baumgartner et al. | |
| 9,529,863 B1* | 12/2016 | Gindin | G06Q 40/00 |
| 10,230,701 B2* | 3/2019 | Ullrich | H04L 9/3268 |
| 2002/0055870 A1* | 5/2002 | Thomas | G06Q 10/063112 |
| | | | 705/7.14 |
| 2006/0265436 A1* | 11/2006 | Edmond | H04N 21/47202 |
| 2006/0271421 A1* | 11/2006 | Steneker | G06Q 10/063112 |
| | | | 705/7.14 |
| 2007/0106811 A1* | 5/2007 | Ryman | H04L 29/06027 |
| | | | 709/230 |
| 2008/0155588 A1* | 6/2008 | Roberts | G06Q 30/0251 |
| | | | 725/34 |
| 2010/0057659 A1 | 3/2010 | Phelon et al. | |
| 2011/0238591 A1* | 9/2011 | Kerr | G06Q 10/1053 |
| | | | 705/321 |
| 2013/0275446 A1 | 10/2013 | Jain et al. | |
| 2014/0089219 A1 | 3/2014 | Mathews | |
| 2015/0088793 A1 | 3/2015 | Burgess et al. | |
| 2015/0317754 A1* | 11/2015 | Goel | G06Q 10/1053 |
| | | | 705/319 |
| 2016/0352760 A1* | 12/2016 | Mrkos | H04L 67/303 |
| 2016/0379170 A1 | 12/2016 | Pande | |
| 2017/0024701 A1* | 1/2017 | Tang | G06F 16/9535 |
| 2018/0039946 A1* | 2/2018 | Bolte | G06Q 50/2057 |
| 2018/0293327 A1 | 10/2018 | Miller et al. | |
| 2018/0300755 A1* | 10/2018 | Rohilla | G06Q 30/0254 |
| 2019/0108217 A1* | 4/2019 | Chen | G06F 40/35 |
| 2019/0122161 A1 | 4/2019 | Cicio, Jr. | |
| 2019/0151758 A1 | 5/2019 | Anglin et al. | |
| 2019/0180098 A1* | 6/2019 | Carpenter | G06K 9/00483 |
| 2019/0279159 A1* | 9/2019 | Cleaver | G06F 8/30 |

OTHER PUBLICATIONS

Scott Ludwigsen. "What is Localiztion, And When Do You Need It?" Feb. 21, 2018 retreived at: https://blog.languageline.com/what-is-localization.*

Office Communication for U.S. Appl. No. 16/691,479 dated Mar. 2, 2020, pp. 1-22.

Office Communication for U.S. Appl. No. 16/691,479 dated Jun. 25, 2020, pp. 1-26.

Office Communication for U.S. Appl. No. 17/107,760 dated Feb. 8, 2021, pp. 1-35.

Office Communication for U.S. Appl. No. 16/691,479 dated Sep. 11, 2020, pp. 1-6.

Office Communication for U.S. Appl. No. 16/691,479 dated Feb. 19, 2021, pp. 1-26.

Office Communication for U.S. Appl. No. 17/107,760 dated May 20, 2021 pp. 1-8.

* cited by examiner

CORRELATING EDUCATION PROGRAMS AND EMPLOYMENT OBJECTIVES

TECHNICAL FIELD

The present invention relates generally to data management, and more particularly, but not exclusively, to employing data to correlate persons and organizations.

BACKGROUND

Identifying persons that make good employees has long been a goal of organizations. And, in today's highly competitive global market, finding and keeping great employees is becoming more challenging. Conventionally, organizations may be forced to rely on narrow or limited criteria derived from anecdotal evidence, personal preferences, gut feelings, or the like, rather than evidence based analytics to determine if a person may be a good employee candidate. Similarly, educational institutions may want to provide educational opportunities that provide their students desirable employment opportunities. Accordingly, in some cases, educational institutions may design offerings based on their perception of the needs of desirable employers. But, not unlike employers, educational institutions may have limited access to evidence based analytics to help them design their offerings. Further, students may seek out educational institutions that to prepare them for careers with desirable employers. However, similar to employers and educational institutions, students (or potential students) have limited access to evidence based analytics to help them select educational institutions or employers. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
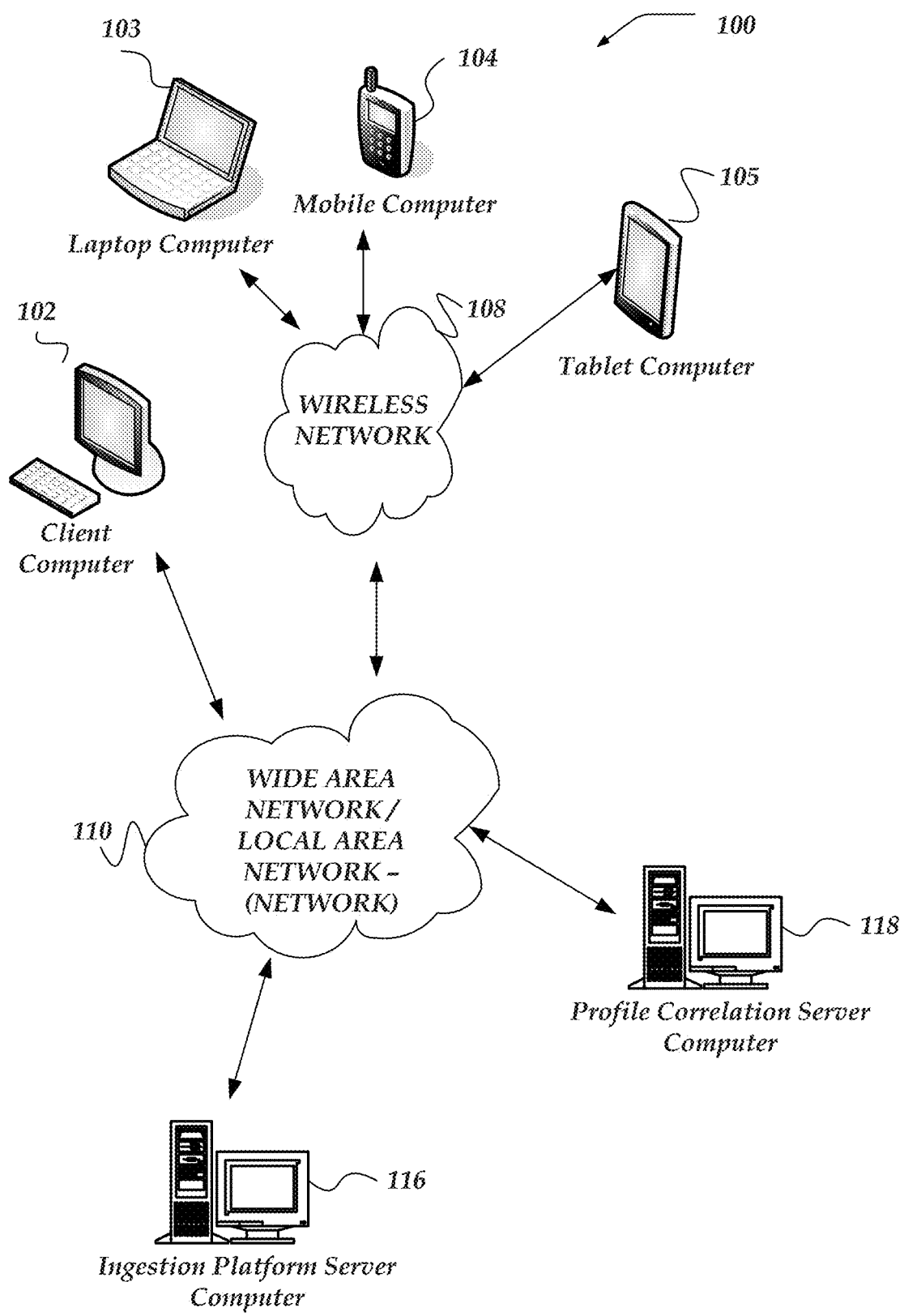
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a data ingestion platform.

As used herein the term "integrated data source" refers to a data source that enables closer coordination with a data ingestion platform. In some cases, the data provided by an integrated data source may be formatted or otherwise configured to facilitate its use by a data ingestion platform.

As used herein the term "raw data" refers to data provided by a raw data source. Raw data may include structured or unstructured data, documents, streams, or the like. Provided data may be considered as raw because the data source may provide the data in a form or format "as-is."

As used herein the term "integrated data" refers to data provided by an integrated data source. Similar to raw data, integrated data may include structured or unstructured data, documents, streams, or the like. However, the provided data may be considered integrated data rather than raw because the data source may be arranged or configured to provide the data in a form or format that is consistent with one or more requirements of a data ingestion platform. Also, in some cases, integrated data may include information presumed to represent truths, such as, government or standard based codes, demographic information, or the like.

As used herein the term "categorization model" refers one or more data structures that encapsulate the data, rules, machine learning models, machine learning classifiers, or instructions that may be employed to associate raw data with a raw data category. Categorization models may include various components, such as, one or more machine learning based classifiers, heuristics, rules, pattern matching, conditions, or the like, that may be employed to assign data to a category. In some cases, categorization models may provide confidence scores that represent the quality of the categorizations. In some cases, categorization engines may employ one or more categorization models to categorize incoming raw data assets. For example, category models may be employed to determine if a document is a student transcript, resume, job listing, job description, course description, course catalog, or the like.

As used herein the term "translation model" refers one or more data structures that encapsulate the data, rules, machine learning models, machine learning classifiers, or instructions that may be employed to match or map information included in raw data assets to a unified schema. Translation models may include various components, such as, one or more machine learning based classifiers, heuristics, rules, pattern matching, conditions, or the like, that may be employed to match or map information in raw data assets to a unified schema. In some cases, translation models may provide confidence scores that represent the quality of the matches. Different translation models may be provided for different categories of raw data assets. For example, one translation model may be directed to translating information included in course descriptions while another translation model may be directed to translating information included in resumes. Likewise, in some cases, one translation model may be arranged to match information for more than one category of raw data. Also, in some cases, more than one translation model may be arranged to match the same category of data.

As used herein the term "recommendation model" refers one or more data structures that encapsulate the data, rules, machine learning models, machine learning classifiers, or instructions that may be employed to match or correlate profiles, including matching student profiles with position profiles. Recommendation models may include various components, such as, one or more machine learning based classifiers, heuristics, rules, pattern matching, conditions, or the like, that may be employed to match student profile with position profiles. In some cases, recommendation models may provide confidence scores that represent the quality of the matches. Different recommendation models may be provided for different categories of profile or match queries.

As used herein the term "profile model" refers one or more data structures that encapsulate the data, rules, or instructions that may be employed to generate profiles based on the ingested data. For example, a profile model may include rules or instructions for generating a student profile from ingested data.

As used herein the term "unified schema" refers a data schema that may be used to define the entities, fields, or attributes of a common data store. Information included in raw data may be matched to entities, fields, or attributes defined by a unified schema.

As used herein the term "unified fact" refers to one or more data structures or records that include values that conform to a unified schema. Information included in raw data may be mapped to unified facts that conform to a unified schema.

As used herein the term "subject" refers to an entity, such as, a user, student, employee, organization, person, or the like. Various information included in some raw data may be associated with one or more subjects.

As used herein the term "subject fact" refers to one or more data structures, values, or records that represent unified facts that are owned or associated with a subject. Subject facts may often be information that may be considered personally identifiable information. For example, ingested information that is associated with an individual student, such as, name, address, course of study, transcripts, grades, or the like, may be considered subject facts.

As used herein the term "non-subject fact" refers to one or more data structures, values, or records that represent unified facts that are not considered sensitive or otherwise directly associated with a subject. In some cases, non-subject facts may be derived or computed from subject facts. For example, federal job codes may be considered non-subject facts. Also, for example, aggregate data, such as, average student body grade point average, course of study distribution information, or the like, may be considered non-subject data.

As used herein the term "profile" refers to one or more data structures or records gathered together to provide information about a subject. For example, a student profile may include various subject facts or non-subject facts that are relevant to a particular student.

As used herein the term "selection score" refers to a score that may be employed to select a unified fact value from among different results produced by different translation models and the same raw data. In some cases, selection scores may be generated based on the confidence score of a given result and a reputation score of the translation model that produced the results.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data correlation over a network, using one or more network computers to execute actions.

In one or more of the various embodiments, an ingestion engine may be arranged to performs actions, including, providing student information based on educational activity of one or more students such that one or more portions of the student information may be associated with one or more education institutions; and providing position information based on one or more potential employers such that the position information includes a description of one or more positions associated with the one or more employers.

In one or more of the various embodiments, providing the student information may include providing one or more of one or more student transcripts, one or more student resumes, feedback from the one or more students, or the like.

In one or more of the various embodiments, providing the position information may include, providing employment information that may include includes projected growth of a type of position associated with the one or more positions such that the employment information may be provided by one or more of public sources, or non-public sources.

In one or more of the various embodiments, a translation engine may be arranged to performs actions, including: generating one or more student profiles based on one or more translation models and the student information such that the student information may be translated into one or more unified facts that may be included in the one or more student profiles; and generating one or more position profiles based on the one or more translation models and the position information such that the position information may be translated into one or more other unified facts that may be included in the one or more position profiles.

In one or more of the various embodiments, generating the one or more position profiles may include generating a portion of the one or more other unified facts based on one or more natural language phrase fragments included in the position information such that the portion of the one or more other unified facts are associated with skills associated with the one or more positions.

In one or more of the various embodiments, a recommendation engine may be arranged to that perform actions, including: correlating the one or more student profiles with the one or more position profiles based on one or more recommendation models, the one or more unified facts, and the one or more other unified facts such that each pair of a student profile that correlates with a position profile may be associated with a score based on a strength of the correlation between the pair; and providing one or more reports that include each pair of the student profile correlated with the position profile such that a plurality of pairs may be ordered based on the score associated with each pair.

In one or more of the various embodiments, additional student information associated with the one or more students may be provided. In some embodiments, the one or more student profiles may be updated based on the additional student information. And, in some embodiments, correlating the one or more updated student profiles and the one or more position profiles based on one or more recommendation models.

In one or more of the various embodiments, generating a snapshot of the one or more student profiles such that the snapshot may be stored in a data store. In some embodiments, the one or more student profiles may be monitored. In some embodiments, one or more updated student profiles may be determined based on the monitoring. And, in some embodiments, another snapshot may be generated based on the one or more updated student profiles.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, ingestion platform server computer 116, profile correlation server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, ingestion platform server computer 116, profile correlation server computer 118, or other computers.

Client computers 102-105 may further be configured to include a client application that enables an end-user to log into an end-user account that may be managed by another computer, such as ingestion platform server computer 116, profile correlation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by ingestion platform server computer 116, profile correlation server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, ingestion platform server computer 116, profile correlation server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of ingestion platform server computer 116 or profile correlation server computer 118 are described in more detail below in conjunction with FIG. 3. Although FIG. 1 illustrates ingestion platform server computer 116, profile correlation server computer 118, or the like, each as a single computer, the innovations or embodiments are not so limited. For example, one or more functions of ingestion platform server computer 116, profile correlation server computer 118, or the like, may be distributed across one or more distinct network computers. Moreover, in one or more embodiments, ingestion platform server computer 116 or profile correlation server computer 118 may be implemented using a plurality of network computers. Further, in one or more of the various embodiments, ingestion platform server computer 116, profile correlation server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
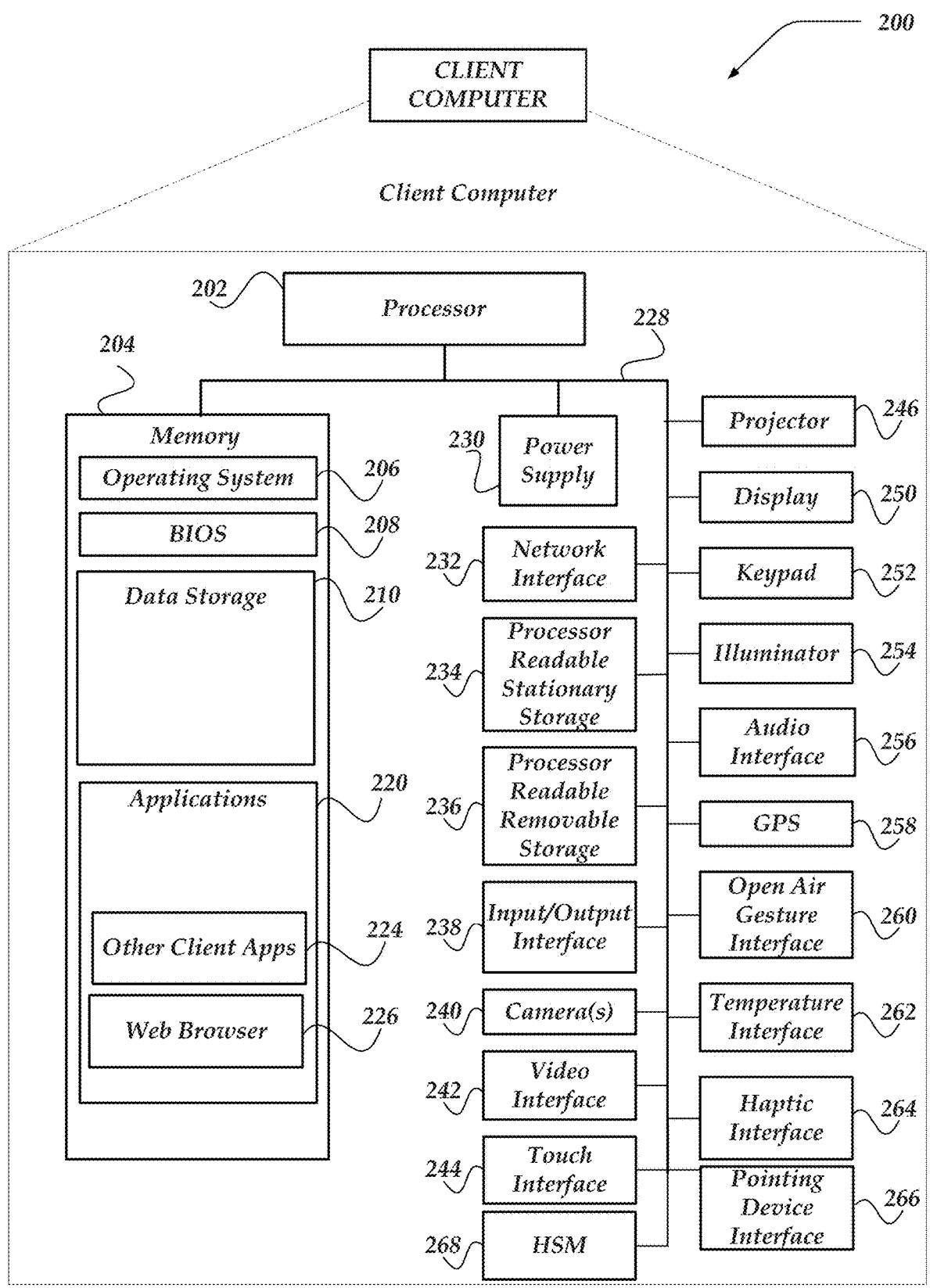
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
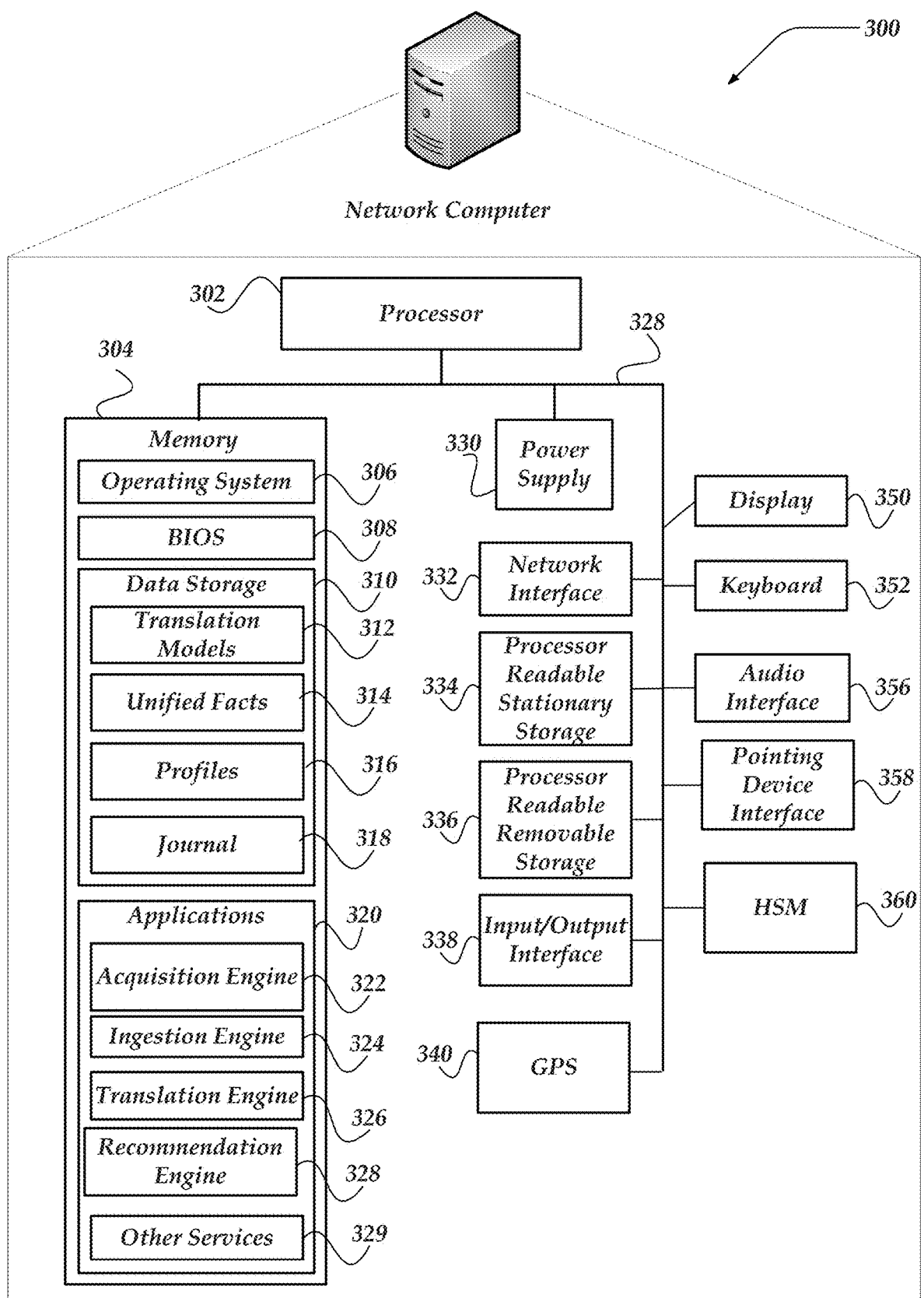
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as ingestion platform server computer 116, profile correlation server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, acquisition engine 322, ingestion engine 324, translation engine 326, recommendation engine 328, other services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, translation models 312, unified facts 314, profiles 316, journal 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include acquisition engine 322, ingestion engine 324, translation engine 326, recommendation engine 328, other services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, acquisition engine 322, ingestion engine 324, translation engine 326, recommendation engine 328, other services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to acquisition engine 322, ingestion engine 324, translation engine 326, recommendation engine 328, other services 329, or the like, may be provisioned and de-commissioned automatically.

Also, in one or more of the various embodiments, acquisition engine 322, ingestion engine 324, translation engine 326, recommendation engine 328, other services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture for Data Ingestion

Figure 4:
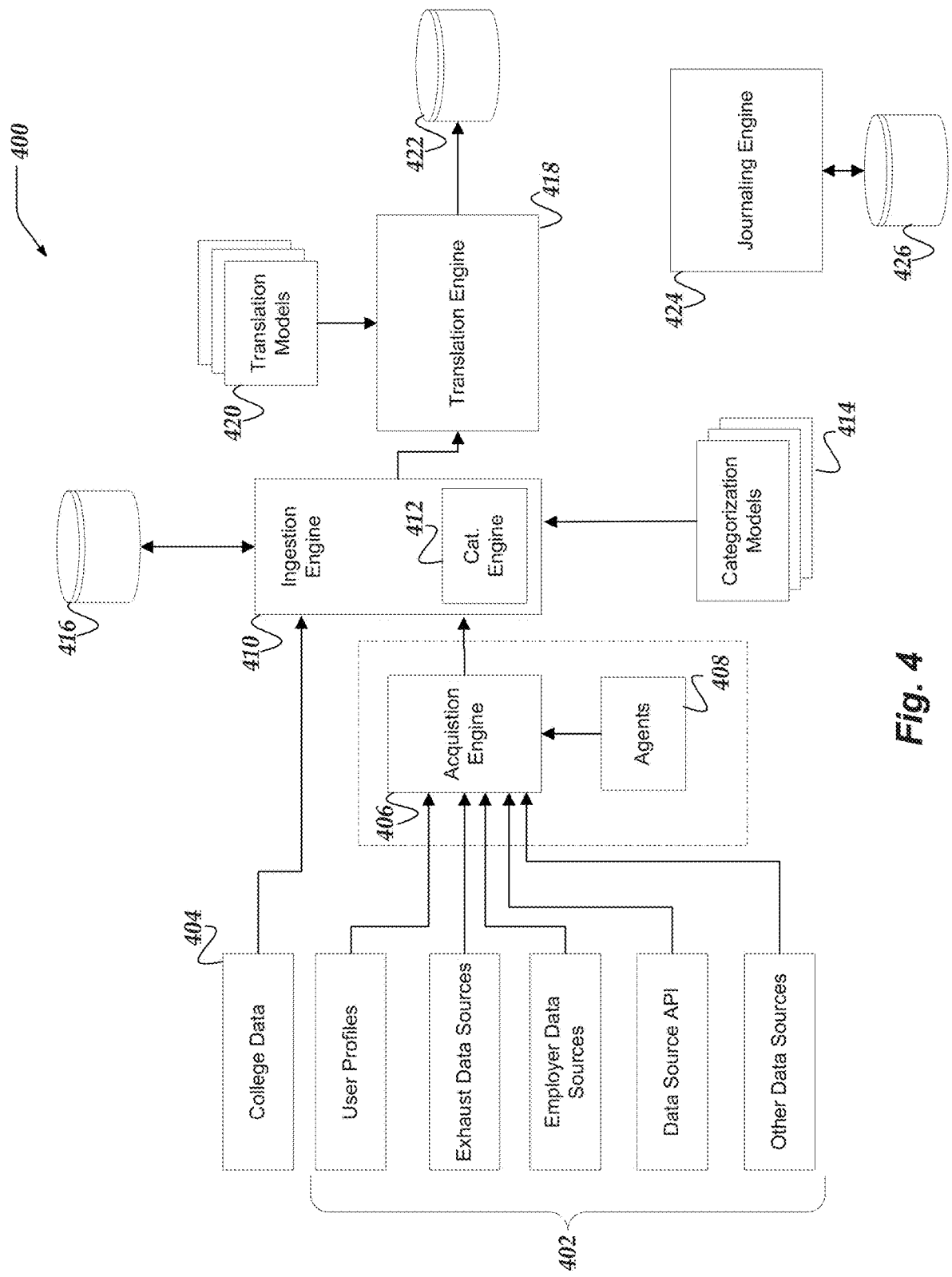
FIG. 4 illustrates a logical architecture of system for correlating education programs and employment objectives in accordance with one or more of the various embodiments.

FIG. 4 illustrates a logical architecture of system 400 for data ingestion platform in accordance with one or more of the various embodiments. In one or more of the various embodiments, system 400 may include several data sources, such as, raw data sources 402, integrated data sources 404, or the like. Also, in some embodiments, system 400 may include one or more acquisition engines, such as, acquisition engine 406, that may be arranged to employ one or more agents 408 to acquire raw data or integrated data from one or more the data sources.

In one or more of the various embodiments, system 400 may be arranged to include one or more ingestion engines, such as, ingestion engine 410. In some embodiments, system 400 may be arranged to include one or more categorization engines, such as, categorization engine 412 that may employ one or more categorization models, such as, categorization models 414 to categorize raw data assets.

In one or more of the various embodiments, system 400 may be arranged to include one or more translation engines, such as, translation engine 418 that may be arranged to employ one or more translation models, such as, translation models 420 to match information included in raw data to a unified schema.

In one or more of the various embodiments, system 400 may be arranged to include one or more data stores, such as: data store 416 for storing some or all raw data assets; data store 422 for storing unified facts, profiles, or the like.

In one or more of the various embodiments, system 400 may be arranged to include one or more journal engines, such as journal engine 424. In some embodiments, journal engines, such as, journal engine 424 may employ one or more journal data stores, such as, journal data store 426.

Advances in so-called big data computing has enabled relatively unbounded data scale or processing scale, enabling very large data sets to be acquired, stored, or processed. Further, the application of machine-learning techniques to very large data has enabled many advances across several industries. Machine learning, as well as other analytic data processing, have been used to provide useful inferences, predictions, or insights based on analyzing large data sets. However, useful analytic methods often require large well-defined data sets. Thus, in some cases, while there may be a large amount of data available, in some problem domains, the data required to provide useful inferences or predictions may be scattered across many sources or in many formats. In addition, often organizations or data heavy problems that may be nominally considered to be in the same domain may arrange their data differently, using different schemas, concepts, definitions, coding, or the like.

Also, in some cases, data that may be useful for analytics may be available via unconventional locations that may be difficult for computers to process rather than being stored in databases, document management systems, networked/online repositories, or the like. For example, in some cases, useful information may be available on public facing websites or social media platforms.

Also, in some cases, data that may be useful for analytics may originally be intended for human consumption rather than machine consumption. In some cases, data provided by websites, publications, reports, or the like, may include language that may be difficult for machines to automatically process. For example, public facing websites may include content that includes local idioms, colloquialisms, style-elements, or the like, that may vary across regions or organizations, even if they may be directed to the same problem domain.

Accordingly, in some cases, for some problem domains, the value of big-data analytics may be diminished because the necessary data may be stored in disparate data sources that may be difficult or expensive for conventional data ingestion systems to merge into a usable data set.

While, in some cases, conventional data ingestion systems may be carefully configured and tuned to automatically ingest data from a variety of sources, including new or additional data sources may be prohibitively expensive because it may require additional technical resources to manually adapt to the new formats, protocols, or conventions that may be introduced by the new or additional data sources.

The problems or difficulties associated with large scale data ingestion across multiple sources may be further exacerbated if data from different domains may be required for analytics. Accordingly, to the extent that merging data from different sources in the same domain may be difficult, merging data from two or more domains, even related domains, may be even more difficult. Thus, in some cases, data ingestion may become an intractable problem for conventional data ingestion systems as disparate data source or disparate domains are introduced.

Accordingly, in one or more of the various embodiments, the innovations disclosed herein may improve the ability of data ingestion platforms, such as, data ingestion platform 400 to provide data for big-data analytics. In one or more of the various embodiments, data ingestion platform 400 may be arranged to acquire raw data from a variety of raw data sources, such as, raw data sources 402 or one or more integrated data sources, such as, integrated data source 404.

In one or more of the various embodiments, data ingestion platform 400 may include an acquisition engine, such as, acquisition engine 406. In some embodiments, acquisition engines may be arranged to employ one or more acquisition agents, such as, acquisition agents 408, to acquire raw data from data sources, such as, data sources 402.

In one or more of the various embodiments, acquisition agents may be arranged to include or define rules or instructions that may be executed to acquire data from one or more data sources. In some embodiments, acquisition agents may be arranged to collect raw data from private or public data sources. In some embodiments, acquisition agents may be arranged to apply credentials, communication protocols, filters, site navigation (e.g., crawlers, robots, or the like), or the like, to collect raw data from one or more data sources. For example, in some embodiments, different acquisition agents may be arranged to employ TCP/IP, UDP, FTP, HTTP, or the like, to interface with data sources to acquire raw data. In some embodiments, individual acquisition agents may be arranged to employ one or more recipes or scripts that enable raw data to be collected from a given data source. For example, if the data source is a web site, its associated acquisition agent may include a machine driven web-agent component that executes HTTP requests that may mimic a person operating web browser to obtain the raw data associated provided by the data source.

In one or more of the various embodiments, acquisition agents may be arranged to execute API calls or transactions configured for a particular data source. Likewise, in some embodiments, acquisition agents may be arranged to perform actions to provide the security credentials that enable access to data sources. In some embodiments, acquisition agents may be configured to store or reference the credentials for a particular data source, such as, usernames, password, key phrases, cryptographic certificates, or the like.

In one or more of the various embodiments, if two or more data sources have common features or behavior, an acquisition agent may be employed for the two or more different data sources.

In one or more of the various embodiments, acquisition agents may be arranged to require little if any configuration for a particular data source. Also, in one or more of the various embodiments, acquisition agents may be arranged to acquire raw data that may be provided to an ingestion engine. Accordingly, in one or more of the various embodiments, acquisition agents or the configuration of individual acquisition agents may operate on data sources independent of the peculiarity of the contents among different data sources. Further, in one or more of the various embodiments, because acquisition agents may be arranged to pass raw data to ingestion engines absent contextual processing, changes in the content may not require modifications in the acquisition agents.

In one or more of the various embodiments, employing acquisition agents as disclosed herein may be advantageous because they may be relatively lightweight or simple to configure because they do not attempt to interpret or analyze the context or content of raw data collected from data sources. For example, an acquisition agent arranged to crawl a public facing website does not require modification if the content of the website is updated or rearranged. This feature may at least reduce costly integration or customization each time a data source owner modifies the content.

Also, in one or more of the various embodiments, additional acquisition agents may be added to a data ingestion platform without impacting existing acquisition agents or existing interfaces with other data sources.

In one or more of the various embodiments, if an acquisition engine, such as, acquisition engine 406 collects raw data from a data source, the raw data may be provided to an ingestion engine, such as, ingestion engine 410.

In one or more of the various embodiments, in some cases, one or more data sources may be considered integrated data sources, such as, integrated data source 404. In some embodiments, integrated data sources may be data sources that may be closely integrated with a data ingestion platform such that acquisition agents may be not be required. For example, one or more partner organizations may closely share data by exposing services or tools that enable direct integration with a data ingestion platform rather than relying on acquisition agents. However, in some embodiments, data ingestion platforms may employ specialized acquisition agents to collect data from integrated data sources.

Further, in some embodiments, one or more integrated data sources may be considered to provide integrated data to data ingestion platforms rather than providing raw data. In one or more of the various embodiments, integrated data may be data that does not require the same amount of parsing or translation effort as raw data. In some embodiments, integrated data provided from an integrated data source may conform to a unified schema such that the integrated data requires little or no processing before it may be added to a unified fact database. In some embodiments, an integrated data source may provide true facts that may be stored directly into a unified fact database, such as, codes provided by a regulatory body. For example, for some embodiments, an integrated data source may provide lists of postal codes, tax codes, agency codes, or the like. For example, for some embodiments, a data source that provides the codes for the US Department of Labor Standard Occupation Classification System may be considered an integrated data source that provides integrated data.

In one or more of the various embodiments, in some cases, raw data provided to an ingestion engine may be provided with little context. Accordingly, in some embodiments, an ingestion engine may be arranged to attempt to categorize the raw data before attempting to ingest it. Categorization may be based on one or more of format classification, content/context classification, or the like. For example, if the raw data is a document, it may be advantageous to categorize the raw document based on the format of the document. For example, in some embodiments, raw data comprised of a MS Word document may require different processing than raw data comprised of PDF documents. Note, in some embodiments, an acquisition engine may be arranged to perform some or all of the format categorization. For example, acquisition engines may provide acquisition agents that may be directed to converting different document formats into other formats, such as, plain text before the raw data is provided to the ingestion engine. In some embodiments, this may include executing one or more complex processes such as optical character recognition, language translation, or the like. In some embodiments, format categorization or data conversion processing may include employing one or more external or third-party services to perform some or all of the processing.

In one or more of the various embodiments, categorization may include determining the category of the content. In one or more of the various embodiments, the particular categories may be determined based on the problem domain. In one or more of the various embodiments, preliminary content categorization may enable downstream processing to be focused on particular categories. For example, translation models employed to map information in raw data to unified facts may be directed to particular or limited content categories enabling translation models to be tuned, trained, or evaluated with respect to one or more categories of content rather than all content. In some embodiments, this may enable translation models for individual content categories to be updated or replaced without impacting translation models for other content categories.

Also, in one or more of the various embodiments, pre-match categorization may enable different types of translation models to selectively be employed for different categories. For example, it may be more effective to process some categories of raw data using translation models that employ more heuristic techniques rather than employing translation models that use more machine-learning techniques.

Accordingly, in one or more of the various embodiments, data ingestion platforms may include one or more categorization engines, such as, categorization engine 412. In some embodiments, categorization engines may be arranged to employ one or more categorization models that encapsulate the rules, instructions, patterns, conditions, machine-learning classifiers, or the like, that may be used to categorize raw data.

In one or more of the various embodiments, if raw data may be categorized, it may be provided to a translation engine, such as, translation engine 418. In one or more of the various embodiments, translation engines may be arranged to employ one or more translation models to generate unified facts from the information included in the raw data. In one or more of the various embodiments, translation engines may employ one or more translation models that interpret some or all of the raw data to extract unified facts from the raw data.

In one or more of the various embodiments, translation models may be arranged to provide unified facts that conform to a unified schema. In one or more of the various embodiments, each unified fact may be associated with a field, attribute, class, or object defined in the unified schema. Also, in some embodiments, translation models may be arranged to provide a confidence score that indicates the quality of match from the point of view of an individual translation model. Accordingly, in one or more of the various embodiments, translation models may be arranged to provide results that include: the unified fact value; the field name, class name, object name, or the like, as per the unified schema; the confidence score representing the quality of the match; or the like.

In some embodiments, two or more translation models may be directed to the same category of content. Accordingly, in some embodiments, each translation model may be associated with a reputation score that may be employed to select among differing results provided by different translation models for the same raw data. Further, in some embodiments, a reputation score associated with a translation model may be employed to weight confidence scores or generate selection scores.

In one or more of the various embodiments, reputation scores for translation models may be determined in part based on feedback or telemetry associated with users or administrators.

In one or more of the various embodiments, if unified facts may be generated from the raw data, the unified facts may be stored in a unified fact database, such as, unified fact database 422. In some embodiments, data ingestion platforms may be arranged to require unified facts to be associated with a confidence score that exceeds a defined threshold value before storing them in the unified fact database.

In one or more of the various embodiments, raw data that results in unified facts with insufficient confidence scores may be flagged for review by an administrator. Accordingly, the administrators may review the results, raw data, translation models, or the like, to determine the reasons for the low confidence score result.

Further, in one or more of the various embodiments, unified facts generated by translation engines may comprise subject facts and non-subject facts. In some embodiments, subject facts may be facts directly associated with a subject. In some embodiments, subjects may include persons or organizations. Thus, in some embodiments, subject facts may include personal, sensitive, or confidential information associated with a subject. For example, if a subject is a student, subject facts may include name, address, age, resume information, course grades, employment information, or the like. Accordingly, in one or more of the various embodiments, one or more translation models may be arranged to determine if a unified fact may be a subject fact. Also, in one or more of the various embodiments, subject facts may be associated with a subject identifier that corresponds to the subject.

In one or more of the various embodiments, data ingestion platforms may be arranged to trace the activity associated with subject facts such that subject facts associated with given subject may be definitively removed from the data ingestion platform upon request.

Accordingly, in one or more of the various embodiments, data ingestion platforms may be arranged to include one or more journaling engines, such as, journaling engine 424. In some embodiments, journaling engines may be arranged to generate journal records for each action associated with subject facts. In one or more of the various embodiments, journal records may be stored in one or more journal data stores (e.g., journals), such as, journal data store 426. Thus, in the response to a removal request, or the like, the journal records may be employed to determine how to remove the removable subject facts from the data ingestion platform.

Figure 5:
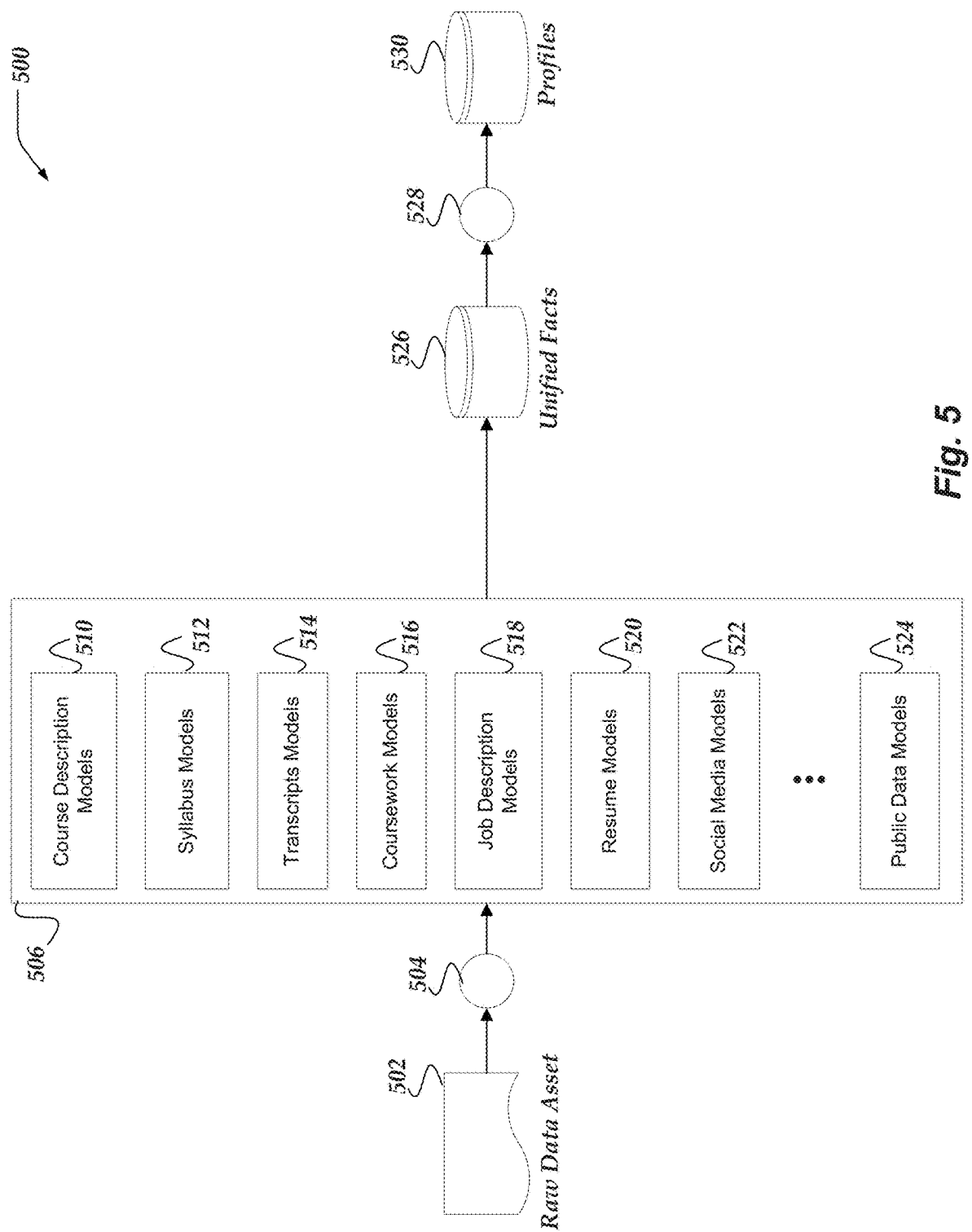
FIG. 5 illustrates a logical schematic of a system for correlating education programs and employment objectives in accordance with one or more of the various embodiments.

FIG. 5 illustrates a logical schematic of system 500 for data ingestion platform in accordance with one or more of the various embodiments. In some embodiments, system 500 may be arranged to receive a raw data asset, such as, raw data asset 502. In some embodiments, raw data asset 502 may be categorized or otherwise pre-processed via one or more components, represented by component 504. For example, in some embodiments, component 504 may be a categorization engine, or the like.

In one or more of the various embodiments, raw data asset 502 may be provided to a translation engine, such as, translation engine 506. Accordingly, in one or more of the various embodiments, translation engine 506 may be arranged to employ one or more translation models that may be arranged to match some or all of information included in raw data asset 502 to one or more unified facts.

In one or more of the various embodiments, processes performed by components 504 may include categorizing raw data asset 502 and then based on the result of the categorization, one or more translation models arranged for interpreting the category of data that has been associated with raw data asset 502.

In one or more of the various embodiments, translation models may be arranged to process data assets associated with one or more categories that may represent a specific topics or information classes. In this example, raw data asset 502 may be associated with students, schools, employers, or the like. Thus, in this example, translation models may be targeted to different types of raw data assets. Accordingly, in one or more of the various embodiments, translation models may include course description models 510, syllabus models 512, student transcript models 514, coursework models 516, job description models 518, resume models 520, social media models 522, public data models 524, or the like.

Accordingly, in one or more of the various embodiments, translation engine 506 may execute one or more translation operations based on heuristics, machine learning classifiers, machine learning models, rules, instructions, or the like, defined or referenced by the one or more translation models. In some embodiments, translation operations may include identifying information included in the raw data that can be matched to a unified schema to provide unified facts.

In one or more of the various embodiments, unified facts generated by the translation engine may be stored in a unified fact data store, such as, data store 526.

In one or more of the various embodiments, the unified facts may be employed to generate various profiles, such as, student profiles, employer profiles, school profiles, or the like, that may be used for providing reports (interactive or otherwise) to users of a data ingestion system.

In one or more of the various embodiments, profiles may be comprised of one or more unified facts that may include one or more subject facts or one or more non-subject facts. In some embodiments, a profile engine may be arranged to employ profile models to determine the contents of a profile. In some embodiments, profiles may be arranged to encapsulate the rules, heuristics, machine-learning classifiers, or the like, that may be employed to generate profiles based on one or more unified facts.

Figure 6:
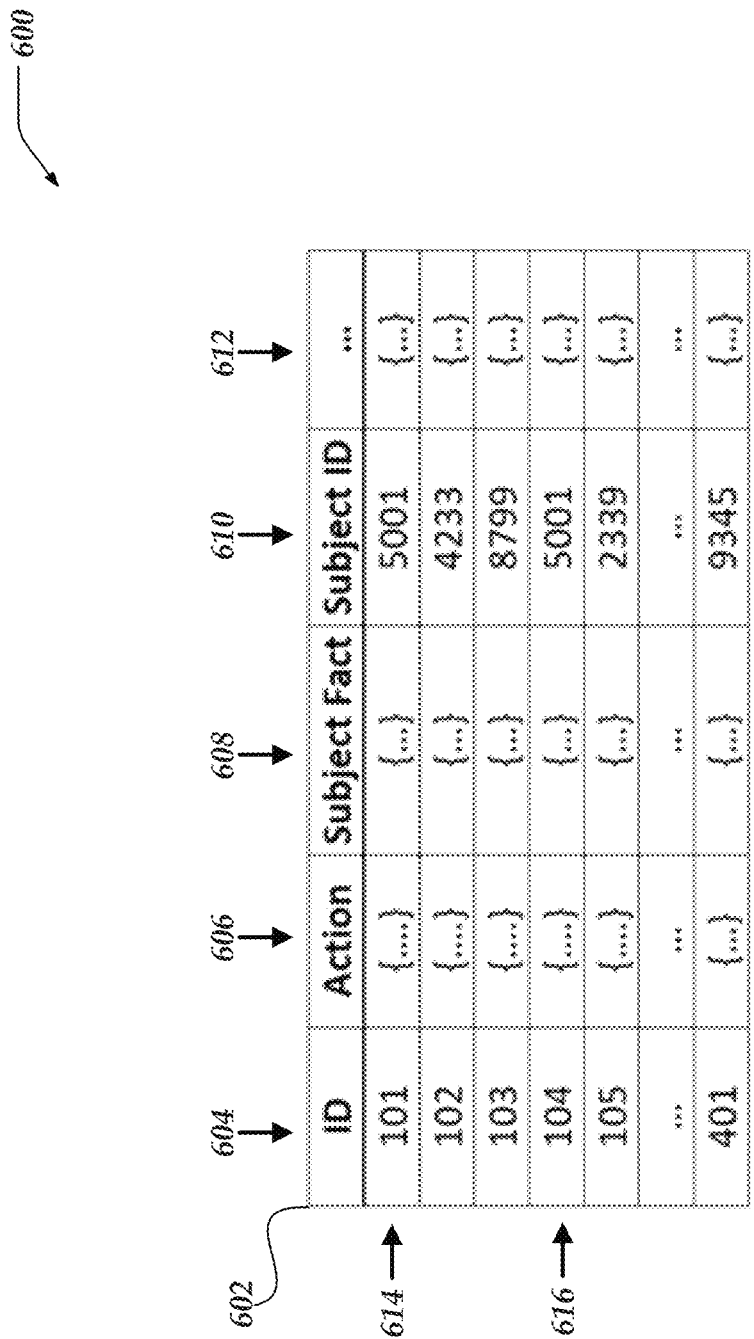
FIG. 6 illustrates a logical representation of a journal for a data ingestion platform in accordance with one or more of the various embodiments.

FIG. 6 illustrates a logical representation of journal 600 for a data ingestion platform in accordance with one or more of the various embodiments. In one or more of the various embodiments, in this example, for brevity or clarity, journal 600 is represented using a tabular format. However, one of ordinary skill in the art will appreciate that journal 600 may be implemented using one or more conventional or custom data structures or formats, include database tables, XML, files, CSV files, unstructured text records, graph databases, or the like, or combination thereof, without departing from the disclosed innovations. Similarly, in one or more of the various embodiments, one of ordinary skill in the art will appreciate that the disclosed innovations anticipate journals may include different columns/attributes that may be in different order. Further, in some embodiments, one or more of the columns of journal 600 may be combined or omitted as long as a capability to associate subject facts actions with subject facts and subject identifiers.

In one or more of the various embodiments, table 602 may be arranged to store one or more journal records that include various information about actions that may have been performed on subject facts. In this example, column 604 may be employed for storing journal record identifiers, column 606 may be employed for storing action information, column 608, may be employed for storing subject fact information, column 610 may be employed for storing subject identifiers, and one or more other columns, such as, column 612 may be employed for storing other information.

In one or more of the various embodiments, action information stored in column 606 may include tags, codes, narratives, or the like, that represent one or more actions associated with a subject fact. In some embodiments, action information may include serialized data structures, such as, JSON objects, or the like. For example, in some embodiments, action information, such as, "ADDED TO UNIFIED FACT DATABASE", or the like, may be used indicated that a subject fact has been stored in a unified fact database. Other action values may include values that represent other actions on subject facts, such as, deleting, moving, linking, associating, de-associating, editing, or the like.

In one or more of the various embodiments, a journal engine may be arranged to employ configuration information to determine the particular coding, or representations that may be used for storing actions in journal 600.

In one or more of the various embodiments, column 608 may be employed to store information about the subject fact associated with the record. In some embodiments, the subject fact information may include a reference to another data store or record that includes the subject fact information. In some embodiments, the subject fact information may vary depending on the action information or the type of subject fact (as defined via the unified schema). For example, if the action indicates a new subject fact has been added to a unified fact database, the subject fact information may include (or reference) the initial value of the subject fact. However, in one or more of the various embodiments, subject fact information may include other information, including meta-data describing the source of the subject fact, a confidence score associated with the translation model used to extract the subject fact from raw data, the age of the data, the age of the match, other timestamp information, or the like.

In one or more of the various embodiments, column 610 may store a value that may be used to identify the subject associated with the subject fact. In some embodiments, subject identifiers may be anonymized values rather than values that may be used to identify a person subject. In some embodiments, the subject identifier may be unique within the scope of the data ingestion system to enable subject facts associated with a subject to unambiguously determined.

In one or more of the various embodiments, column 612 may be employed to store other journal information, such as, identifiers that may indicate the user that performed the action, other timestamps, or the like.

In this example, for some embodiments, record 614, represents the occurrence of an activity associated with a subject fact owned or associated with a subject identified as subject 5001. Likewise, record 616, represents other activity that may be associated with the same or other subject fact that is also owned or associated with the same subject.

In one or more of the various embodiments, each time an ingestion platform performs an action associated with a subject fact, a journal record that memorializes the occurrence may be generated and stored in the journal. Accordingly, in some embodiments, the ingestion platform may be enabled to definitively trace the locations or associations of subject facts. In some embodiments, this may enable the data ingestion platform to ensure that if subject facts need to be deleted from the data ingestion platform, all copies, links, or references to the subject facts being removed may be definitively determined.

Accordingly, in one or more of the various embodiments, if a subject needs to be removed from the data ingestion platform, all of the subject facts associated with the removed subject may be removed from the platform. For example, in some embodiments, if a student, school, or employer, decides to opt-out or otherwise disengage with the data ingestion platform, the subject facts associated with that subject may be definitively determined and removed from the data ingestion platform.

In one or more of the various embodiments, in response to a removal request from a subject (e.g., opt-out requests, erasure requests, or the like), a data ingestion platform may determine the subject identifier of the subject. The subject identifier may be used to determine the journal records associated with the subject. Accordingly, in some embodiments, the journal records may be evaluated to determine the actions that need to be performed to satisfy the removal request. For example, in some embodiments, if a journal record shows that a subject fact has been linked or included in one or more profiles or one or more reports, the data ingestion platform may take actions, such as, un-linking the subject fact from the one or more profiles or removing it from the one or more reports. Also, if additional cleanup actions need to be performed, such actions may be defined in configuration information, or the like. For example, in some embodiments, if a subject fact is removed from a profile, the profile may be adjusted by deleting the fact, replacing the fact with a non-subject fact, or the like. In some embodiments, replacing a subject fact with a non-subject fact may include replacing the subject fact with one or more default values, or the like.

However, in one or more of the various embodiments, data ingestion platforms may have generated one or more non-subject facts based on subject facts, such as, aggregate values that may be based on subject facts. Thus, for example, a non-subject facts, such as, medians, means, trend lines, macro-predictions, trained machine-learning models, aggregate visualizations, or the like, may remain in the data ingestion platform even though some or all underlying the subject facts may have been deleted from the data ingestion platforms.

In one or more of the various embodiments, data ingestion platforms may be arranged to employ rules or instructions to determine if one or more non-subject facts may be retained if underlying subjects or subjects are deleted from a data ingestion platform. For example, in some embodiments, some non-subject facts that are aggregates of subject facts may be considered quasi-subject facts if the population of subjects contributing to the aggregate non-subject fact is so small that the subject may still be identified. For example, for some embodiments, if the data ingestion platform has a non-subject fact that represents the number of graduates for a particular college major, in some cases, the number of subjects graduating in some majors in some years may be so small that identities of individual subjects may be readily inferred. Accordingly, in some embodiments, data ingestion platforms may be arranged to employ rules, instructions, threshold values, or the like, to determine if non-subject facts may be retained if subjects are deleted from the data ingestion platform. In one or more of the various embodiments, how a given non-subject fact may be handled after the deletion of one or more related subjects may be determined based on configuration information that includes rules, threshold values, instructions, or the like.

Generalized Operations for Data Ingestion

FIGS. 7-16 represent generalized operations for data ingestion platform in accordance with one or more of the various embodiments. In one or more of the various embodiments, processes 700, 800, 900, 1000, 1100, 1200, 1300, 1400, 1500, and 1600 described in conjunction with FIGS. 7-16 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-16 may perform actions for data ingestion platform in accordance with at least one of the various embodiments or architectures such as those described in conjunction with FIGS. 4-6. Further, in one or more of the various embodiments, some or all of the actions performed by processes 700, 800, 900, 1000, 1100, 1200, 1300, 1400, 1500, and 1600 may be executed in part by acquisition engine 322, ingestion engine 324, translation engine 326, or the like.

Figure 7:
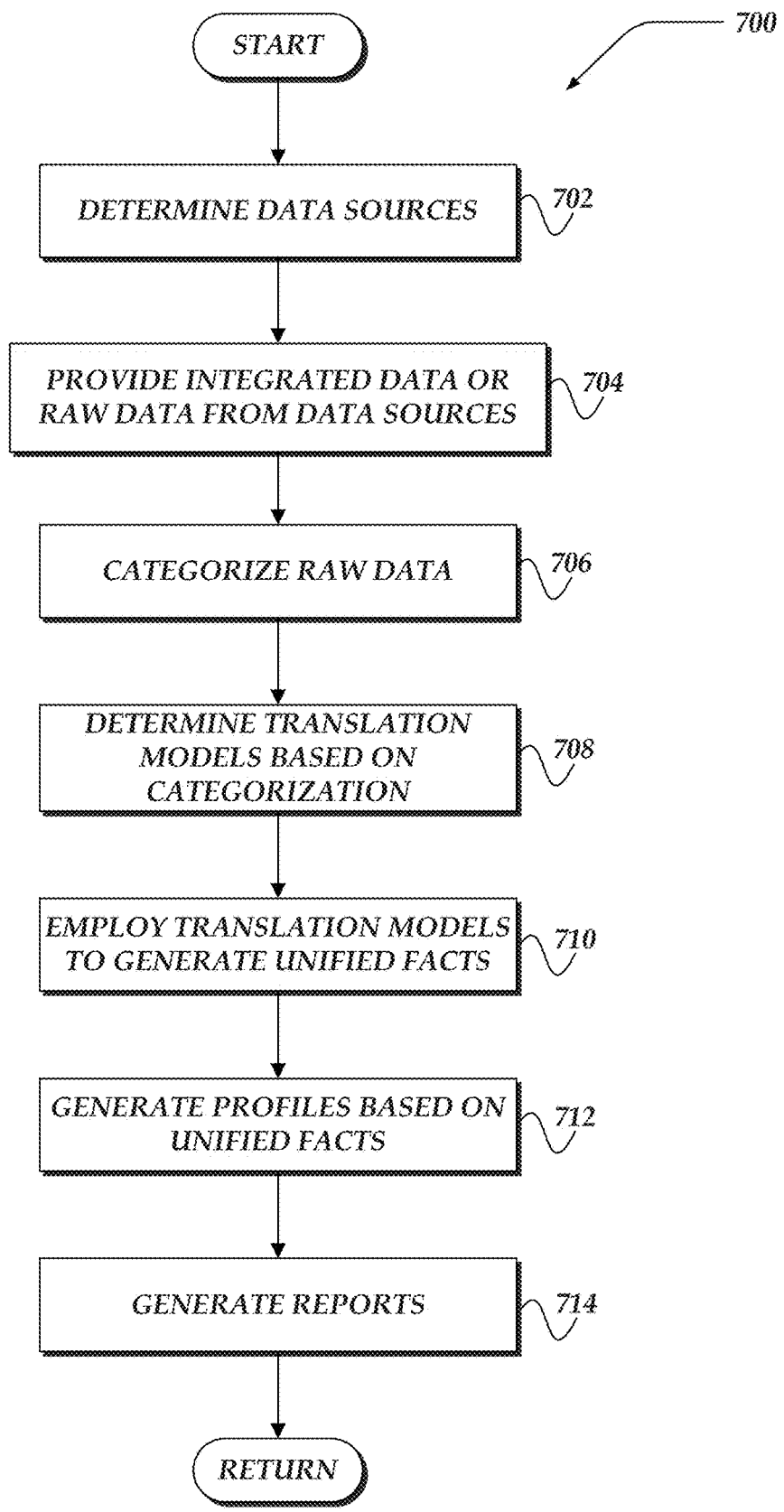
FIG. 7 illustrates an overview flowchart for a process for data ingestion platform in accordance with one or more of the various embodiments.

FIG. 7 illustrates an overview flowchart for process 700 for data ingestion platform in accordance with one or more of the various embodiments. After a start block, at block 702, in one or more of the various embodiments, one or more data sources may be determined. As described in part above and in more detail below, data ingestion platforms may be configured to collect information from one or more data sources.

At block 704, in one or more of the various embodiments, integrated data or raw data may be provided by the one or more data sources. In one or more of the various embodiments, integrated data sources may provide integrated data that may require less processing than raw data while raw data sources may provide raw data that may require additional processing.

At block 706, in one or more of the various embodiments, the data ingestion platform may be arranged to categorize the raw data. In one or more of the various embodiments, categorizing raw data may enable data ingestion platforms to employ a plurality of narrowly focused translation models each directed to particular categories. In some embodiments, translation models may be arranged to include categorization models within the translation model. In other embodiments, categorization models may be executed separately from translation models.

At block 708, in one or more of the various embodiments, the data ingestion platform may be arranged to determine one or more translation models based on the categorization of the raw data. In one or more of the various embodiments, one or more translation models may be associated with different categories of raw data.

Also, in some embodiments, a set of determined one or more translation models may be restricted based on extra-technical considerations, such as, licensing, local legal landscape, or the like.

At block 710, in one or more of the various embodiments, the data ingestion platform may be arranged to employ the one or more determined translation models to generate one or more unified facts based on information included in the raw data. As described above, in some embodiments, translation models may be employed to examine information included in raw data and attempt to map it to a unified schema to generate one or more unified facts.

At block 712, in one or more of the various embodiments, the data ingestion platform may be arranged to generate one or more profiles based on one or more unified facts. In one or more of the various embodiments, profiles may be generated to represent various subjects or entities. In some embodiments, profiles may be comprised on one or more unified facts, including one or more subject facts, one or more non-subject facts, as well as being associated with additional narrative content, styling information, user interfaces, or the like. For example, in some embodiments, a student profile may include one or more subject facts associated with that student. Likewise, for example, a school profile may include unified facts associated with a university or college. And, for example, employer profiles may include unified facts associated with an employer.

At block 714, in one or more of the various embodiments, the data ingestion platform may be arranged to generate one or more reports based on one or more requests or queries that may be provided by users or other services. In one or more of the various embodiments, reports may include unified facts, including subject facts or non-subject facts depending on the target or topic of a provided report.

In one or more of the various embodiments, data ingestion platforms may be arranged to generate one or more live reports that include interactive user interface features, such as, interactive dashboards, web pages, information displayed in mobile applications, or the like. In one or more of the various embodiments, one or more live reports may be automatically updated as underlying data or information may change. Also, in one or more of the various embodiments, live reports may include user interface features that enable report readers to drill down from information summaries to view detailed information. Further, in some embodiments, one or more live reports may include user interface features that enable active or passive feedback from users that may be provided as telemetry information to a data ingestion platforms.

Further, in one or more of the various embodiments, one or more reports may include one or more notifications, one or more events, one or more system messages, one or more error reports, one or more alarms, or the like. Also, in one or more of the various embodiments, one or more reports may be more or less static information. Next, in one or more of the various embodiments, control may be returned to a calling process.

Figure 8:
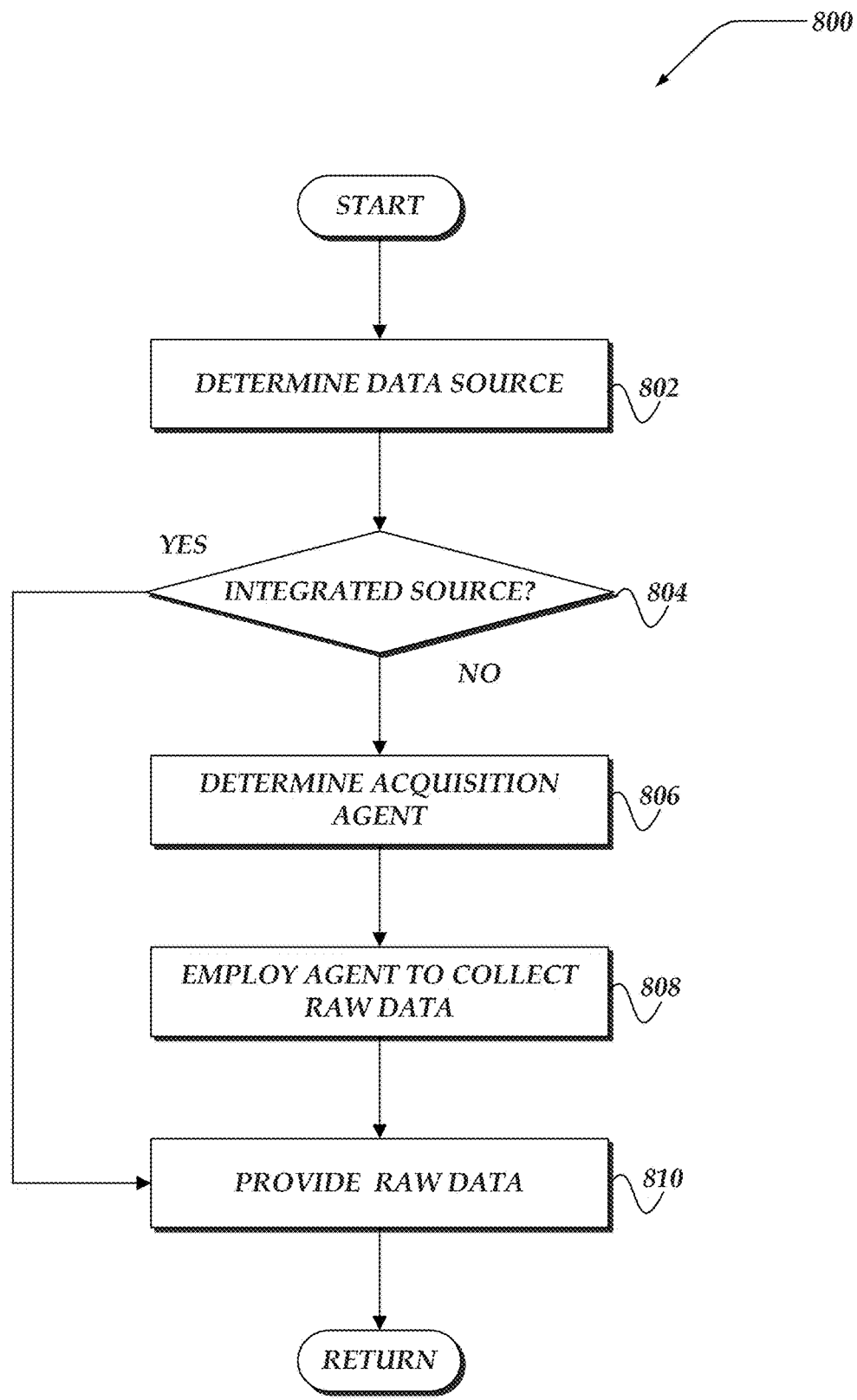
FIG. 8 illustrates a flowchart for a process for providing raw data for a data ingestion platform in accordance with one or more of the various embodiments.

FIG. 8 illustrates a flowchart for process 800 for providing raw data for a data ingestion platform in accordance with one or more of the various embodiments. After a start block, at block 802, in one or more of the various embodiments, a data source may be determined for a data ingestion platform. In one or more of the various embodiments, data ingestion platforms may be configured to employ various data sources. In some embodiments, data ingestion platforms may be arranged to employ configuration information to determine connection particulars, such as, authentication credentials, Uniform Resource Identifiers (URIs), Application Programming Interfaces (API) gateways, protocol information, or the like.

In some embodiments, acquisition engines may be arranged to scan news feeds, or the like, to identify potential data sources. Likewise, in some embodiments, acquisition engines may be arranged to register with news event services, digital clipping services, or the like, to automatically receive notifications of available relevant data sources. For example, in some embodiments, data ingestion platforms may be registered to receive notifications if universities, labor agencies, employers or the like, release press releases or reports that may be automatically collected.

Likewise, in some embodiments, data ingestion platforms may be arranged to monitor one or more social media streams or social media feeds. Accordingly, in some embodiments, if relevant information may be detected, the feed information may be determined to be a data source.

In one or more of the various embodiments, data ingestion platforms may be arranged to employ one or more filters, pattern matching, grammars, or the like, to determine if information in a given information stream or feed qualifies as a data source. Accordingly, in one or more of the various embodiments, data ingestion platforms may employ one or more of the filters, pattern, rules, instructions, grammars, or the like, that may be provided by configuration information.

At decision block 804, in one or more of the various embodiments, if the data source may be an integrated data source, control may flow to block 810; otherwise, control may flow to block 806.

In some embodiments, data ingestion platforms may be arranged to employ one or more integrated data sources. In some embodiments, integrated data sources may provide APIs, interfaces, or the like, that may be well-defined, such that the information they provide may require little if any processing. Further, in some embodiments, integrated data sources may provide information assumed to be true facts that may directly be mapped to unified facts. For example, in some embodiments, integrated data sources may provide information, such as, standardized government codes, industry standard codes, survey information, demographic information, or the like, that may be accepted at face value or with minimal processing.

At block 806, in one or more of the various embodiments, the data ingestion platform may be arranged to determine one or more acquisition agents based on the data source. In some embodiments, acquisition engines may be arranged to automatically investigate the characteristics of a data source. Accordingly, in some embodiments, acquisition engine may determine an acquisition agent based on the investigation. Also, in one or more of the various embodiments, acquisition engines may determine acquisition agents based on configuration information.

For example, for some embodiments, if a data source employs Hypertext Transfer Protocol (HTTP) and provides raw data using HTML, the acquisition engine may automatically select an acquisition agent that may include WWW user-agent capabilities to crawl the data source to obtain raw data. Likewise, for example, in one or more of the various embodiments, if the data source employs SSH File Transfer Protocol (SFTP), File Transfer Protocol (FTP), or the like, the acquisition engines may automatically select an acquisition agent that may be arranged to navigate SFTP/FTP repositories.

In one or more of the various embodiments, acquisition engines may be arranged to select acquisition agents based on inferences derived from various known characteristics of a data source, including, required credentials, URIs (e.g., schema, protocol, path format, media type, or the like), network ports (e.g., TCP/UDP application ports), URIs associated with data sources, or the like.

In one or more of the various embodiments, acquisition agents may be provided for various industry standard protocols or applications, including, HTTP, HTML, XML, Remote Procedure Calls (RPCs), XML-RPC, REST/JSON, Simple Mail Transfer Protocol (SMTP), FTP, SFTP, Secure Shell (SSH), Secure Copy Protocol (SCP), Network File System (NFS), Remote Desktop Protocol (RDP), Real-time Transport Protocol (RTP), or the like. Also, in some embodiments, acquisition agents may be provided for various proprietary application protocols, such as, social media platforms, Enterprise Resource Planning (ERP) platforms, human resource management platforms, or the like. Further, in some embodiments, one or more custom protocols may be developed as other data provider protocols or applications may be encountered.

At block 808, in one or more of the various embodiments, the data ingestion platform may be arranged to employ the acquisition agents to collect or provide raw data associated with the data source.

In one or more of the various embodiments, one or more acquisition agents may be arranged to automatically navigate (e.g., crawl) one or more data sources. Also, in some embodiments, the one or more acquisition agents may be arranged to apply one or more filters, or the like, to selectively acquire raw data from a data source.

In some embodiments, one or more acquisition agents may be arranged to automatically execute one or more transactions to collect raw data from one or more services or applications. In some embodiments, one or more acquisition agents may be arranged to execute one or more scripts or recipes to collect raw data from a data source.

Accordingly, in one or more of the various embodiments, acquisition agents may be arranged to employ rules, instructions, filters, grammars, scripts, or the like, that may be provided via configuration information.

At block 810, in one or more of the various embodiments, the data ingestion platform may be arranged to provide the raw data from the data source.

Next, in one or more of the various embodiments, control may be returned to a calling process.

Figure 9:
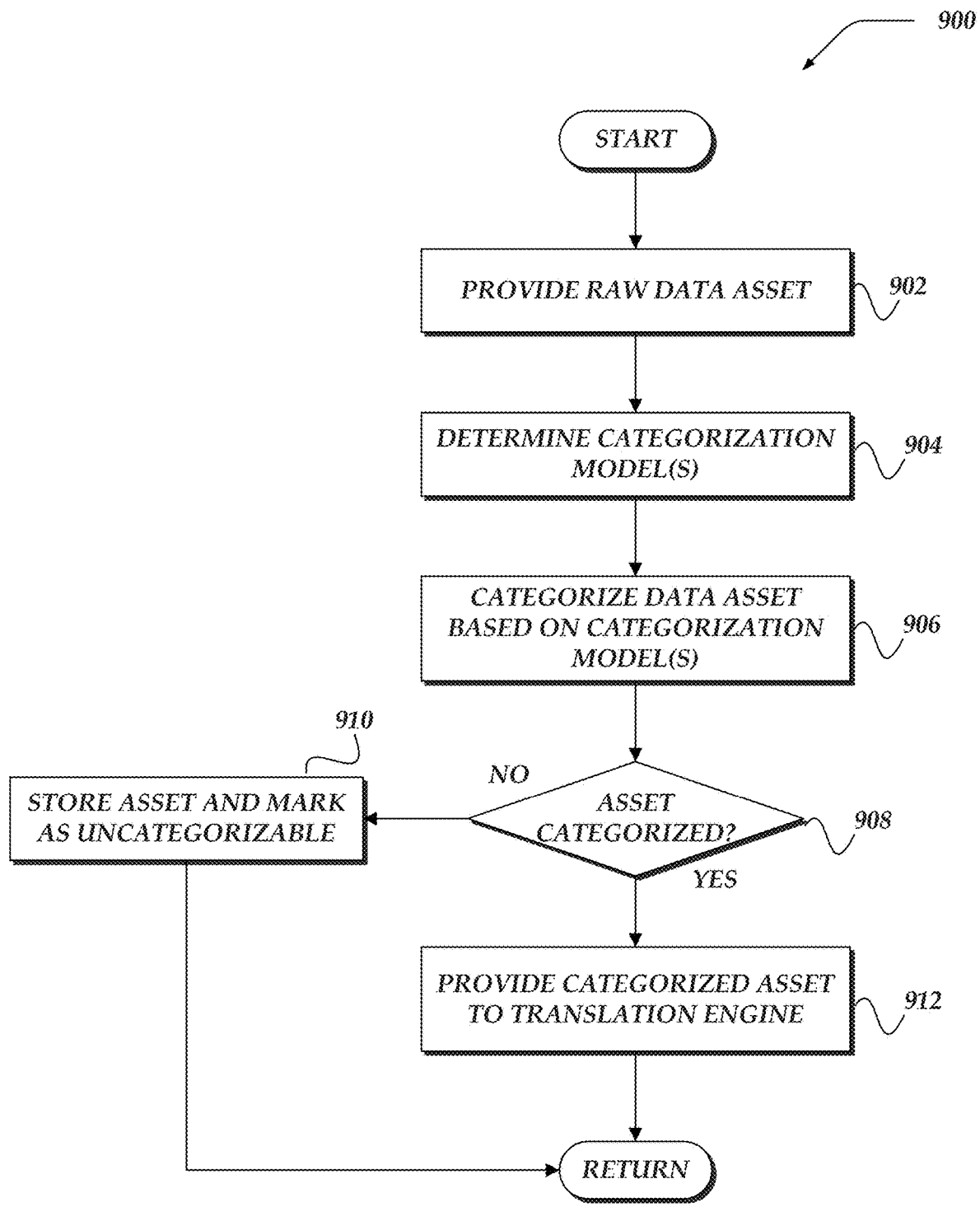
FIG. 9 illustrates a flowchart for a process for categorizing raw data for a data ingestion platform in accordance with one or more of the various embodiments.

FIG. 9 illustrates a flowchart for process 900 for categorizing raw data for a data ingestion platform in accordance with one or more of the various embodiments. After a start block, at block 902, in one or more of the various embodiments, raw data may be provided to a data ingestion platform. As described above, in some embodiments, acquisition engines may be arranged to provide raw data to ingestion engines.

At block 904, in one or more of the various embodiments, the data ingestion platform may be arranged to determine one or more categorization models. In one or more of the various embodiments, categorization models may be considered to be data structures that encapsulate the rules, instructions, machine-learning classifiers, machine-learning models, or the like, that may perform actions to categorize raw data. In one or more of the various embodiments, the determined categorization models may be selected based on the data source that may be associated with the raw data. Likewise, in some embodiments, categorization models may be selected based on the organization employing the data ingestion platform. In other embodiments, all of the categorization models may be automatically applied for each raw data asset.

At block 906, in one or more of the various embodiments, the data ingestion platform may be arranged to categorize the raw data based on the categorization models. Accordingly, in one or more of the various embodiments, the one or more determined categorization models may be executed to categorize raw data.

At decision block 908, in one or more of the various embodiments, if the raw data may be categorized, control may flow to block 914; otherwise, control may flow to decision block 910. In one or more of the various embodiments, categorization models may be arranged to provide confidence scores, or the like, that may indicate a quality of the categorization. Likewise, in some embodiments, categorization engines may be arranged to employ one or more threshold values for determining if a categorization may be successful. In some embodiments, categorization engines may be arranged to employ configuration information to determine the specific threshold value for a particular category.

At block 910, in one or more of the various embodiments, the raw data may be stored and marked as uncategorizable. In some embodiments, categorization engines or data ingestion platforms may be arranged to raise errors or notifications if categorization of the raw data fails.

In one or more of the various embodiments, one or more categorization models may be associated with different actions for handling raw data that fails to be categorized. In some embodiments, the raw data may be stored and flagged for additional review. For example, for some embodiments, failing to categorize raw data may trigger additional review of the raw data, categorization models, or the like, to determine why the raw data was not successfully categorized. Next, control may be returned to a calling process.

At block 912, in one or more of the various embodiments, the data ingestion platform may be arranged to provide the categorized raw data to a translation engine. Note, in one or more of the various embodiments, one or more of the categorization steps may be included or defined in translation models rather than in categorization models. Next, control may be returned to a calling process.

Figure 10:
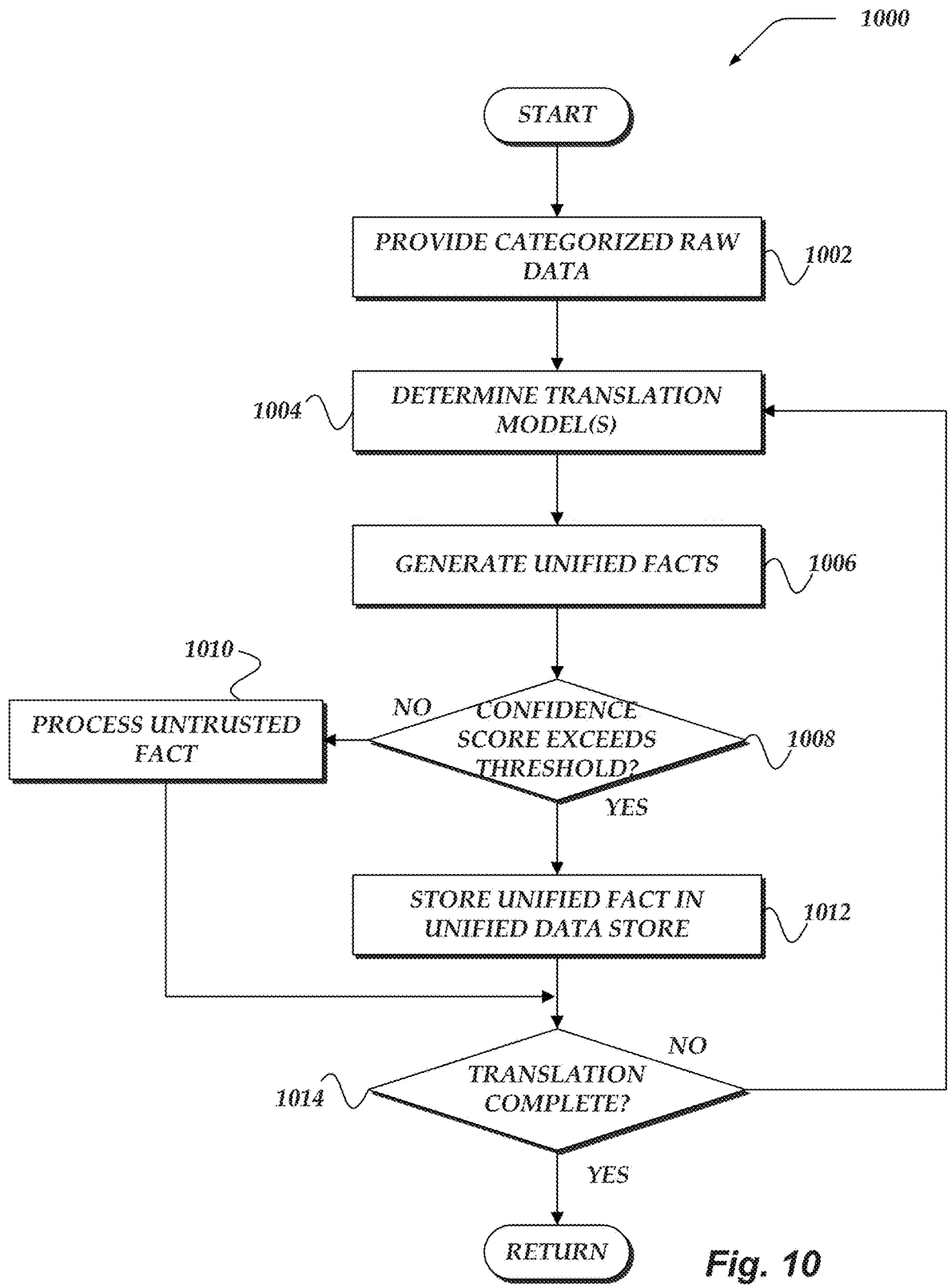
FIG. 10 illustrates a flowchart for a process for generating unified facts for a data ingestion platform in accordance with one or more of the various embodiments.

FIG. 10 illustrates a flowchart for process 1000 for generating unified facts for a data ingestion platform in accordance with one or more of the various embodiments. After a start block, at block 1002, in one or more of the various embodiments, categorized raw data may be provided to a translation engine.

At block 1004, in one or more of the various embodiments, the translation engine may be arranged to determine one or more translation models. In one or more of the various embodiments, one or more translation models may be associated with one or more data categories. Accordingly, in some embodiments, translation engines may be arranged to determine the translation models based on the category associated with the raw data.

In one or more of the various embodiments, data ingestion platforms may omit a separate categorization phase. Accordingly, in some embodiments, translation models may include one or more internal steps or phases to determine if the raw data may be processed. For example, in some embodiments, if translation models may be directed to generating unified facts from student resumes, they may include one or more initial steps to evaluate if the raw data may be a resume. In some embodiments, one or more of these initial steps may be considered similar to one or more steps performed by categorization models as discussed above.

At block 1006, in one or more of the various embodiments, the translation engine may be arranged to generate one or more unified facts based on information included in the raw data. As described above, translation models may be considered data structures that encapsulate the rules, instructions, machine-learning classifiers, machine-learning models, or the like, that may perform actions to generate unified facts from raw data information.

In one or more of the various embodiments, translation models may be arranged to have broad or narrow scope depending on how they may be arranged. For example, in some embodiments, one translation model may be directed to generating unified facts from entire student resumes whereas a narrower translation model may be directed to generating unified facts from the employment description portions of a student resume while still another narrow translation model may be directed to generating unified facts from the education description portions of a student resume. Also, in some embodiments, one or more translation models may be dedicated to determining if a unified fact may be subject fact.

In some embodiments, two or more translation models may be related or associated such that if one or more of them may be determined for use, the other may be automatically executed as well. In some embodiments, one or more sets of related or associated translation models may be required to execute in a particular sequence while other sets of related or associated translation models may be arranged to execute independently.

In one or more of the various embodiments, one or more translation models may be comprised of one or more other translation models. In some cases, for some embodiments, translation models included in another translation model may be considered translation sub-models.

In one or more of the various embodiments, translation models may be arranged to provide a confidence score with each generated unified fact that indicates the quality of the match as determined by the translation model that made the match.

At decision block 1008, in one or more of the various embodiments, if a confidence score associated with the match exceeds a defined threshold value, control may flow block 1012; otherwise, control may flow to block 1010. In one or more of the various embodiments, translation engine may be arranged to define threshold values that may be employed to determine if a unified fact match may be considered trustworthy.

In some embodiments, different translation models or different types of translation models may be associated different trust threshold values. For example, some translation models may be known to have more sensitivity than other translation models. Likewise, in some embodiments, one or more of the unified facts one or more translation models may be arranged to match may be considered important enough to give more trust to lower quality matches than one or more other unified facts.

At block 1010, in one or more of the various embodiments, the translation engine may be arranged to process the untrusted facts. Next, in some embodiments, control may flow to decision block 1014.

In one or more of the various embodiments, one or more translation models or unified facts may be associated with different actions for handling untrusted unified fact determinations. In some embodiments, one or more untrusted unified facts may be discarded. In other embodiments, one or more untrusted unified facts may be stored and flagged for additional review. For example, for some embodiments, the generation of critical untrustworthy unified facts may trigger additional review of the raw data, translation models, or the like, to investigate why the matches were not trustworthy.

At block 1012, in one or more of the various embodiments, the translation engine may be arranged to store the unified fact in a unified fact data store. As described, a unified fact database that supports the unified schema may be employed for storing unified facts along with various meta-data, such as, confidence scores, source raw data references, reference to the model that generated the unified fact, or the like.

At decision block 1014, in one or more of the various embodiments, if translation may be finished for the raw data, control may be returned to a calling process; otherwise, control may loop back to block 1004.

Next, in one or more of the various embodiments, control may be returned to a calling process.

Figure 11:
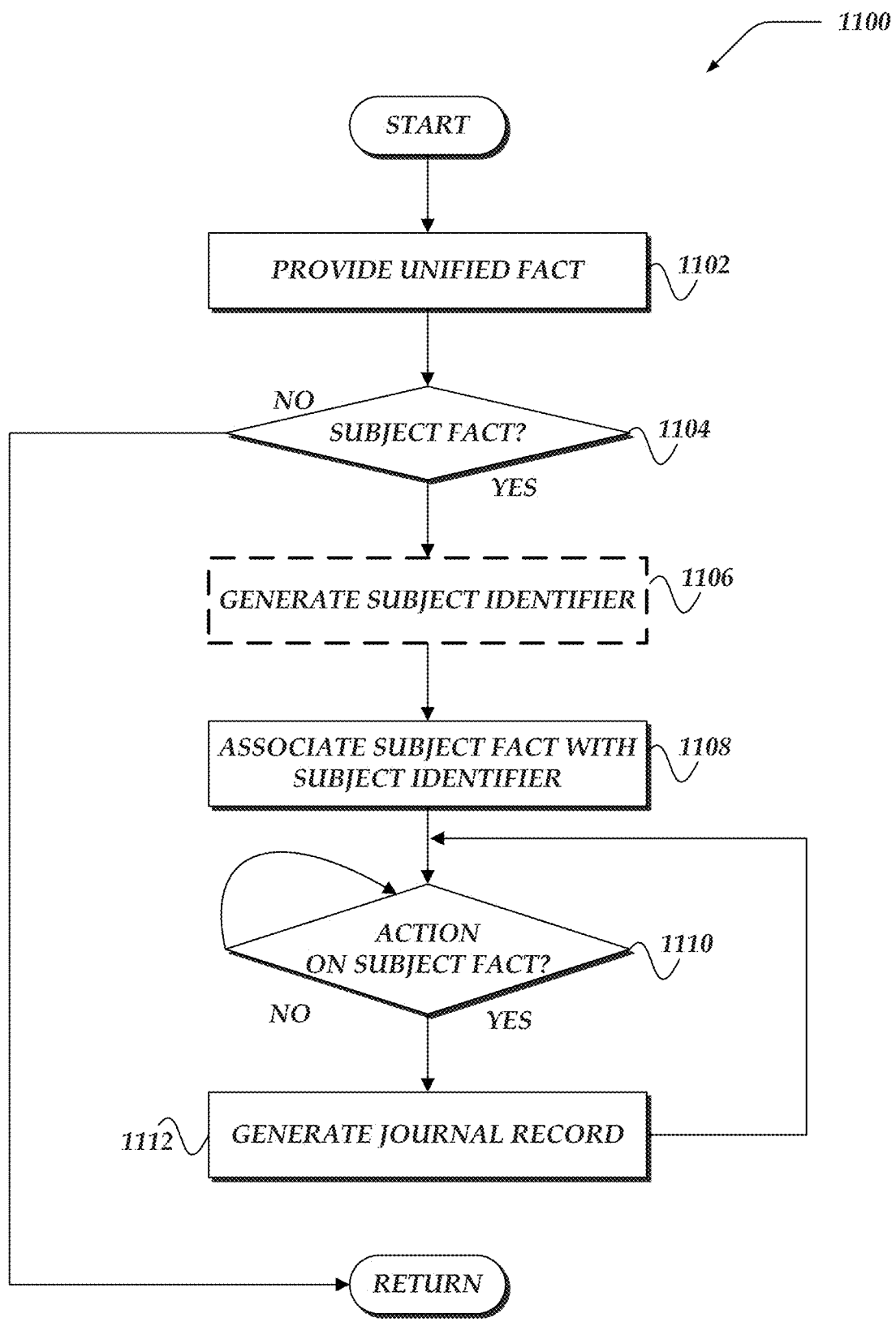
FIG. 11 illustrates a flowchart for a process for generating subject facts for a data ingestion platform in accordance with one or more of the various embodiments.

FIG. 11 illustrates a flowchart for process 1100 for generating subject facts for a data ingestion platform in accordance with one or more of the various embodiments. After a start block, at block 1102, in one or more of the various embodiments, unified facts may be arranged to be provided to translation engine. As described above, in some embodiments, data ingestion platforms may be arranged to obtain raw data that may be provided to translation engines to generate unified facts.

At decision block 1104, in one or more of the various embodiments, if the unified fact may be a subject fact, control may flow block 1106; otherwise, control may be returned to a calling process.

In one or more of the various embodiments, translation engines or translation models may be arranged to employ one or more mechanisms to determine if a unified fact may be a subject fact. In some embodiments, because the unified schema is known it may indicate if a unified fact is a subject fact or a non-subject fact. Also, in some embodiments, one or more unified facts as defined in the unified schema may be a subject fact or a non-subject depending on additional considerations. Accordingly, in one or more of the various embodiments, one or more translation models may include rules, instructions, machine-learning classifiers, or the like, for determining or inferring if a unified fact may be subject fact.

In some embodiments, data ingestion platforms may be arranged to include one or more translation models or translation sub-models that may be dedicated to determining if unified facts may be subject facts. Likewise, in one or more of the various embodiments, one or more translation models may include instructions for generating non-subject facts based on one or more unified facts (e.g., aggregates). Accordingly, in one or more of the various embodiments, such non-subject facts may be known to be non-subject facts rather than subject facts.

At block 1106, in one or more of the various embodiments, optionally, the translation engine may be arranged to generate a subject identifier associated with the subject. As described above, in some embodiments, data ingestion platforms may be arranged to associate subject facts with subject identifiers that correspond to the subject. In some embodiments, data ingestion platforms may be arranged to automatically generate subject identifiers by executing rules or instructions defined in configuration information. For example, in some embodiments, data ingestion platforms may be arranged to generate subject identifiers by executing one-way hash functions, or the like, on information associated with the subject.

Note, this block is indicated as being optional because in some cases the subject identifier of the subject associated with the subject fact may be available (e.g., previously generated, provided by another service, or the like) rather having to be generated at block 1106.

At block 1108, in one or more of the various embodiments, the translation engine may be arranged to associate the subject fact with the subject identifier. For example, the subject identifier may be stored with the subject facts in the unified fact database.

At decision block 1110, in one or more of the various embodiments, if an action may be directed to a subject fact, control may flow to block 1112; otherwise, control may loop back to decision block 1110. In one or more of the various embodiments, data ingestion platforms may be arranged to monitor actions that may impact subject facts whether the actions may be performed automatically, performed by users, or the like.

At block 1112, in one or more of the various embodiments, a journaling engine may be arranged to generate one or more journal records associated with the subject fact. As described above, in one or more of the various embodiments, a journaling engine may be arranged to generate journal records that include enough information to unwind or recreate the actions that may be applied to the subject fact. Accordingly, in some embodiments, this may enable data ingestion platforms to trace how subject facts may be used in the system. Thus, in some embodiments, data ingestion platforms may be enabled to generate reports for subjects that show how their subject facts are being employed. Likewise, in some embodiments, these journal records enable data ingestion platforms to ensure complete removal of subject facts if a subject may be removed from the data ingestion platform.

In one or more of the various embodiments, journal records may be stored in one or more journal data stores or journals. Next, control may loop back to decision block 1110.

Figure 12:
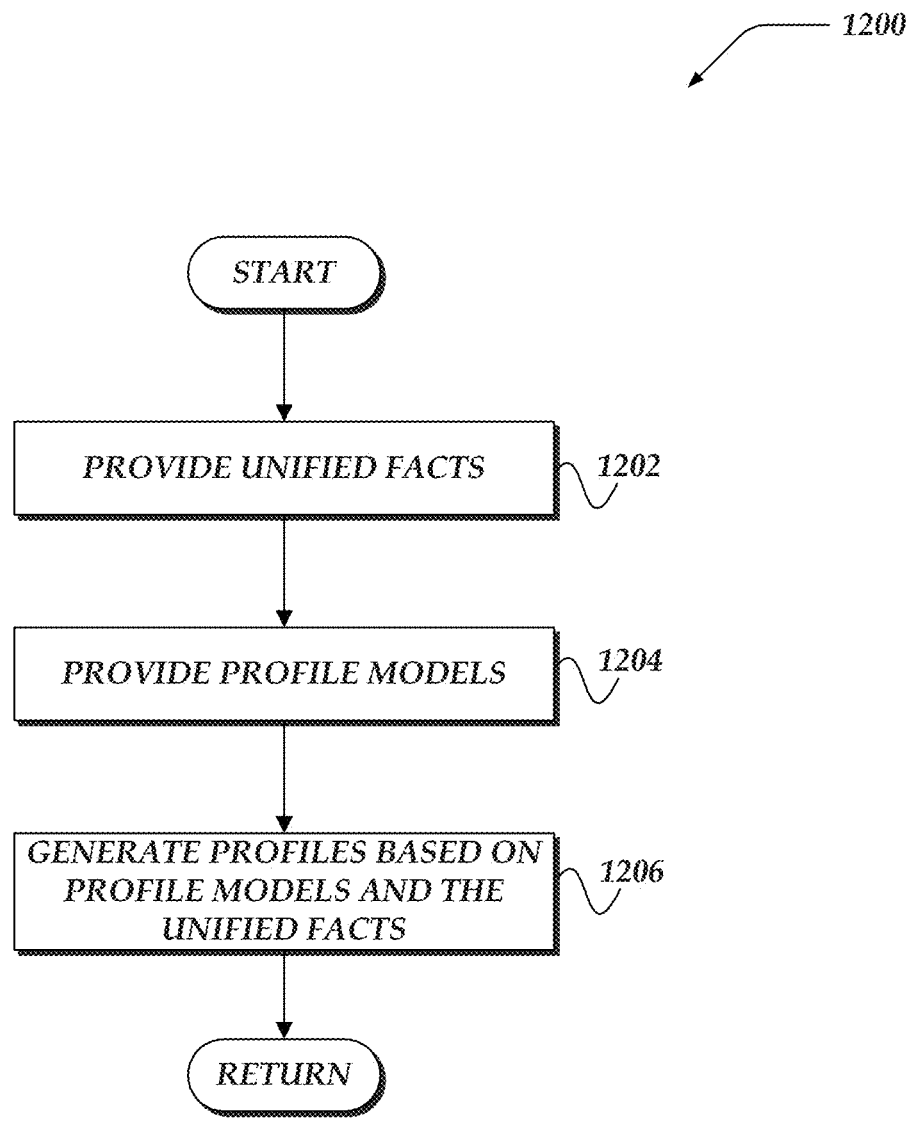
FIG. 12 illustrates a flowchart for a process for generating profiles for a data ingestion platform in accordance with one or more of the various embodiments.

FIG. 12 illustrates a flowchart for process 1200 for generating profiles for a data ingestion platform in accordance with one or more of the various embodiments. After a start block, at block 1202, in one or more of the various embodiments, unified facts may be provided to a data ingestion platform. As described above, unified facts comprising subject facts or non-subject facts may be generated by a translation engine and stored in a unified fact database.

At block 1204, in one or more of the various embodiments, the data ingestion platform may be arranged to provide one or more profile models. In one or more of the various embodiments, profile models may be data structures that encapsulate one or more actions, definitions, templates, machine-learning models, or the like, that may be employed to generate one or more profiles from unified facts. In some embodiments, profiles may be associated with various entities or concepts, such as, subjects, organizations, data sources, geographic locations, or the like. For example, in some embodiments, a simple profile model for generating student profiles may be a text based template that defines placeholders or slots for particular unified facts, such as, student name, course of study, grades, or the like. Also, for example, in some embodiments, more complex student profile models may also include or reference one or more machine-learning models or machine-learning classifiers the may be employed to generate one or more predictions, inferences, insights, or the like, about the student that may be included in the student profile.

In one or more of the various embodiments, profile models may include rules, instructions, conditions, threshold values, text, styling information, or the like, that may be obtained via configuration information.

At block 1206, in one or more of the various embodiments, the data ingestion platform may be arranged to generate one or more profiles based on the profile models and the unified facts. In some embodiments, profile models may be arranged raise errors or notifications if the unified facts available for a subject of a profile may be insufficient or unavailable. In some embodiments, profile models may include a definition of the minimum set of unified facts required for a valid profile. Likewise, in some embodiments, profile models may include one or more of floor or ceiling threshold values, acceptable range values, default values, or the like.

Also, in one or more of the various embodiments, as subject facts may be included or associated with profiles, journal records may be generated to memorialize the association or reference.

Next, in one or more of the various embodiments, control may be returned to a calling process.

Figure 13:
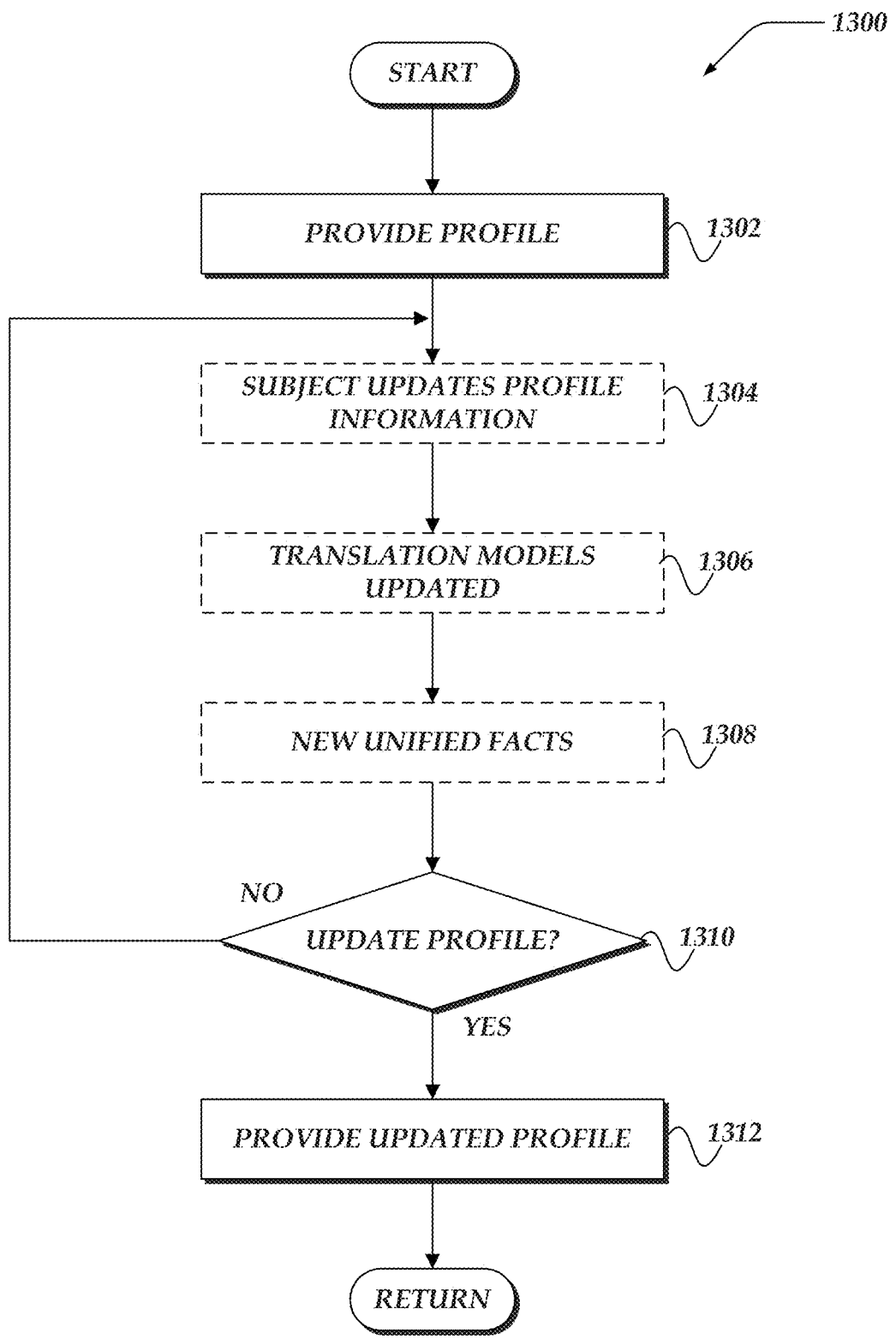
FIG. 13 illustrates a flowchart for a process for updating profiles for a data ingestion platform in accordance with one or more of the various embodiments.

FIG. 13 illustrates a flowchart for process 1300 for updating profiles for a data ingestion platform in accordance with one or more of the various embodiments. After a start block, at block 1302, in one or more of the various embodiments, one or more profiles may be provided. As described above, data ingestion platforms may be arranged to generate one or more profiles that may include or be based on one or more subject facts or non-subject facts.

At block 1304, in one or more of the various embodiments, optionally, one or more subjects may update profile information. In one or more of the various embodiments, data ingestion platforms may be arranged to provide user interfaces that enable subjects or other authorized persons to update the information included in profiles. In some embodiments, this may include updating one or more subject facts directly or adding new information to a profile. Likewise, in one or more of the various embodiments, subject updates may include grading or scoring one or more inferences that may be included in a profile.

Note, this block is marked as optional because, in some embodiments, subjects or other persons may be disabled from updating or modifying one or more profiles. Alternatively, in some embodiments, subjects may refrain from providing profile information updates even if they may be enabled to update profile information.

At block 1306, in one or more of the various embodiments, optionally, one or more translation models may be updated. In one or more of the various embodiments, data ingestion platforms may be arranged to provide a variety of facilities or mechanisms that result in one or more modifications or updates to one or more translation models. For example, for some embodiments, translation models that were employed to generate one or more of the subject facts that profile information may be based on may be replaced, re-trained, or otherwise, updated. Accordingly, in one or more of the various embodiments, changes to these translation models may cast doubt on the veracity of unified facts provided by the newly modified translation models. Accordingly, in this example, one or more profiles that may rely on these potentially untrustworthy unified facts may be considered stale or untrustworthy as well.

Note, this block is marked as optional because, in some embodiments, translation models associated with the profile may not have been updated. Likewise, in some embodiments, modified or updated translation models may not always impact some or all profiles or some or all of the profile information.

At block 1308, in one or more of the various embodiments, optionally, one or more new unified facts may be added or existing unified facts may be modified. In one or more of the various embodiments, data ingestion platforms may be arranged to enable additional subject facts for a variety of reasons. In some embodiments, new data sources may be included, resulting in new or updated unified facts. Also, in some embodiments, new raw data may be provided by existing data sources. For example, if a known data source makes changes to provide additional raw data, this may result in new unified facts being added. Accordingly, in one or more of the various embodiments, some or all of the new raw data may result in update or add unified facts that may impact one or more profiles.

Note, this block is marked as optional because, in some embodiments, new or updated unified facts may not have been provided. Likewise, in some embodiments, new or additional unified facts may not always impact some or all profiles or profile information.

At decision block 1310, in one or more of the various embodiments, if the profile needs to be updated, control flows to block 1312; otherwise, control may loop back to block 1304.

In one or more of the various embodiments, data ingestion platforms may be arranged to employ one or more rules, instructions, conditions, threshold values provided via configuration information to determine if the modifications or additions such as those non-limiting examples described above, or others, may require a profile to be updated. In some embodiments, changes to one or more particular unified facts may trigger a profile to be immediately updated whereas other changes to other unified facts may not require profiles to be immediately updated. For example, in some embodiments, in some cases, new unified facts may result in new information being added to an existing profile rather than recreating the entire profile.

At block 1312, in one or more of the various embodiments, the data ingestion platforms may be arranged to provide the updated profile. In some embodiments, updating a profile may include recreating the profile from raw data. Accordingly, in some embodiments, this may include requesting additional raw data from one or more data sources and re-running the translation process. In other embodiments, profiles generated via profile models may require the profile models be re-executed to generate the updated profiles. For example, in some embodiments, profile information may include inferences or insights generated based on one or more profile models. Accordingly, in this example, if some or all of the underlying unified facts have been changed, the inferences or insights included in the profile information may become stale, requiring the entire profile to be recreated.

Accordingly, in one or more of the various embodiments, data ingestion platforms may be arranged to automatically update or recreate one or more profiles if some or all of the underlying information contributing to the profiles may have changed. In some embodiments, this may be advantageous at least because data sources may come and go, translation models may be updated or de-ranked (e.g., if reputation scores decrease), or the like, all or any of which may cause one or more profiles to become stale. Thus, in some embodiments, automatic profile updating may improve the quality of profile information without adding excessive burdens or resource cost to data ingestion platform operators that may be caused by manually executing individual profile updates as translation models or unified facts experience unexpected or unplanned changes.

Next, in one or more of the various embodiments, control may be returned to a calling process.

Figure 14:
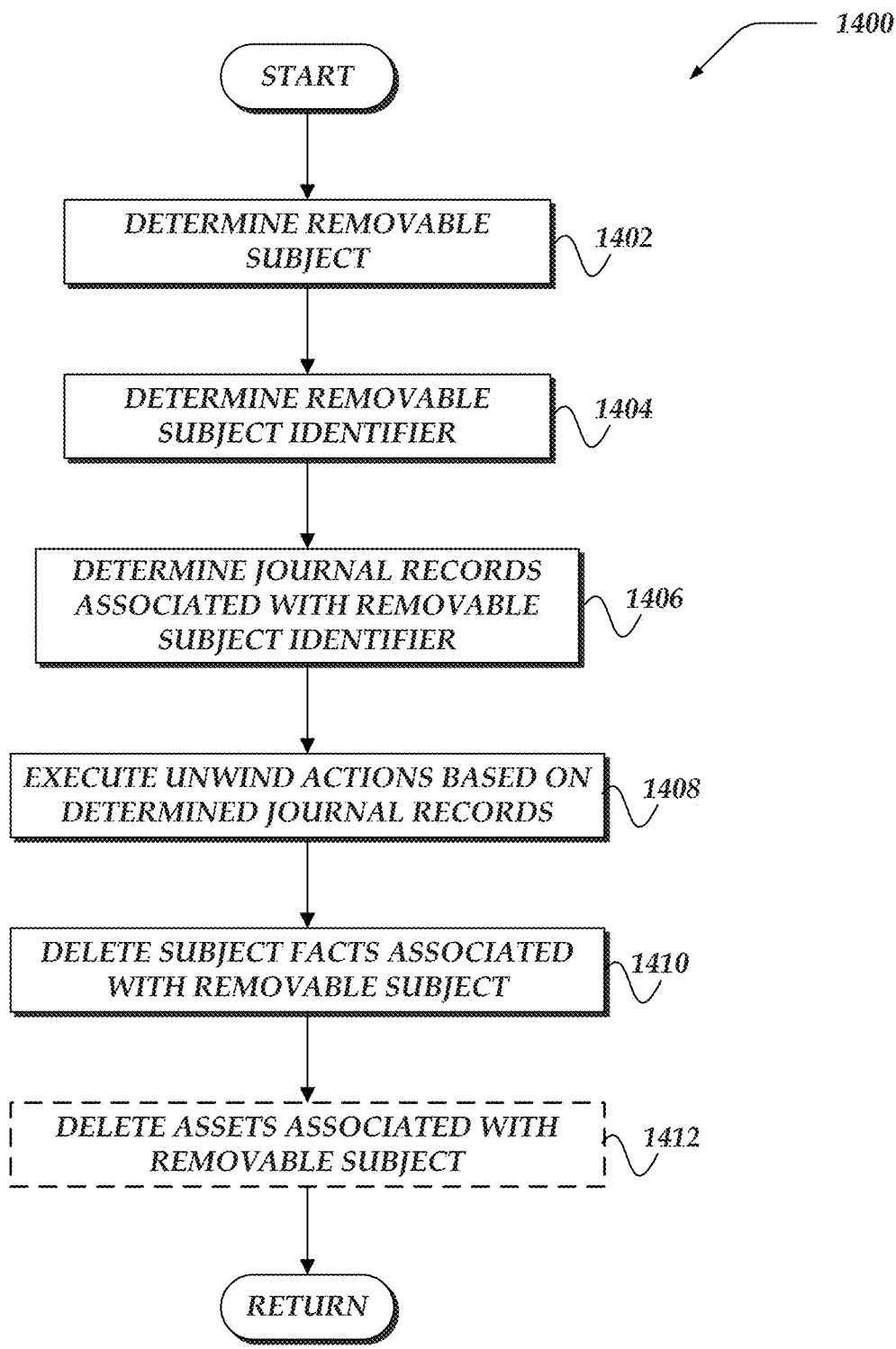
FIG. 14 illustrates a flowchart for a process for removing subjects from a data ingestion platform in accordance with one or more of the various embodiments.

FIG. 14 illustrates a flowchart for process 1400 for removing subjects from a data ingestion platform in accordance with one or more of the various embodiments. After a start block, at block 1402, in one or more of the various embodiments, one or more removable subjects may be determined. In one or more of the various embodiments, removable subjects may be subjects that for various reasons may be determined for removal from a data ingestion platform. For example, in one or more of the various embodiments, a person may provide notice that they want to be removed from the data ingestion platform. Also, for example, an organization may provide notice to sever its relationship with the data ingestion platform operator.

At block 1404, in one or more of the various embodiments, one or more subject identifiers may be determined based on the one or more removable subjects. In one or more of the various embodiments, as described above, subjects may be associated with subject identifiers. Accordingly, in some embodiments, if a removal notification omits the subject identifier, the data ingestion platform may be arranged to determine the appropriate subject identifier. In some embodiments, subjects may provide subject identifiers directly. In other embodiments, subjects may provide anonymized identifiers that may be associated with subject identifiers. Accordingly, in some embodiments, the subject identifier may be looked up from an index or database or computed on the fly based on other information associated with the subject.

At block 1406, in one or more of the various embodiments, the data ingestion platform may be arranged to determine one or more journal records that may be associated with the one or more removable subject identifiers. As described above, journal records associated with subject facts may be associated with subject identifiers of the subjects corresponding to the subject facts.

Accordingly, in one or more of the various embodiments, data ingestion platforms may be arranged to execute one or more queries, query-like operations, search operations, or the like, to determine the journal records that may be associated subject facts of the removable subjects. In some embodiments, these subject facts may be considered removable subject facts.

In one or more of the various embodiments, data ingestion platforms may be arranged to generate one or more forward or reverse indices associated with the journal records to facilitate determine the journal records associated with a subject identifier.

At block 1408, in one or more of the various embodiments, the data ingestion platform may be arranged to execute one or more unwind actions based on the journal records associated with the subject identifiers. As described above, journal records include action information that describes actions or activity that has occurred to subject facts. Accordingly, in one or more of the various embodiments, the data ingestion platform may execute one or more operations to reverse the actions (if necessary) that acted upon the subject facts. For example, for some embodiments, if a journal record shows that a subject fact was stored in the unified fact database, the data ingestion platform may execute actions to delete the subject fact from the unified fact database. Likewise, for example, if a removable subject fact has been linked or included in one or more profiles or one or more live reports, the data ingestion platform may un-link or remove the removable subject facts from those profiles or reports.

In one or more of the various embodiments, additional actions may be associated with the removal a subject fact. In some embodiments, in some circumstances the value of the removable subject fact may be replaced with a non-subject fact value, such as, a default value or aggregate value. Also, in some embodiments, entire profiles or reports may be removed depending on which subject fact may be removed.

In one or more of the various embodiments, various actions stored in the journal records may be associated different unwind actions. Accordingly, in one or more of the various embodiments, data ingestion platforms may be arranged to determine or execute unwind actions based on rules, instructions, or the like, provided via configuration information. Thus, in one or more of the various embodiments, different organizations may be enabled modify unwind actions based on local conditions.

Note, in some embodiments, rather than seeking to be removed, subjects may request a report or accounting of their subject facts that may be known to the data ingestion platform or how those subject facts may be used in the data ingestion platform. Likewise, in some embodiments, subjects may request a report or accounting of actions taken with their subject facts. In some embodiments, data ingestion platforms may be arranged to provide subjects one or more reports that disclose the subject facts associated with the requesting subjects. Likewise, in some embodiments, data ingestion platforms may be arranged to provide a report that shows how the subject facts associated with a subject have been used in the data ingestion platform. For example, for some embodiments, a subject report may include a list of that subject's subject facts and a list of reports, profiles, or the like, that include some or all of the those subject facts.

Accordingly, in some embodiments, journal records may be employed to reconstruct the actions associated with subject facts or subjects as well as creating lists of all subject facts associated with a subject.

At block 1410, in one or more of the various embodiments, the data ingestion platform may be arranged to delete one or more subject facts associated with the one or more removable subjects. In some embodiments, at the conclusion of unwind operations, remaining subject facts for the subject, if any, may be deleted from the data ingestion platform.

Alternatively, in some embodiments, if the subject has requested a report regarding the use or existence of their subject facts, the data ingestion platform may be arranged to generate the requested reports rather than deleting the subject facts.

At block 1412, in one or more of the various embodiments, optionally, the data ingestion platform may be arranged to delete one or more raw data assets that may be associated with the one or more removable subjects. In some embodiments, data ingestion platforms may store additional data assets that may be provided with or as raw data, such as, documents, or the like. Likewise, in some embodiments, subjects may be enabled to add notes or annotations to their profiles, or the like. Accordingly, in one or more of the various embodiments, some or all of these assets may not strictly be stored as unified facts. Thus, in some embodiments, assets associated with a subject may be deleted as part of the removal process. For example, assets may be stored or linked to a subject identifier that may be employed to determined and delete removable assets.

Note, this block is indicated as optional because, in some embodiments, data ingestion platforms may not have data assets (e.g., documents) stored for one or more subjects. For example, in some embodiments, data ingestion platforms may be arranged to discard or delete raw data after the information included in the raw data has been mapped to unified facts.

Next, in one or more of the various embodiments, control may be returned to a calling process.

Figure 15:
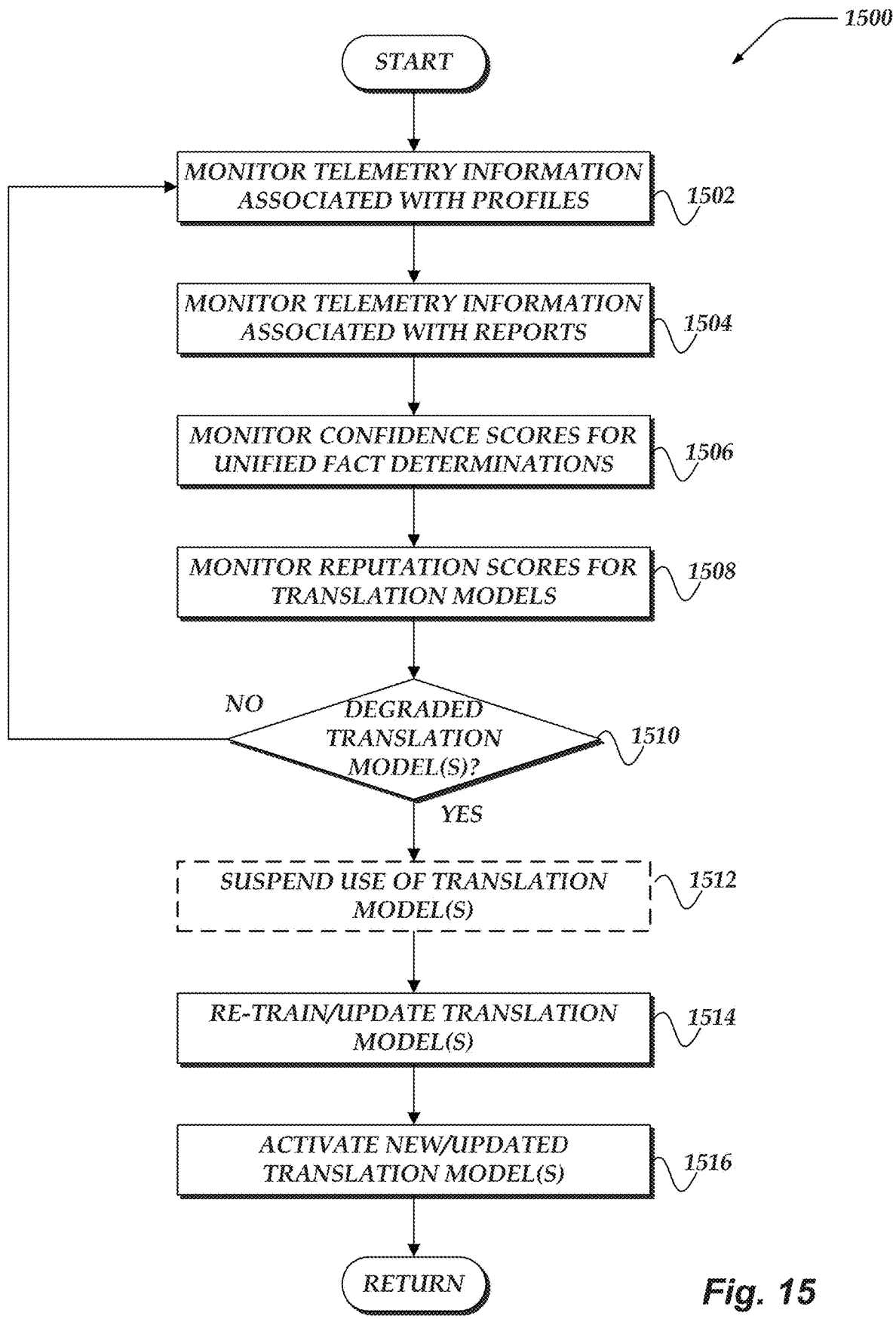
FIG. 15 illustrates a flowchart for a process for updating translation models based on user telemetry for a data ingestion platform in accordance with one or more of the various embodiments.

FIG. 15 illustrates a flowchart for process 1500 for updating translation models based on user telemetry for a data ingestion platform in accordance with one or more of the various embodiments. After a start block, at block 1502, in one or more of the various embodiments, a data ingestion platform may be arranged to monitor telemetry information associated with one or more profiles. As described above, one or more unified facts may be assembled in profiles that may be provided to various users depending on the type of profile or role of users.

Accordingly, in some embodiments, data ingestion platforms may be arranged to provide one or more facilities to collect direct feedback from one or more of the users that may interact with one or more profiles. For example, in some embodiments, user interfaces that display profiles may include controls that enable authorized users to grade one or more portions of a profile. Likewise, in some embodiments, a user interface may be provided to grade the entire profile.

In some embodiments, grades or scores may be binary (e.g., like/dislike), discrete (e.g., one-four stars, letter grades), continuous values, or the like.

Also, in one or more of the various embodiments, data ingestion platforms may be arranged to provide user interfaces that monitor how users employ profiles. In some embodiments, telemetry information employed to monitor user preferences may be based on monitoring user interactions with profiles as well as direct feedback. Accordingly, in some embodiments, profiles that may appear well-formed but are ignored or discarded by users may be inferred to be poorly received. For example, for some embodiments, if the top ranked profiles provided in response to a query, or the like, are ignored or lower ranked profiles are favored by users, it may be inferred that there may be a problem with the composition of the top ranked profiles for the current application.

Further, in some embodiments, the data ingestion platforms may be arranged to receive telemetry information from other services or applications. Accordingly, in one or more of the various embodiments, data ingestion platforms are not required to directly monitor activity associated with the profiles. For example, for some embodiments, profiles may be displayed to users via desktop computer applications, mobile applications, web-based applications, or the like. In some embodiments, such applications may collect the telemetry information and provide some or all it to data ingestion platforms rather than requiring the data ingestion platforms to include monitoring facilities on user-side applications.

At block 1504, in one or more of the various embodiments, the data ingestion platform may be arranged to monitor telemetry information associated with one or more reports. Similar to how telemetry may be generated for profiles, telemetry information for reports may be generated and monitored.

At block 1506, in one or more of the various embodiments, the data ingestion platform may be arranged to monitor confidence scores associated with unified fact determinations. In one or more of the various embodiments, as described herein, translation engines may associate confidence scores that represent the quality of match with unified fact values. Accordingly, in one or more of the various embodiments, data ingestion platforms may be arranged to monitor whether confidence scores for one or more types of unified facts or individual unified facts begin trending lower. Likewise, in some embodiments, unexpected changes or spikes in confidence scores may be detected. For example, if one or more translation models unexpectedly begins to produce maximum confidence scores (e.g., 100%) or minimum scores (e.g., 0%), this may be monitored and reported.

Also, in one or more of the various embodiments, user feedback associated with profiles, or reports may be monitored to determine if there may be positive or negative correlations with confidence scores. For example, in one or more of the various embodiments, negative user feedback associated with high confidence scores may be unexpected whereas negative user feedback associated with low confidence scores may be expected.

At block 1508, in one or more of the various embodiments, the data ingestion platform may be arranged to monitor reputation scores associated with translation models. As described herein, translation models may be associated with reputation scores that may represent the quality of confidence scores and results produced by the translation models. Accordingly, data ingestion platforms may monitor changes or trends in reputation scores for translation models.

At decision block 1510, in one or more of the various embodiments, if one or more degraded translation models may be determined, control may flow to block 1512; otherwise, control may loop back to block 1502. In one or more of the various embodiments, periodically or continuously, data ingestion platforms may be arranged to employ telemetry information to determine if one or more translation models may be degrading. In one or more of the various embodiments, evidence of degradation may include downward trending confidence scores, downward trending reputation scores, downward trending profile feedback, downward trending report feedback, or the like. Also, one of ordinary skill in the art will appreciate that there may be other metrics that may provide evidence of translation model degradation, such as, increasing or decreasing variability, changes in sensitivity, or the like.

In one or more of the various embodiments, translation models that were considered high performing may be become poorly performing overtime for a variety of reasons, such as, gradual changes in raw data, changes in user expectations, introduction of new data sources, or the like. Accordingly, in one or more of the various embodiments, automatic detection of translation model degradation enables data ingestion platforms to stay effective and current in the face of gradual or immediate changes to raw data. For example, for some embodiments, overtime universities may change or modify the language they use for course descriptions, student outcomes, demographic information, or the like.

In one or more of the various embodiments, data ingestion platforms may employ blanket rules, such as, determining any model having a reputation less than a defined threshold as being degraded. Likewise, in some embodiments, individual translation models or classes of translation models may be associated separate rules for determining if they may be degraded.

Further, in some embodiments, one or more administrators may be enabled to directly review telemetry information to identify translation models that may be degraded.

In one or more of the various embodiments, data ingestion platforms may be arranged to employ rules, instructions, conditions, or the like, provided via configuration information to make determinations whether a translation model may be performing poorly or otherwise may be degraded. Accordingly, in some embodiments, organizations may be enabled to tune performance expectations based on local consideration.

At block 1512, in one or more of the various embodiments, optionally, the data ingestion platform may be arranged to suspend to use of one or more translation models.

Note, this block may be optional because, in some embodiments, one or more translation models may remain in production until they may be replaced rather than automatically suspending the use of degraded translation models.

At block 1514, in one or more of the various embodiments, the data ingestion platform may be arranged to re-train or update the one or more degraded translation models that may be selected for re-training or updating. Alternatively, in one or more of the various embodiments, data ingestion platforms may be arranged to discard one or more degraded translation models rather than re-training or updating them.

At block 1516, in one or more of the various embodiments, the data ingestion platform may be arranged to activate one or more of the re-trained or updated translation models. Also, in some embodiments, one or more of the degraded translation models may be discarded or replaced. Accordingly, in one or more of the various embodiments, one or more of the replacement translation models may be activated to replace discarded degraded translation models. Next, in one or more of the various embodiments, control may be returned to a calling process.

Figure 16:
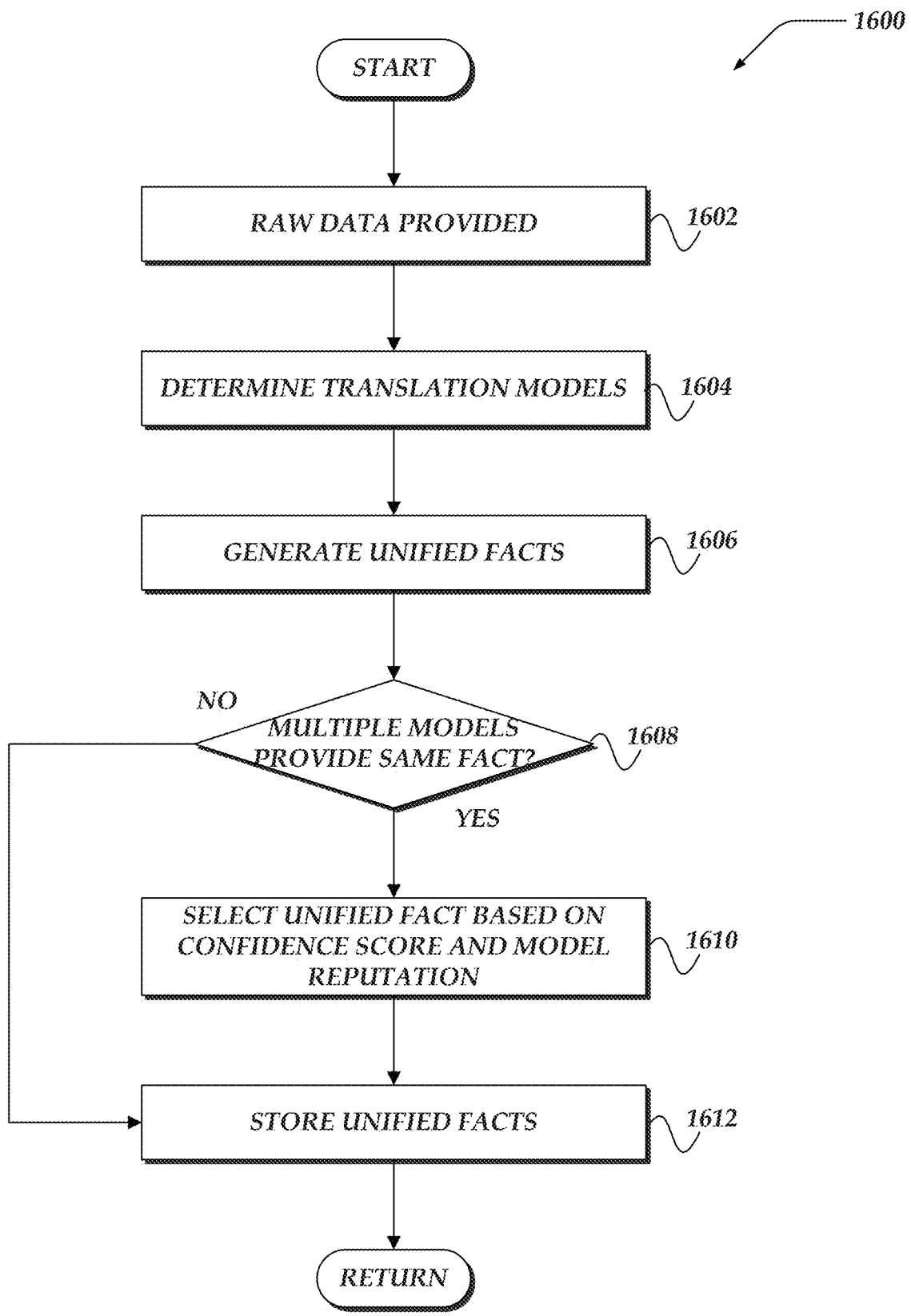
FIG. 16 illustrates a flowchart for a process for generating unified facts for a data ingestion platform in accordance with one or more of the various embodiments.

FIG. 16 illustrates a flowchart for process 1600 for generating unified facts for a data ingestion platform in accordance with one or more of the various embodiments. After a start block, at block 1602, in one or more of the various embodiments, raw data may be provided to a data ingestion platform. As described above, raw data provided from various data sources may be acquired and pre-processed or provided to an ingestion engine.

At block 1604, in one or more of the various embodiments, the data ingestion platform may be arranged to determine one or more translation models. As described above, one or more translation models may be determined for evaluating the raw data. In some embodiments, the translation models may be selected based on a categorization of the raw data. In some embodiments, one or more translation models may be arranged to determine if the raw data may be suitable for a given model.

At block 1606, in one or more of the various embodiments, the data ingestion platform may be arranged to generate one or more unified facts from the information included in the raw data. As described above, the translation engine may employ the selected translation models to determine one or more unified facts from information included in the raw data.

At decision block 1608, in one or more of the various embodiments, if multiple translation models provide the same unified fact, control may flow to block 1610; otherwise, control may flow to block 1612.

In one or more of the various embodiments, more than one translation model may be determined to be employed or executed to evaluate the same raw data. In some embodiments, different translation models may provide different values for the same unified fact. For example, in one or more of the various embodiments, translation model A may determine that the unified fact 'course name' is Calculus 3 and translation model B may determine that the 'course name' is Linear Algebra 2 from the same raw data.

At block 1610, in one or more of the various embodiments, the data ingestion platform may be arranged to select a unified fact from among the determined unified facts based on a confidence score or a reputation score associated with the translation models. As described above, each translation model that determines a unified fact may be arranged to associate a confidence score with the determined unified fact. However, in some embodiments, because translation models may be arranged to self-evaluate the produced results, the reputation score of the translation model may be employed to weight the confidence scores. For example, for some embodiments, if two translation models produce different results each with high confidence, the results produced by the translation model having a higher reputation score may be selected over translation models with lower reputation scores. In some embodiments, data ingestion platforms may determine the particular rule for selecting results based on confidence score and reputation scores based on rules, instructions, formulas, or the like, stored in configuration information. Accordingly, in some embodiments, different organizations may be enabled to adjust the relative weights of model confidence versus model reputation to meet local conditions. For example, for some embodiments, a selection score S may be defined by S=aC+ bR where C is the confidence score provided by the translation model and R is the reputation score of the translation model, and a and b are constants. Thus, in this example, the unified fact value associated with the higher selection score may be preferred.

Also, in one or more of the various embodiments, data ingestion platforms may be arranged to accept more than one value for the same unified fact. Accordingly, in one or more of the various embodiments, each value may be stored along with its selection score or confidence score. Thus, in some embodiments, applications that employ the unified facts may determine how the different unified fact values may be handled.

At block 1612, in one or more of the various embodiments, the data ingestion platform may be arranged to store the unified facts. In some embodiments, one or more of the selection score, confidence score, reputation score, or the like, may be stored with the unified fact to provide insight to downstream applications or services regarding the quality of the match that provided the unified fact value.

In one or more of the various embodiments, data ingestion platforms may be arranged to store more than one value for the same unified fact. Accordingly, in one or more of the various embodiments, each value may be stored along with its selection score or confidence score. Thus, in some embodiments, applications that employ the unified facts may determine how the different unified fact values may be handled.

Next, in one or more of the various embodiments, control may be returned to a calling process.

Figure 17:
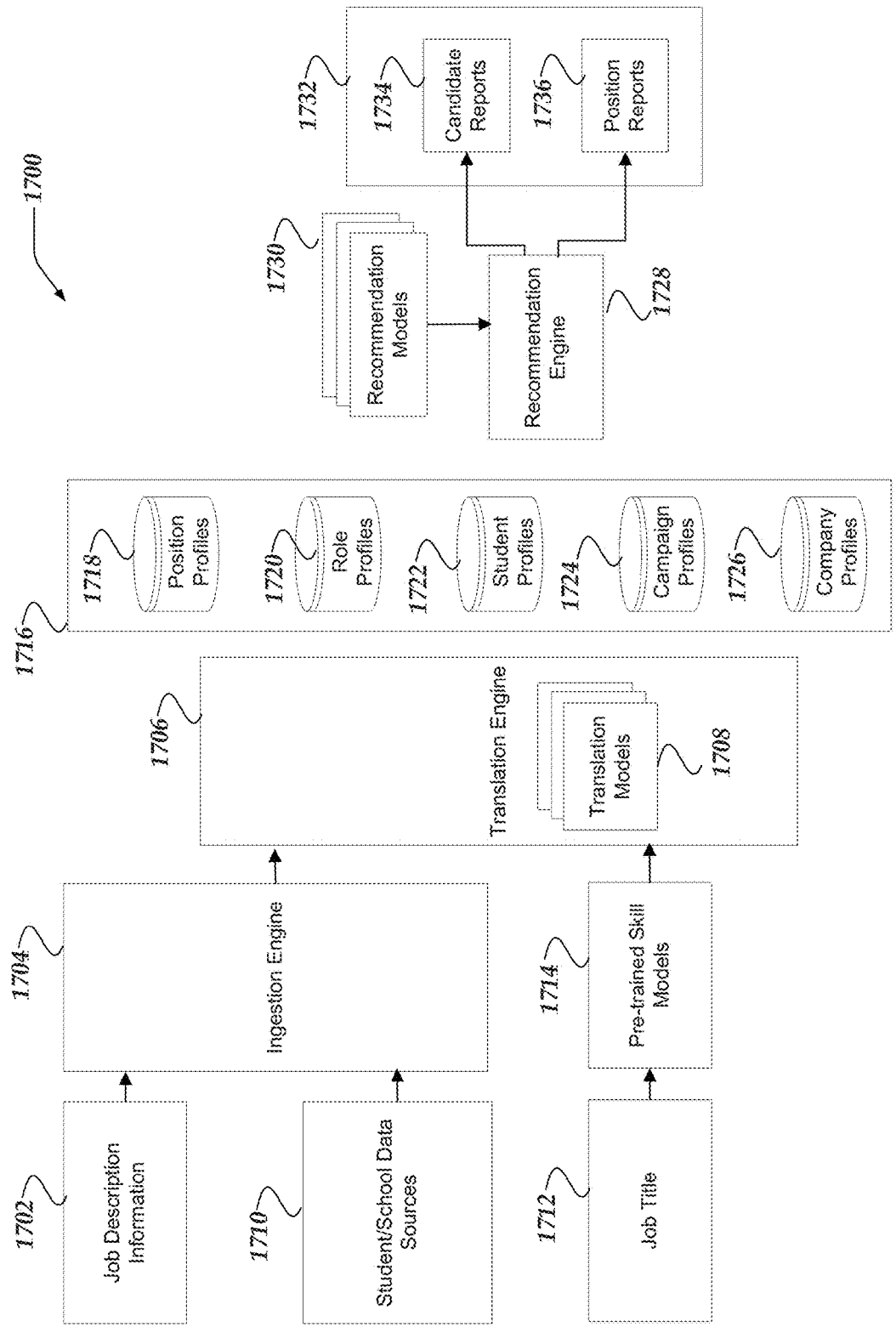
FIG. 17 illustrates a logical architecture of a system for correlating education programs and employment objectives in accordance with one or more of the various embodiments.

Illustrative Logical System Architecture for Correlating Education Programs and Employment Objectives FIG. 17 illustrates a logical architecture of system 1700 for correlating education programs and employment objectives in accordance with one or more of the various embodiments. In one or more of the various embodiments, system 1700 shows a portion of the sub-systems that may comprise a system for correlating education programs and employment objectives. One of ordinary skill in the art will appreciate that in some embodiments, one or more of the sub-systems shown here may be combined into larger sub-systems. Likewise, in some embodiments, one or more of the sub-systems may be included smaller sub-systems. In some embodiments, one or more of the sub-systems comprising system 1700 may be executed by one or more processes, services, or engines, such as, acquisition engine 322, ingestion engine 324, translation engine 326, recommendation engine 328, or the like.

Accordingly, in some embodiments, job description information, such as, job description information 1702 may be provided by one or more ingestion engines, such as, ingestion engine 1704, or the like. Likewise, in some embodiments, student information may be provided by various student/school data sources, such as student/school data sources 1710.

Further, in some embodiments, one or more sources of job titles, such as, job titles 1712 may be provided to one or more pre-trained skill models, such as, pre-trained skill models 1714. In one or more of the various embodiments, the pre-trained skill models may be arranged to determine one or more skills, traits, experience, or the like, that may be correlated with a job title or career type. Accordingly, in some embodiments, identified skills may be provided to translation engine 1706.

In some embodiments, after ingestion, job description information 1702 may be arranged to be provided to translation engine 1706. In some embodiments, job description information may be provided directly by employers. Also, in some embodiments, job description information may be provided by collecting publicly available information, as described above.

Similarly, in one or more of the various embodiments, student/school data sources may provide various personal or institutional data to ingestion engine 1704. Accordingly, in some embodiments, ingestion engine 1704 may provide the collected information to translation engine 1706.

Accordingly, in one or more of the various embodiments, translation engine 1706 may be arranged to employ translation models, such as, translation models 1708 along with one or more portions of the information provided by the various data sources to generate various position profiles, such as, (job) position profiles 1718, role profiles 1720, student profiles 1722, campaign profiles 1724, company profiles 1726, or the like.

In some embodiments, profiles generated by translation engines may be stored in one or more data stores. In some embodiments, data stores employed for storing profiles or profile information may be databases, key value stores, or the like, that enable profiles to be retrieved, updated, deleted, or the like.

In one or more of the various embodiments, recommendation engines, such as, recommendation engine 1728 may be arranged to employ one or more recommendation models, such as, recommendation models 1730 to correlate various profiles, such as, position profiles with student profiles. Accordingly, in one or more of the various embodiments, one or more correlation reports, such as, correlation reports 1732 may be provided. In some embodiments, one or more correlation reports, such as, candidate report 1734 may be arranged to at least include a list of one or more students that may be determined by the recommendation engine to be good candidates for a given employment position. Similarly, in some embodiments, one or more correlation reports, such as, position reports 1736 may be arranged to include a list one or more employment positions that may be determined by the recommendation engine to good opportunities for a given student.

Generalized Operations for Correlating Education Programs and Employment Objectives FIGS. 18-26 represent generalized operations for correlating education programs and employment objectives in accordance with one or more of the various embodiments. In one or more of the various embodiments, processes 1800, 1900, 2000, 2100, 2200, 2300, 2400, 2500, and 2600 described in conjunction with FIGS. 18-26 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 18-26 may perform actions for correlating education programs and employment objectives in accordance with at least one of the various embodiments or architectures such as those described in conjunction with FIGS. 4-6 or FIG. 17. Further, in one or more of the various embodiments, some or all of the actions performed by processes 1800, 1900, 2000, 2100, 2200, 2300, 2400, 2500, and 2600 may be executed in part by acquisition engine 322, ingestion engine 324, translation engine 326, recommendation engine 328, or the like.

Figure 18:
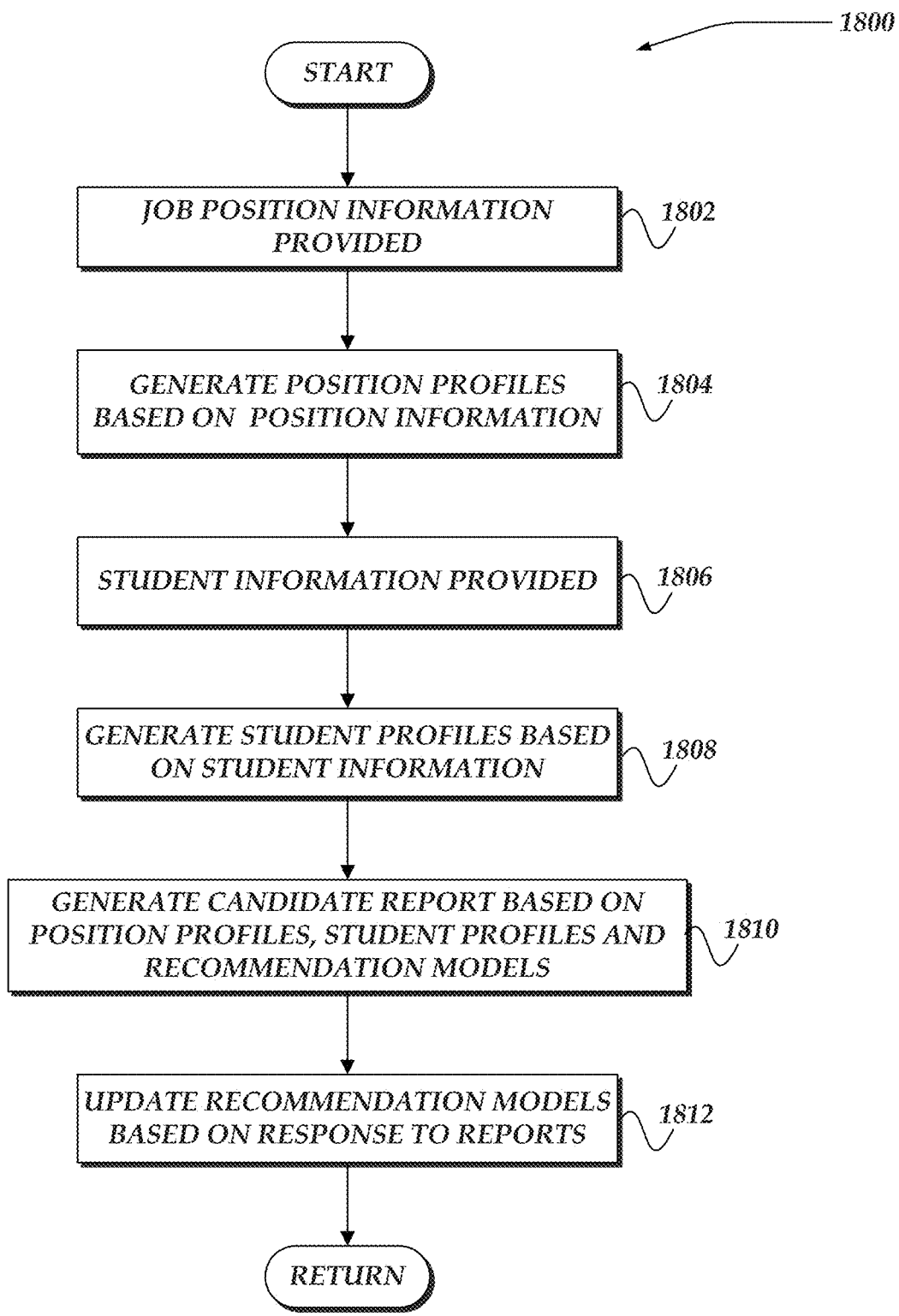
FIG. 18 illustrates an overview flowchart for a process for correlating education programs and employment objectives in accordance with one or more of the various embodiments.

FIG. 18 illustrates an overview flowchart for process 1800 for correlating education programs and employment objectives in accordance with one or more of the various embodiments. After a start block, at block 1802, in one or more of the various embodiments, job position information may be provided via an ingestion engine. As described above, job position information may be provided by direct integration with one or more employers or employer representatives. Likewise, in some embodiments, job position information may be provided via public sources, including job postings, or the like. For example, see the description for FIG. 4, or the like.

At block 1804, in one or more of the various embodiments, the translation engine may be arranged to generate position profiles based on the position information. As described above, in some embodiments, translation engines may be arranged to map disparate text information included in job descriptions to a unified ontology that may effectively normalize concepts included in job descriptions. However, in some embodiments, additional sources of information provided from other sources, such as, government publications, or the like, may be employed to generate the position profiles. For example, job description information provided by employers may omit employee compensation information, or the like. Accordingly, in this example, information collected from government labor departments, labor agencies, or the like, may be employed to determine national or regional compensation ranges or averages.

In one or more of the various embodiments, translation engines may be arranged to map or translate position information to a unified schema to generate one or more unified facts that may be included in the position profiles.

At block 1806, in one or more of the various embodiments, student information may be provided via the ingestion engine. As described above, in some embodiments, various sources, including, colleges, individual students, may provide student information. In some embodiments, student information may include information associated with individual students, such as, course history, transcripts, degree type, degree progression, major concentration, or the like.

As described above, in some embodiments, ingestion engines may be arranged to directly integrate with colleges or other education institutions to enable sensitive information to be provided or managed. As mentioned above, in some embodiments, some student information may be considered subject information. Accordingly, in some embodiments, subject identifiers associated with individual students may be generated and associated with student information.

At block 1808, in one or more of the various embodiments, the translation engine may be arranged to generate student profiles based on the provided student information.

Further, in some embodiments, similar to position information, translation engines may be arranged to map or translate student information to conform with the unified schema.

At block 1810, in one or more of the various embodiments, a recommendation engine may be arranged to generate one or more candidate reports based on the position profiles, student profiles, recommendation models, or the like.

In one or more of the various embodiments, recommendation engines may be arranged to generate reports for users that identify one or more students that may match or fit the jobs of an employer. In some embodiments, recommendation engines may be arranged to automatically generate candidate reports. In some embodiments, automatically generated candidate reports may be displayed in graphical user interfaces, including dashboards, or the like.

Alternatively, in some embodiments, candidate reports may be generated on demand based on filters or other parameters provided by users. However, in some embodiments, recommendation engines may be arranged to highlight one or more high qualified candidates that may be excluded by manually supplied filters. Accordingly, in some embodiments, if there may be a mismatch in a user's perception of the characteristics of qualified candidates and otherwise highly qualified candidates (as determined by the recommendation engine), portions of candidate reports may be arranged to include or otherwise highlight one or more these mismatches.

Also, in some embodiments, translation engines may be arranged to continuously or periodically update profiles as new or updated source information may be collected or discovered. Accordingly, in some embodiments, candidate reports may be similarly updated as profiles may be updated.

At block 1812, in one or more of the various embodiments, the recommendation engines may be arranged to update one or more recommendation models based on responses or activity that may be associated with the one or more correlation reports. In one or more of the various embodiments, recommendation engines may be arranged to monitor user or student activity associated with profiles or candidate reports. In some embodiments, the monitored activity may be direct feedback or grading provided by users. Also, in some embodiments, recommendation engines may be arranged to passively monitor how users interact with candidate reports to evaluate the quality of the candidate recommendations. For example, in some embodiments, if users disregard or otherwise ignore candidates that are scored or ranked highly, it may indicate that the recommendation models that recommended the ignored candidates require updating, modification, re-training, or the like.

Next, in one or more of the various embodiments, control may be returned to a calling process.

Figure 19:
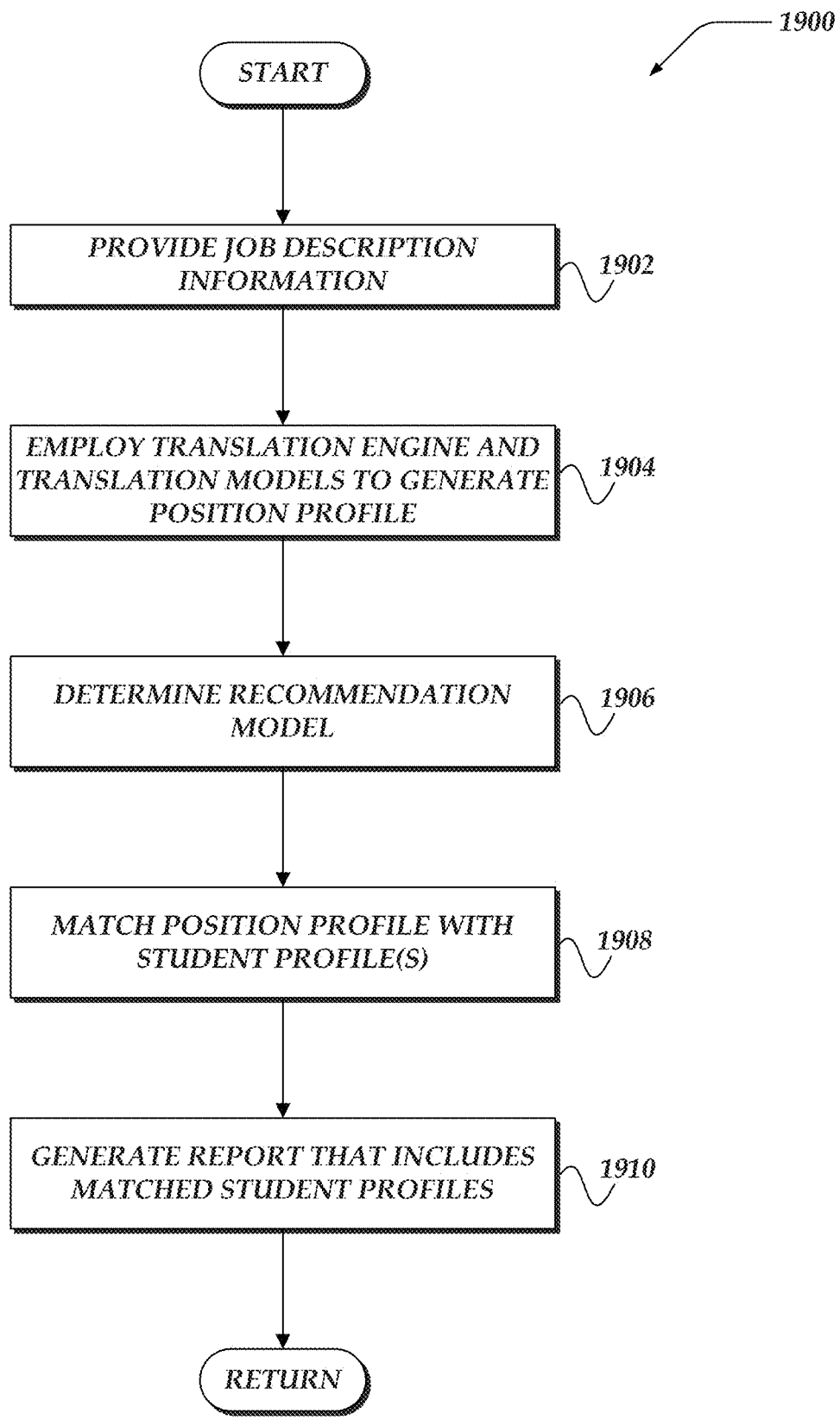
FIG. 19 illustrates a flowchart for a process for correlating education programs and employment objectives in accordance with one or more of the various embodiments.

FIG. 19 illustrates a flowchart for process 1900 for correlating education programs and employment objectives in accordance with one or more of the various embodiments. After a start block, at block 1902, in one or more of the various embodiments, job description information (e.g., position information) may be provided via an ingestion engine. As described above, position information may be provided from various sources, such as, employers, public sources, government agencies, or the like.

In one or more of the various embodiments, position information may be continuously provided as positions become available or employers enroll with profile correlation systems.

At block 1904, in one or more of the various embodiments, the translation engine may be arranged to employ one or more translation models to generate a position profiles based on the provided position information. As described above, position information collected by ingestion engines may be translated into unified facts that may be included in position profiles.

In one or more of the various embodiments, translation engines may be arranged to select one or more translation models based on the type of position information being processed. For example, in one or more of the various embodiments, job descriptions may be translated into unified facts using one or more translation models while job titles may be translated into unified facts using one or more other translation models.

Accordingly, in some embodiments, translation engines may be arranged to employ one or more heuristics, or the like, to select one or more translation models for the position information. In some embodiments, one or more translation models themselves may be arranged to accept or reject position information. Thus, in some embodiments, translation models may be arranged to include built-in rules or heuristics to determine if they may be capable of translating the position information.

In some embodiments, upstream categorization engines may be arranged to label or tag position information based on one or more categorization models. Accordingly, in some embodiments, translation engines may be arranged to employ the category labels to determine translation models for translating the position information. Accordingly, in some embodiments, translation engines may be arranged to employ rules, instructions, or the like, provided via configuration information to account for local circumstances or local requirements.

In one or more of the various embodiments, translation engines may be arranged to generate position profiles based on the currently available position information. As additional position information may be provided, translation engines may update or modify existing position profiles based on the combination of the existing profile attributes or the additional position information.

In one or more of the various embodiments, translation engines may be arranged to employ position profile templates to determine the attributes that may be included in position profiles. In some embodiments, one or more attributes may be designated as critical or non-optional such that position profiles missing values for the non-optional attributes may be considered incomplete or otherwise unavailable for use by recommendation engines, or the like. In one or more of the various embodiments, translation engines may be arranged to employ rules, templates, or the like, provided via configuration information to account for local circumstances or local requirements.

At block 1906, in one or more of the various embodiments, the recommendation engine may be arranged to determine one or more recommendation models. Similar to how translation models may be determined, recommendation engines may be arranged to determine one or more recommendation models for matching position profiles with student profiles. In some embodiments, recommendation engines may be arranged to continuously match position profiles and student profiles as relevant information may be provided via ingestion engines.

Also, in one or more of the various embodiments, recommendation engines may be arranged to respond to queries that may be triggered or otherwise initiated by users, including employer representatives, educational institution representatives, students, or the like.

At block 1908, in one or more of the various embodiments, the recommendation engine may be arranged to attempt to match the position profile with one or more student profiles. In one or more of the various embodiments, the one or more recommendation models may be employed to generate match scores that may be associated with how well a given student profile may correlate with a given position profile.

At block 1910, in one or more of the various embodiments, the recommendation engine may be arranged to generate a report that include the student profiles that matched with the position profile. In one or more of the various embodiments, recommendation engines may be arranged to generate candidate reports that show one or more student candidates matched with positions. Likewise, in some embodiments, recommendation engines may be arranged to generate position reports that show one or more positions that match with a student. In some embodiments, matches may be shown in reports using ranked order based on matches. In some embodiments, user interface features or typography may be included reports to emphasize or highlight matches the meet one or more conditions. In some embodiments, the particular report format or presentation may include based on templates, conditions, sort rules, threshold value, localization information, or the like, provided via configuration information to account for local circumstances or local requirements.

Next, in one or more of the various embodiments, control may be returned to a calling process.

Figure 20:
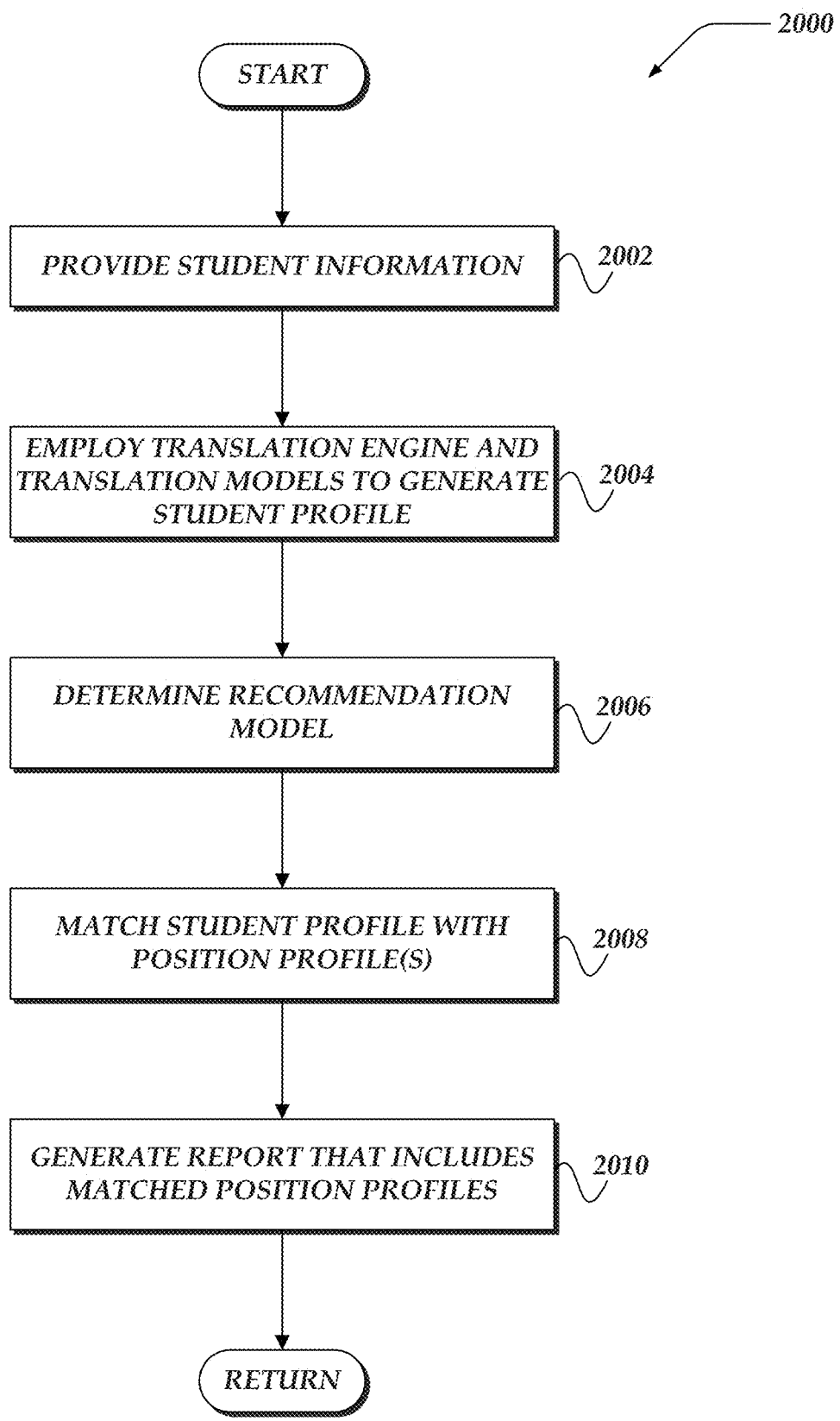
FIG. 20 illustrates a flowchart for a process for correlating education programs and employment objectives in accordance with one or more of the various embodiments.

FIG. 20 illustrates a flowchart for process 2000 for correlating education programs and employment objectives in accordance with one or more of the various embodiments. After a start block, at block 2002, in one or more of the various embodiments, student information may be provided via an ingestion engine. As described above, student information may be provided from various sources, such as, educational institutions, the students, public sources, or the like.

In one or more of the various embodiments, student information may be continuously provided as students progress through their educational career. In some embodiments, student information associated with post-educational activities may be collected as well. In some embodiments, such information may be provided by the student (e.g., former student), employers of the student, public sources, or the like.

At block 2004, in one or more of the various embodiments, the translation engine may be arranged to employ one or more translation models to generate a student profile based on the provided student information. As described above, student information collected by ingestion engines may be translated into unified facts (e.g., subject facts or non-subject facts) that may be included in student profiles.

In one or more of the various embodiments, translation engines may be arranged to select one or more translation models based on the type of student information being processed. For example, in one or more of the various embodiments, student resumes may be translated into unified facts using one or more translation models while student transcripts may be translated into unified facts using one or more other translation models.

Accordingly, in some embodiments, translation engines may be arranged to employ one or more heuristics, or the like, to select one or more translation models for the student information. In some embodiments, one or more translation models themselves may be arranged to accept or reject student information. Thus, in some embodiments, translation models may be arranged to include built-in rules or heuristics to determine if they may be capable of translating the student information.

In some embodiments, upstream categorization engines may be arranged to label or tag student information based on one or more categorization models. Accordingly, in some embodiments, translation engines may be arranged to employ the category labels to determine translation models for translating the student information. Accordingly, in some embodiments, translation engines may be arranged to employ rules, instructions, or the like, provided via configuration information to account for local circumstances or local requirements.

In one or more of the various embodiments, translation engines may be arranged to generate student profiles based on the currently available student information. As additional student information may be provided, translation engines may update or modify existing student profiles based on the combination of the existing profile attributes or the addition student information.

In one or more of the various embodiments, translation engines may be arranged to employ student profiles templates to determine the attributes that may be included in student profiles. In some embodiments, one or more attributes may be designated as critical or non-optional such that student profiles missing values for the non-optional attributes may be considered incomplete or otherwise unavailable for use by recommendation engines, or the like. In one or more of the various embodiments, translation engines may be arranged to employ rules, templates, or the like, provided via configuration information to account for local circumstances or local requirements.

At block 2006, in one or more of the various embodiments, the recommendation engine may be arranged to determine one or more recommendation models. Similar to how translation models may be determined, recommendation engines may be arranged to determine one or more recommendation models for matching student profiles with position profiles. In some embodiments, recommendation engines may be arranged to continuously match student profiles and position profiles as relevant information may be provided via ingestion engines.

Also, in one or more of the various embodiments, recommendation engines may be arranged to respond to queries that may be triggered or otherwise initiated by users, including employer representatives, educational institution representatives, students, or the like.

At block 2008, in one or more of the various embodiments, the recommendation engine may be arranged to attempt to match the student profile with one or more position profiles. In one or more of the various embodiments, the one or more recommendation models may be employed to generate match scores that may be associated with how well a given student profile may correlate with a given position profile.

At block 2010, in one or more of the various embodiments, the recommendation engine may be arranged to generate a report that include the position profiles that matched with the student profile. In one or more of the various embodiments, recommendation engines may be arranged to generate candidate reports that show one or more student candidates matched with positions. Likewise, in some embodiments, recommendation engines may be arranged to generate position reports that show one or more positions that match with a student. In some embodiments, matches may be shown in reports using ranked order based on matches. In some embodiments, user interface features or typography may be included reports to emphasize or highlight matches the meet one or more conditions. In some embodiments, the particular report format or presentation format may include based on templates, conditions, sort rules, threshold value, localization information, or the like, provided via configuration information to account for local circumstances or local requirements.

Next, in one or more of the various embodiments, control may be returned to a calling process.

Figure 21:
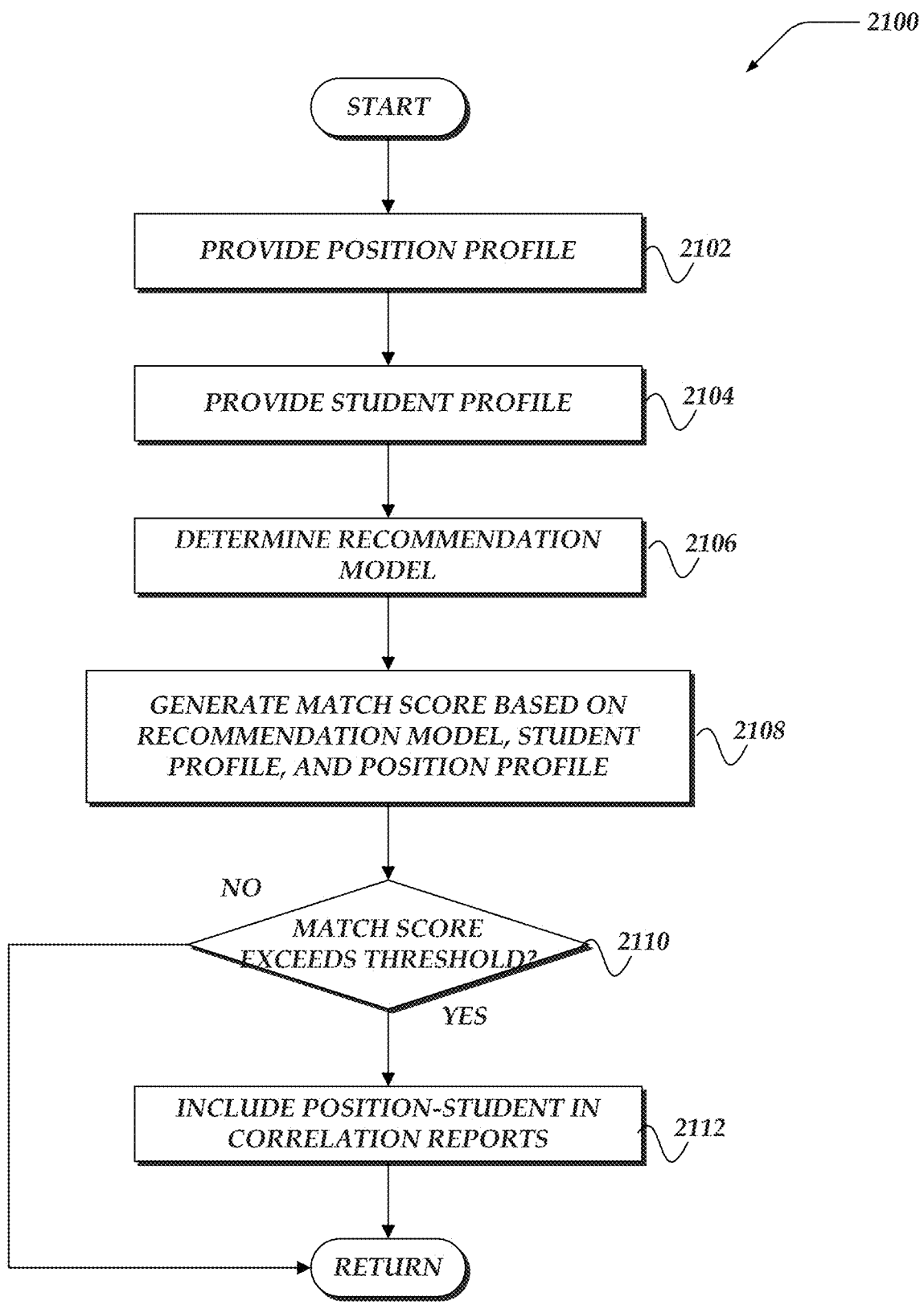
FIG. 21 illustrates a flowchart for a process for correlating education programs and employment objectives in accordance with one or more of the various embodiments.

FIG. 21 illustrates a flowchart for process 2100 for correlating education programs and employment objectives in accordance with one or more of the various embodiments. After a start block, at block 2102, in one or more of the various embodiments, a position profile may be provided. As described above, position profiles represent positions, such as, employment opportunities offered by employers. In some embodiments, each position profile corresponds to at least one employment position.

In one or more of the various embodiments, similar to other profiles (.e.g., student profiles, role profiles, campaign profiles, or the like) position profiles may be comprised of one or more fields or attributes comprised of or based on one or more unified facts derived from ingested data. In some embodiments, position profiles may be based on data provided from various sources, such as, job descriptions, government labor information, or the like.

In one or more of the various embodiments, data structures representing position profiles may conform to the requirements of the recommendation engine or one or more recommendation models. In some embodiments, translation engines or recommendation engines may be arranged to transform position profile data structures to different forms or shapes to conform to requirements of recommendation engines or recommendation models. Further, in some embodiments, some recommendation models may consume some portions of a position profile while other recommendation models may be arranged to consume other portions of a position profile.

At block 2104, in one or more of the various embodiments, a student profile may be provided. As described above, student profiles may be generated based on ingested data, student feedback, telemetry metrics, or the like. Generally, in some embodiments, student profiles may be considered similar to position profiles in that they may be comprised of one or more fields or attributes comprised of or based on one or more unified facts derived from ingested data.

At block 2106, in one or more of the various embodiments, the recommendation engine may be arranged to determine a recommendation model. In one or more of the various embodiments, recommendation engine may be arranged to employ heuristics, classifiers, rules, or the like, to select one or more recommendation models that may be employed to determine if a student may be recommended for position or if a position may be recommended to a student.

In one or more of the various embodiments, a selected recommendation model may be an ensemble model comprised of two or more sub-models. For example, a recommendation model may include one or more models that evaluate the quality of the position (or employer) from the point of view of the student and one or more other models that evaluate the quality of the student from the point of the position (or employer). Likewise, in some embodiments, ensemble recommendation models may include sub-models that target different diminutions of a 'good' match, such as, skills match, personality match, life/career goals match, or the like.

Further, in some embodiments, recommendation models may include sub-models that evaluate or compare a student or position based on historical information associated with prior matches or prior outcomes. Accordingly, in one or more of the various embodiments, comparison against past trends may be employed to identify outliers or coerce some results in one direction or the other based on the comparison to previous successful (or unsuccessful recommendations).

As described throughout, models, such as, recommendation models, translation models, or the like, may be based in whole or in part on configuration information that enables models to automatically or manually adapted to account different circumstances. Thus, in some embodiments, different models may be included to accommodate changes in data trends, career goals, employment landscape, employers needs, student populations, or the like. Also, in one or more of the various embodiments, one or more experimental models may be introduced to compare with established models. Likewise, in some embodiments, overtime the performance one or more models (e.g., recommendation models, or otherwise) may degrade such that they may be removed or retired.

At block 2108, in one or more of the various embodiments, the recommendation engine may be arranged to generate a match score based on the recommendation model, the student profile, the position profile, or the like. In one or more of the various embodiments, recommendation engines may be arranged to provide the student profile and position profile to a recommendation model to generate a match result or match score that represents a quality of match. As described above, recommendation models may be comprised of heuristics as well as one or more sub-models arranged to provide match score that represents if a student or position may be a good match.

In one or more of the various embodiments, match scores may be comprised of one or more scalar values, vectors, discrete values, strings/labels, tuples, or the like, or combination thereof. However, for brevity and clarity match scores may be referred to herein as single scalar values even though one of ordinary skill in the art will appreciate that match scores may be comprised of simple or complex data structures, vectors, tuples, scalar, or the like.

Further, in some embodiments, recommendation engines may be arranged to associate confidence scores or quality scores with one or more recommendation models. Accordingly, in some embodiments, recommendation engines may be arranged to weight or modify match scores based on the confidence scores or quality scores associated with a recommendation model. For example, in some embodiments, recommendation engines may be arranged to modify match scores based on telemetry information that indicates users are ignoring high score match results produced by a recommendation model. Thus, in this example, the influence of models that provide high match scores that users ignore may be reduced by reducing a quality score associated with those models that produce results users tend to ignore.

Also, in one or more of the various embodiments, educational institutions, employers, or the like, may have local or unique requirements that may not be expressly represented or reflected by current recommendation models. Accordingly, in some embodiments, recommendation engines may be arranged to employ heuristics, rules, instructions, or the like, provided via configuration information to account for such circumstances. For example, in one or more of the various embodiments, an employer may have a requirement that candidates for a particular position, such as, citizenship status, immigration/visa status, criminal history, or the like. Accordingly, in some embodiments, recommendation engines may be arranged to employ configuration information to provide for such circumstances.

Similarly, in some embodiments, recommendation engines may be arranged to enable students to define preferences, hard requirements, or the like, that may be employed to filter correlation (match) results. Accordingly, in some embodiments, recommendation engines may be arranged to obtain such requirement information or filters from configuration information.

At decision block 2110, in one or more of the various embodiments, if the match score exceeds a defined threshold value, control may flow block 2112; otherwise, control may be returned to a calling process. In one or more of the various embodiments, one or more recommendation models may be associated with threshold value that represent the quality of the match of a student and a position.

At block 2112, in one or more of the various embodiments, the recommendation engine may be arranged to include correlation information associated with the position profile or the student profile in one or more correlation reports. In some embodiments, correlation reports generated for employers may include rank ordered lists of student candidates for a given position. Likewise, in some embodiments, correlation report generated for students may include rank ordered lists of position or employers.

Next, in one or more of the various embodiments, control may be returned to a calling process.

Figure 22:
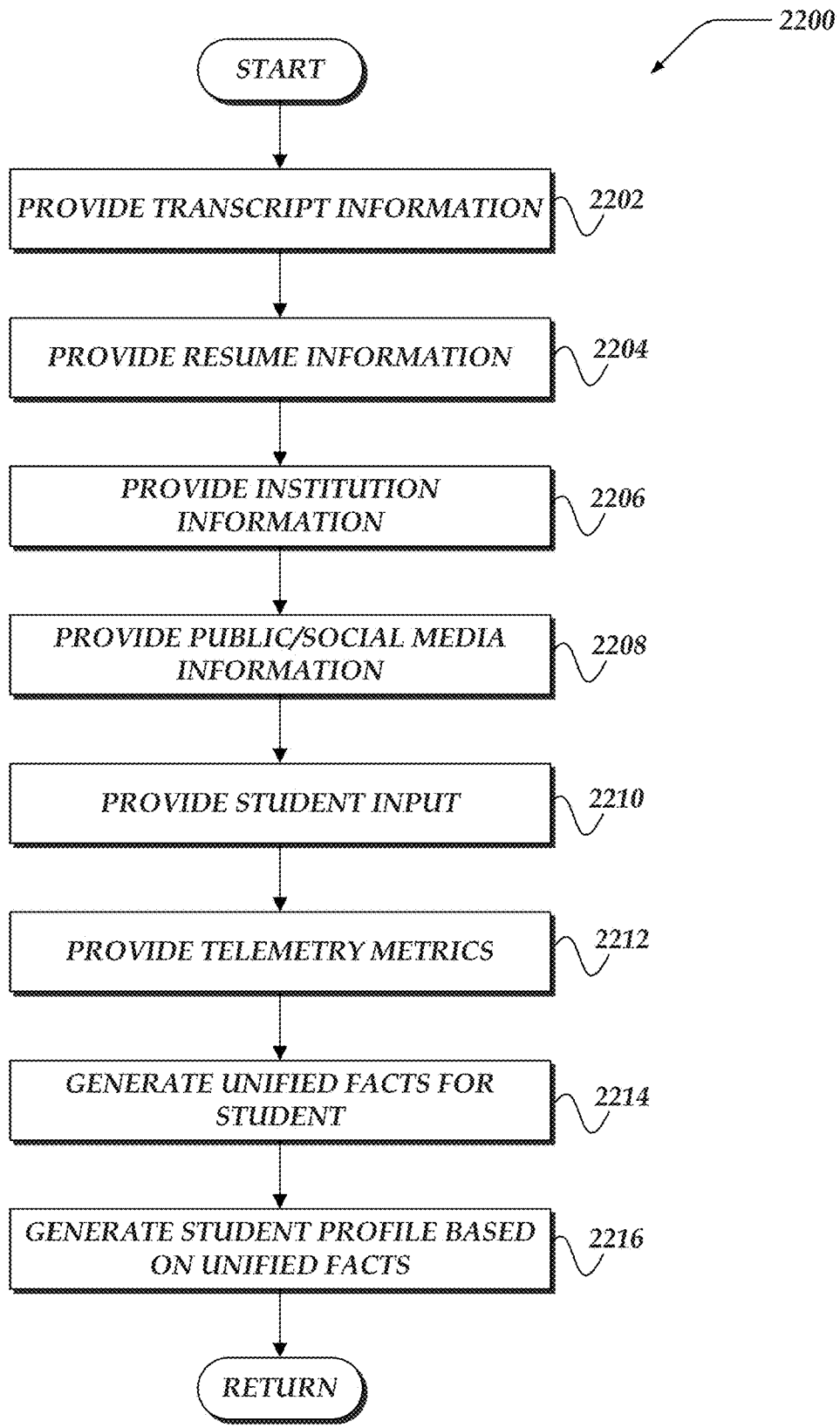
FIG. 22 illustrates a flowchart for a process for generating student profiles for correlating education programs and employment objectives in accordance with one or more of the various embodiments.

FIG. 22 illustrates a flowchart for process 2200 for generating student profiles for correlating education programs and employment objectives in accordance with one or more of the various embodiments. After a start block, at block 2202, in one or more of the various embodiments, an ingestion engine, or the like, may provide transcript information associated with a translation engine. As described above, ingestion engines may be arranged to collect student transcript information from one or more educational institutions. In some embodiments, transcript information may be collected if a student enrolls the system. Alternately, in some embodiments, some educational institutions may automatically provide transcript information for all students.

At block 2204, in one or more of the various embodiments, the ingestion engine may be arranged to provide resume information associated with the student. In some embodiments, students may be enabled to enroll in the system directly or via their educational institution. In some embodiments, ingestion engines may be arranged to provide user interfaces that enable students to upload their resume. In some embodiments, student resumes may be provided from a resume repository maintained or associated with their educational institution. Further, in some embodiments, student resume information may be provided via documents that may be scanned or parsed by the ingestion engines. Also, in some embodiments, user interfaces that enable student resumes to be uploaded may be arranged to include one or more fields that may be employed to supplement or annotate the uploaded resumes.

At block 2206, in one or more of the various embodiments, the ingestion engine may be arranged to institutional information to the translation engine. In one or more of the various embodiments, educational institution information may include specific information about students that may not be included in transcript information. For example, in some embodiments, this information may include, club memberships, awards or discipline information omitted from transcripts, or the like.

In some embodiments, institutional information may include aggregate statistics that may be associated with the student body, alumni, admission information (e.g., test scores, demographic information, or the like), number of graduating student, majors/course of study information, financial aid information, or the like.

At block 2208, in one or more of the various embodiments, the ingestion engine may be arranged to provide publicly accessible information, social media information, or the like, that may be associated with students, institutions, one or more employers, one or more industries, labor market information, or the like, to the translation engine.

At block 2210, in one or more of the various embodiments, student input may be provided to translation engine. In one or more of the various embodiments, translation engines may be arranged to provide user interfaces (e.g., websites, mobile phone apps, or the like) that enable users, including students, to provide information directly to the translation engine. Also, in one or more of the various embodiments, translation engines may be arranged to enable students to edit, correct, or remove one or more portions of the information associated with them. In some embodiments, some portions of student information may be unavailable or restricted from being modified by a student, such as, transcript information, or the like. However, in some embodiments, translation engines may be arranged to enable students to submit requests if they believe one or more portions of their information may be incorrect.

Further, in some embodiments, student input may include additional information collected via online surveys, telephonic surveys, or the like.

At block 2212, in one or more of the various embodiments, one or more telemetry based metrics may be arranged to be provided to the translation engine. In one or more of the various embodiments, telemetry based metrics may include metrics associated with user engagement. In one or more of the various embodiments, telemetry metrics may be based on observing how or how often users may interact with websites, website regions or controls, applications, or the like.

For example, in some embodiments, recommendation engines may generate interactive reports that include a rank ordered list of student candidates. Accordingly, measuring how the employers interact with the list may indicate the quality of the recommendation models that were used to generate the list. For example, if an employer often selects or interacts with lower ranked candidates over higher ranked candidates, the recommendation models that generated the list may be de-ranked or otherwise selected for review.

Likewise, in some embodiments, if students may be provided interactive reports that include lists of rank ordered job opportunities, monitoring how students interact with the opportunities may provide insight into the quality of the recommendation models that may have employed to generate or sort the list of job opportunities.

At block 2214, in one or more of the various embodiments, the translation engine may be arranged to generate one or more unified facts for the student based on the provided information. As described above, translation engines may be arranged to employ one or more translation models to generate unified facts for students.

At block 2216, in one or more of the various embodiments, the translation engine may be arranged to generate a student profile for the student based on the one or more unified facts. In one or more of the various embodiments, student profiles may be based on some or all of the unified facts based on the collected information. As described above, one or more translation models may be directed to generating student profiles from unified facts. In one or more of the various embodiments, translation engines may be arranged to generate student profiles based one or more rules, one or more templates, or the like, provided via configuration information to account for local circumstances or local requirements.

Next, in one or more of the various embodiments, control may be returned to a calling process.

Figure 23:
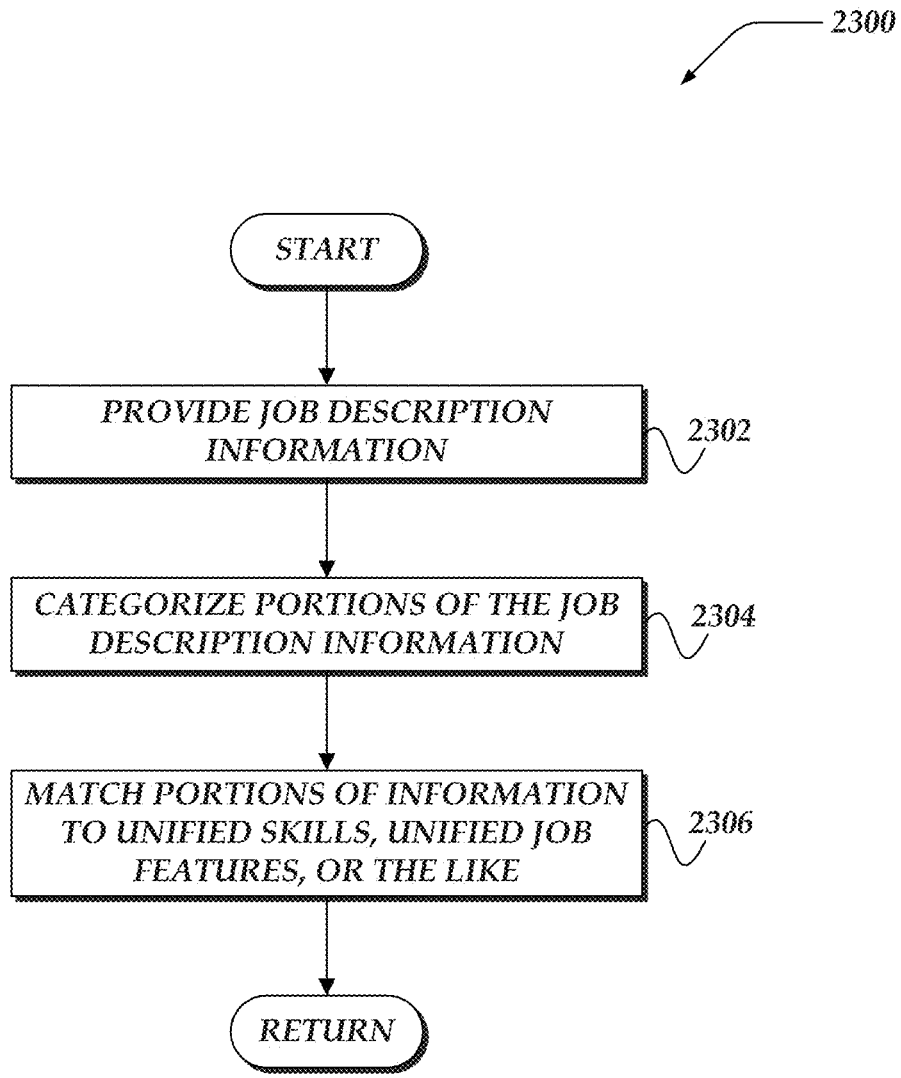
FIG. 23 illustrates a flowchart for a process for extracting information from job descriptions for correlating education programs and employment objectives in accordance with one or more of the various embodiments.

FIG. 23 illustrates a flowchart for process 2200 for extracting information from job descriptions for correlating education programs and employment objectives in accordance with one or more of the various embodiments. After a start block, at block 2302, in one or more of the various embodiments, an ingestion engine, or the like, may provide job description information associated with an employment position, or the like. As described above, the job description information may be information describing one or more positions that an employer may be seeking to fill. In one or more of the various embodiments, job description information may not be strictly associated with jobs or employment. In some cases, for some embodiments, job description information may be generally considered position description information rather than being limited to employment opportunities.

At block 2304, in one or more of the various embodiments, the translation engine may be arranged to categorize one or more portions of the job description information. In one or more of the various embodiments, job description information may include various commonly used sections or parts, such as, title, narrative description, skills/qualifications, compensations, or the like.

In some embodiments, one or more translation models may include one or more heuristics or trained machine-learning models to determine the different portions of the job description. Accordingly, in one or more of the various embodiments, one or more translation models that may be directed or trained for the different portions or sections may be employed to extract information from the job description information.

At block 2306, in one or more of the various embodiments, the translation engine may be arranged to match one or more portions of the job description information to one or more unified facts, such as, unified skills, unified job features, or the like. In some embodiments, translating free form job descriptions into unified facts, such as, unified job or position features enables position profiles (e.g., job profiles) to be generated using the unified facts rather the ad-hoc/free form text descriptions that may be included the job description information.

Next, in one or more of the various embodiments, control may be returned to a calling process.

Figure 24:
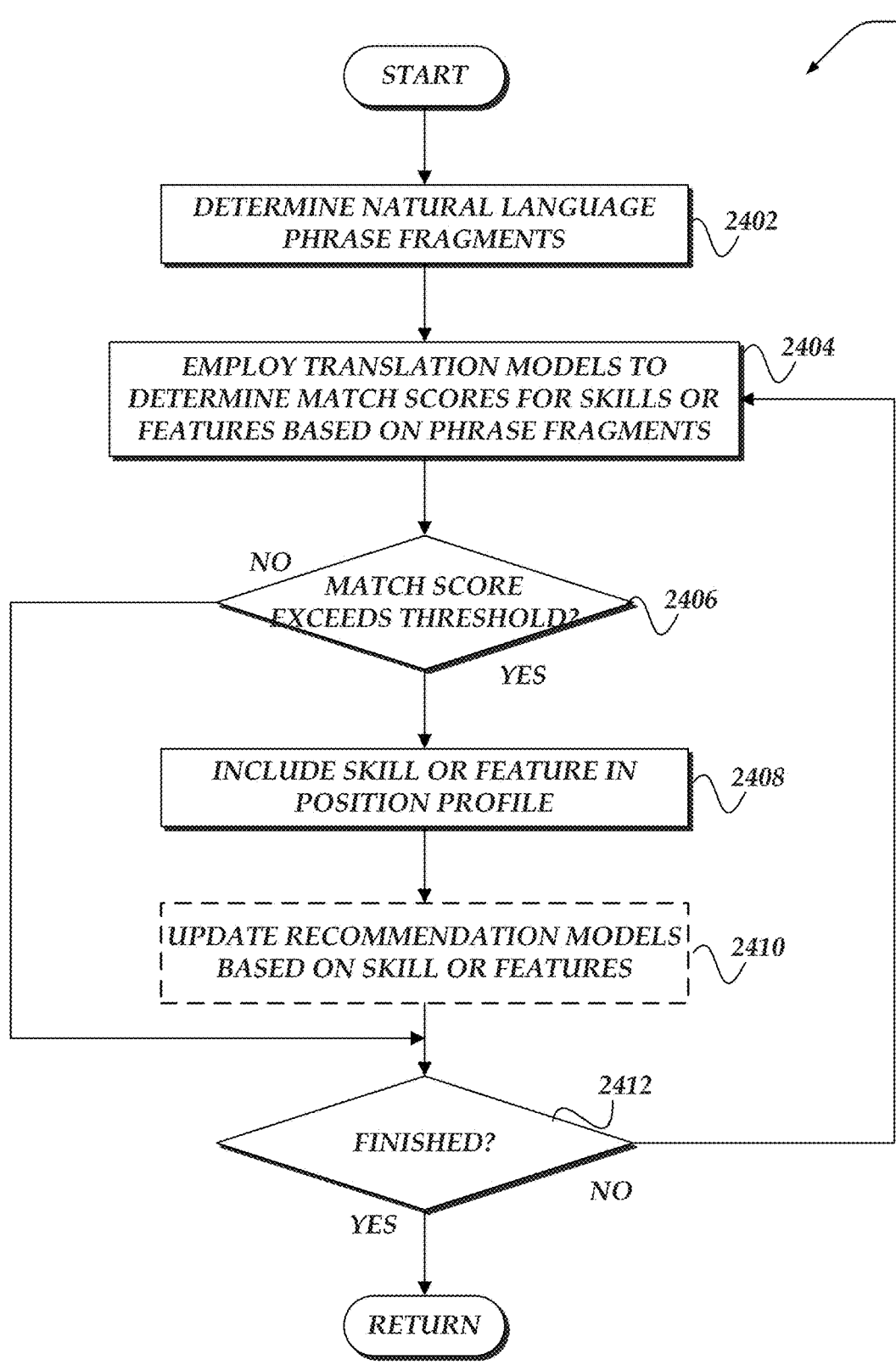
FIG. 24 illustrates a flowchart for a process for extracting information from job descriptions for correlating education programs and employment objectives in accordance with one or more of the various embodiments.

FIG. 24 illustrates a flowchart for process 2400 for extracting information from job descriptions for correlating education programs and employment objectives in accordance with one or more of the various embodiments. After a start block, at block 2402, in one or more of the various embodiments, a translation engine may be arranged to extract one or more natural language phrase fragments from job description information. As described above, in some embodiments, ingestion engines may provide job description information that may include many details regarding a given employment position.

In one or more of the various embodiments, job description information may be provided by various employers in a variety of formats. In some embodiments, employers may provide some or all job description information using a well-known (or custom) structured data entry process that may simplify the translation of job description information to unified facts. However, in many cases, job description information may be based on various lexicons that may be unique to a given industry, region, or the like. Further, in some embodiments, such lexicons may be local to a given organization. Accordingly, in some embodiments, to enable recommendation models to match students or employment positions across various lexicons, translation engines may be arranged to map job description information lexicons to unified facts.

At block 2404, in one or more of the various embodiments, the translation engine may be arranged to employ one or more translation models to determine match scores for one or more skills or one or more features associated with the position based on the one or more phrase fragments.

At decision block 2406, in one or more of the various embodiments, if the match score exceeds a threshold value, control may flow to block 2408; otherwise, control may flow to decision block 2412.

At block 2408, in one or more of the various embodiments, the skill or feature may be included in the position profile.

At block 2410, in one or more of the various embodiments, optionally, one or more recommendation models may be updated based on the determined skills or features. In some embodiments, the unified facts derived or extracted from natural language phrase fragments may be relevant to the configuration or arranged of one or more recommendation models. For example, in some embodiments, a recommendation model may include a cost function that de-ranks matches based on the absence of one or more soft skills, or the like. Accordingly, in this example, recommendation models that depend on skill or features included or derived from job description information may be updated if those values change.

In some embodiments, one or more recommendation models may be arranged to pull values from a unified fact database as they are executed. Accordingly, in some embodiments, recommendation models may automatically react to changes to unified facts (background facts, or otherwise) that they may be arranged to rely on.

Note, this block may be optional because, in some embodiments, some or all of the unified facts extracted or derived there from the phrase fragments may be unrelated to recommendation models such that recommendation models, or the like, do not require updating.

At decision block 2412, in one or more of the various embodiments, if the translation engine may be finished processing the job description information, control may be returned to a calling process; otherwise, control may loop back to block 2404.

Next, in one or more of the various embodiments, control may be returned to a calling process.

Figure 25:
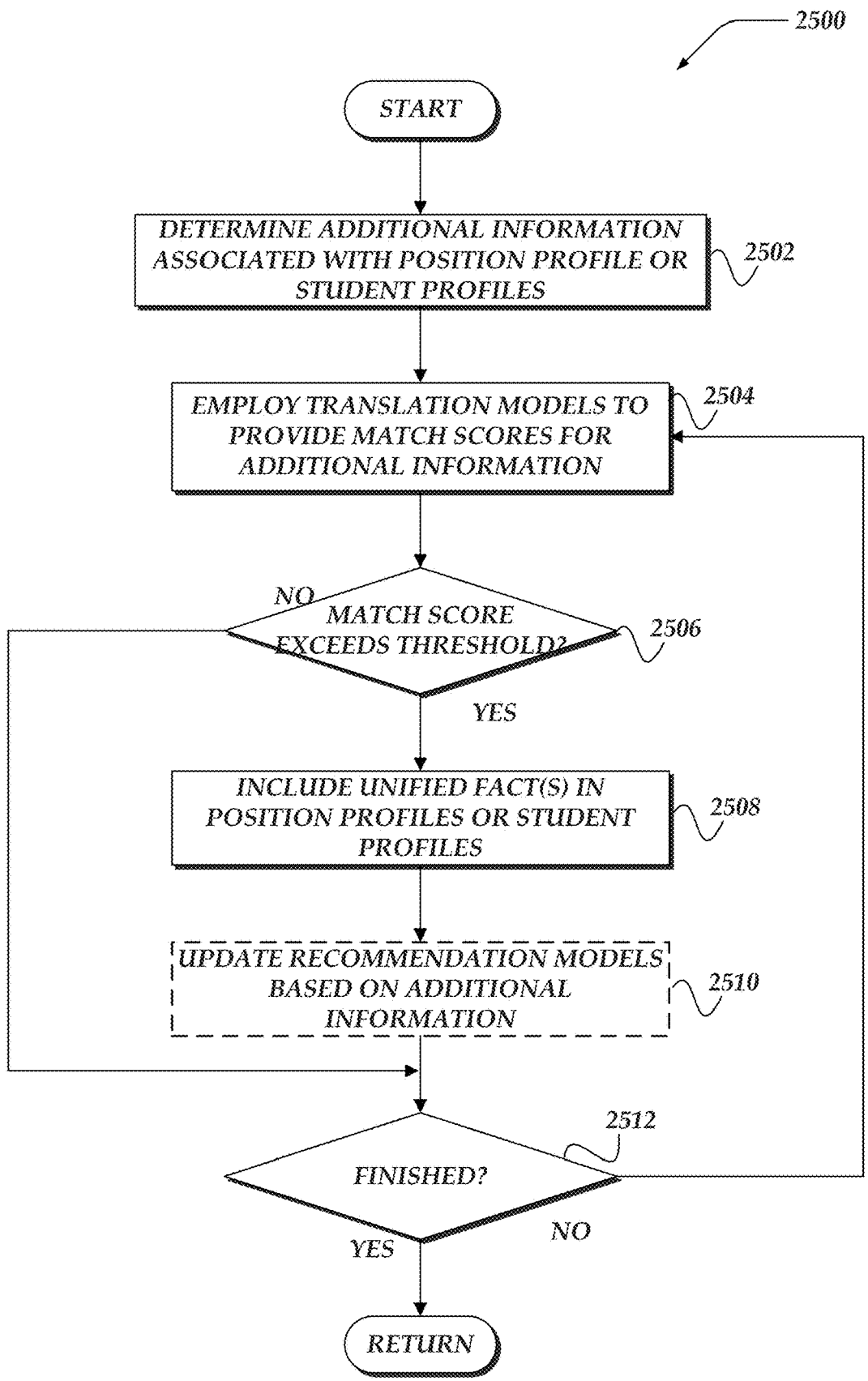
FIG. 25 illustrates a flowchart for a process for enhancing position profiles based on additional information for correlating education programs and employment objectives in accordance with one or more of the various embodiments.

FIG. 25 illustrates a flowchart for process 2500 for enhancing position profiles based on additional information for correlating education programs and employment objectives in accordance with one or more of the various embodiments. After a start block, at block 2502, in one or more of the various embodiments, an ingestion engine, or the like, may be arranged to provide additional information associated with a position to a translation engine. In one or more of the various embodiments, additional information may include information provided from various sources in addition job description information or student information.

In some embodiments, additional information may include information provided by national or local governmental institutions or agencies (e.g., US Department of Labor, Washington State Office of Superintendent of Public Instruction, or the like) related to careers, employment, education, or the like. Also, in some embodiments, additional information may be collected from one or more non-governmental organizations that may publish information related to careers, employment, education, or the like.

Further, in some embodiments, additional information may include information provided by educational institutions, national or local professional associations (e.g., American Medical Association, State Bar of California, or the like), other third party services, or the like. One of ordinary skill in the art will appreciate that other or additional sources of additional information may be available to translation engines or recommendation engines. Accordingly, in some embodiments, the particular sources of additional information may vary depending on local circumstances or local requirement. Thus, in some embodiments, ingestion engines, translation engines, recommendation engines, or the like, may employ configuration information to determine some or all of the sources of additional information.

At block 2504, in one or more of the various embodiments, the translation engine may be arranged to employ one or more translation models to provide match scores for the additional information. Similar to most data coming into the system via acquisition agents or ingestion engines, additional information may be categorized and then evaluated by one or more translation models to identify unified facts that may be included in the additional information.

At decision block 2506, in one or more of the various embodiments, if match scores exceed their associated threshold score values, control may flow to block 2510; otherwise, control may flow to decision block 2510. As described above, translation models may be arranged to produce match results that may be associated with a translation score that may be considered a confidence or quality score associated with the match. In some embodiments, match scores may be a combination of a score generated by a translation model and the translation model reputation score.

At block 2508, in one or more of the various embodiments, the translation engine may be arranged to include one or more unified facts associated with the additional information in one or more student profiles or one or more position profiles. In one or more of the various embodiments, as described above, translation models may provide unified facts that may be included in one or more position profiles or student profiles. Accordingly, in some embodiments, translation engines may be arranged to determine one or more profiles that may include the particular unified facts extracted from the additional information. For example, in some embodiments, if a position profile includes a field for average compensation, its value may be based on additional information provided by a government labor agency.

In one or more of the various embodiments, some unified facts derived or extracted from additional information may be 'background' facts that may not be associated with a particular position profile or student profile. For example, in some embodiments, background facts may be unified facts that may be associated with aggregate values, such as, average compensation, open positions, or the like. Thus, in some embodiments, some unified facts (e.g., background facts) may be collected for general use rather than being associated with specific profiles or models.

At block 2510, in one or more of the various embodiments, optionally, one or more recommendation models may be updated based on the additional information. In some embodiments, the unified facts derived or extracted from additional information may be relevant to the configuration or arrangement of one or more recommendation models. For example, in some embodiments, a recommendation model may include a filtering function that excludes or de-ranks positions based on average salary, or the like. Accordingly, in this example, recommendation models that depend on average salary may be updated if the value changes.

In some embodiments, one or more recommendation models may be arranged to pull values from a unified fact database as they are executed. Accordingly, in some embodiments, recommendation models may automatically react to changes in unified facts (background facts, or otherwise) that they may be rely on.

Note, this block may be optional because, in some embodiments, some or all additional information or the unified facts extracted or derived therefrom may be unrelated to recommendation models such that recommendation models, or the like, do not require updating.

At decision block 2512, in one or more of the various embodiments, if the translation engine may be finished processing additional information, control be returned to a calling process; otherwise, control may loop back block 2504.

Figure 26:
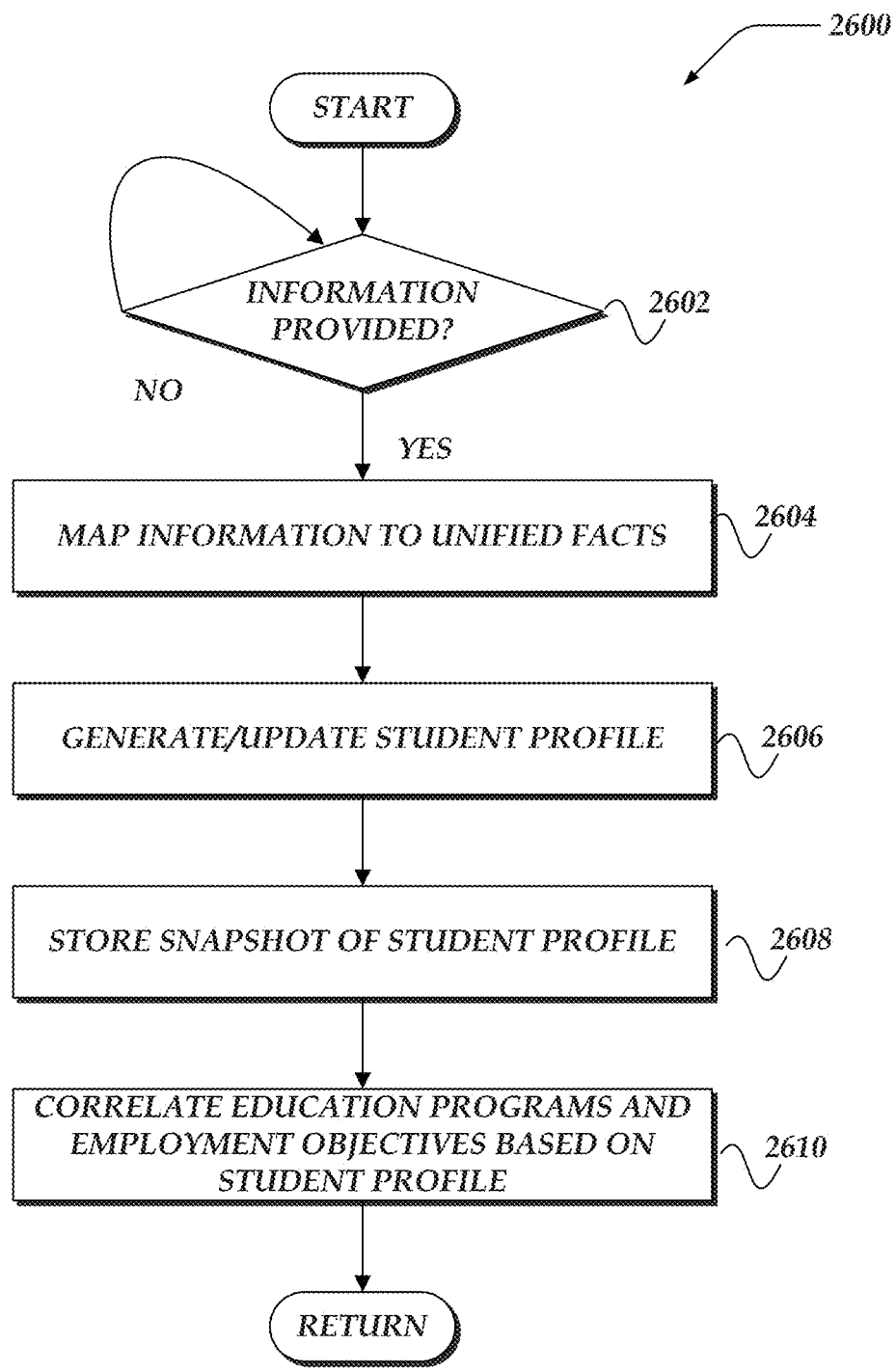
FIG. 26 illustrates a flowchart for a process for continuous updating of profiles as new information is discovered for correlating education programs and employment objectives in accordance with one or more of the various embodiments.

FIG. 26 illustrates a flowchart for process 2600 for continuous updating of profiles as new information is discovered for correlating education programs and employment objectives in accordance with one or more of the various embodiments. After a start block, at decision block 2602, in one or more of the various embodiments, if new information may be provided via an ingestion engine or other sources (e.g., student feedback, employer feedback, or the like), control may flow to block 2604; otherwise, control may loop back to decision block 2602.

At block 2604, in one or more of the various embodiments, translation engines may be arranged to consume the new information to map it to unified facts, such as, position attributes/skills, student attributes, or the like. As described above, translation engines may be arranged to employ one or more translation models to translate ingested raw data into one or more unified facts.

At block 2606, in one or more of the various embodiments, translation engines may be arranged to generate or update one or more student profiles based on the new information. For example, in some embodiments, student profiles may be automatically updated as students completing course, perform internships, or the like.

At block 2608, in one or more of the various embodiments, translation engines may be arranged to store a snapshot of the update student profiles. In one or more of the various embodiments, translation engines may be arranged to generate a snapshot of a profile each time it changes. Accordingly, in one or more of the various embodiments, translation engines may be arranged to capture a historical record that reflects that path a student may take to reach an outcome. Thus, in some embodiments, paths for different students may be analyzed or evaluated to discover differences in outcomes, or the like.

At block 2610, in one or more of the various embodiments, translation engines may be arranged to correlate education programs and employment objectives based on the updated profiles. As described above, the updated student profiles may be employed for correlating education programs and employment objectives.

Note, in one or more of the various embodiments, process 2600, or similar processes, may be employed with respect to other profiles, such as, position profiles, employer profiles, or the like. For brevity and clarity, detailed descriptions for the different types of profiles is omitted.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of managing data correlation over a network, using one or more network computers to execute the method by performing actions, comprising: an ingestion engine that performs actions, including: providing student information based on educational activity of one or more students, wherein one or more portions of the student information is associated with one or more education institutions; providing position information based on one or more potential employers, wherein the position information includes a description of one or more positions associated with the one or more employers; and employing one or more global positioning system (GPS) devices or geolocation protocol to provide geolocation information regarding the student information and the position information; and a translation engine that performs actions, including: generating one or more student profiles based on two or more translation models and the student information, wherein the student information is translated into one or more unified facts, wherein each of the one or more unified facts corresponds to two or more values that are differently weighted and included in the one or more student profiles; and generating one or more position profiles based on the two or more translation models and the position information, wherein the position information is translated into one or more other unified facts that are included in the one or more position profiles; and a recommendation engine that perform actions, including: correlating the one or more student profiles with the one or more position profiles based on one or more recommendation models, the one or more unified facts, and the one or more other unified facts, wherein each pair of a student profile that correlates with a position profile is associated with a score based on a strength of the correlation between the pair, and wherein each application that employs the one or more unified facts employs the different weights to determine which of the two or more unified fact values are employed to provide a recommendation;

in response to additional position information related to one or more of a career, employment or education being provided by one or more of an institution or an agency, categorizing the additional position information to identify each other unified fact that is included in the additional position information, wherein the two or more translation models are employed to generate one or more match scores for the additional position information and the unified facts, wherein the additional position information corresponding to each match score that exceeds a threshold is used to extract each particular other unified fact from the additional position information and is used to update the one more position profiles and is also used to update the one or more recommendation models, and wherein the one or more student profiles and the one or more updated position profiles are re-correlated based on the one or more updated recommendation models;

employing the geolocation information to select one or more features, including a time zone, spoken language, currency or calendar format, wherein the one or more features are used in one or more of a user interface, a report, an internal process, or a database; and providing one or more reports that use the one or more selected features for display to a user, wherein the one or more reports include each pair of the student profile correlated with the position profile, wherein a plurality of pairs is ordered based on the score associated with each pair.

2. The method of claim 1, wherein providing the student information, further comprises, providing one or more of one or more student transcripts, one or more student resumes, or feedback from the one or more students.

3. The method of claim 1, further comprising:
providing additional student information associated with the one or more students;
updating the one or more student profiles based on the additional student information; and
correlating the one or more updated student profiles and the one or more position profiles based on one or more recommendation models.

4. The method of claim 1, further comprising:
generating a snapshot of the one or more student profiles, wherein the snapshot is stored in a data store;
monitoring the one or more student profiles;
determining one or more updated student profiles based on the monitoring; and
generating another snapshot based on the one or more updated student profiles.

5. The method of claim 1, wherein providing the position information, further comprises, providing employment information that includes projected growth of a type of position associated with the one or more positions, wherein the employment information is provided by one or more of public sources, or non-public sources.

6. The method of claim 1, wherein generating the one or more position profiles, further comprises, generating a portion of the one or more other unified facts based on one or more natural language phrase fragments included in the position information, wherein the portion of the one or more other unified facts are associated with skills associated with the one or more positions.

7. A system for managing data correlation, comprising: a network computer, comprising: a transceiver that communicates over the network; a memory that stores at least instructions; and one or more processors that execute instructions that perform actions, including: instantiating an ingestion engine that performs actions, including: providing student information based on educational activity of one or more students, wherein one or more portions of the student information is associated with one or more education institutions; providing position information based on one or more potential employers, wherein the position information includes a description of one or more positions associated with the one or more employers; and employing one or more global positioning system (GPS) devices or geolocation protocol to provide geolocation information regarding the student information and the position information; and instantiating a translation engine that performs actions, including: generating one or more student profiles based on two or more translation models and the student information, wherein the student information is translated into one or more unified facts, wherein each of the one or more unified facts corresponds to two or more values that are differently weighted and included in the one or more student profiles; and generating one or more position profiles based on the two or more translation models and the position information, wherein the position information is translated into one or more other unified facts that are included in the one or more position profiles; and instantiating a recommendation engine that perform actions, including: correlating the one or more student profiles with the one or more position profiles based on one or more recommendation models, the one or more unified facts, and the one or more other unified facts, wherein each pair of a student profile that correlates with a position profile is associated with a score based on a strength of the correlation between the pair, and wherein each application that employs the one or more unified facts employs the different weights to determine which of the two or more unified fact values are employed to provide a recommendation;

in response to additional position information related to one or more of a career, employment or education being provided by one or more of an institution or an agency, categorizing the additional position information to identify each other unified fact that is included in the additional position information, wherein the two or more translation models are employed to generate one or more match scores for the additional position information and the unified facts, wherein the additional position information corresponding to each match score that exceeds a threshold is used to extract each particular other unified fact from the additional position information and is used to update the one more position profiles and is also used to update the one or more recommendation models, and wherein the one or more student profiles and the one or more updated position profiles are re-correlated based on the one or more updated recommendation models;

employing the geolocation information to select one or more features, including a time zone, spoken language, currency or calendar format, wherein the one or more features are used in one or more of a user interface, a report, an internal process, or a database; and providing one or more reports that use the one or more selected features for display to a user, wherein the one or more reports include each pair of the student profile correlated with the position profile, wherein a plurality of pairs is ordered based on the score associated with each pair; and a client computer, comprising: a transceiver that communicates over the network; a memory that stores at least instructions; and one or more processors that execute instructions that perform actions, including: displaying one or more of the one or more reports on a hardware display.

8. The system of claim 7, wherein providing the student information, further comprises, providing one or more of one or more student transcripts, one or more student resumes, or feedback from the one or more students.

9. The system of claim 7, wherein the one or more network computer processors execute instructions that perform actions, further comprising:
   providing additional student information associated with the one or more students;
   updating the one or more student profiles based on the additional student information; and
   correlating the one or more updated student profiles and the one or more position profiles based on one or more recommendation models.

10. The system of claim 7, wherein the one or more network computer processors execute instructions that perform actions, further comprising:
    generating a snapshot of the one or more student profiles, wherein the snapshot is stored in a data store;
    monitoring the one or more student profiles;
    determining one or more updated student profiles based on the monitoring; and
    generating another snapshot based on the one or more updated student profiles.

11. The system of claim 7, wherein providing the position information, further comprises, providing employment information that includes projected growth of a type of position associated with the one or more positions, wherein the employment information is provided by one or more of public sources, or non-public sources.

12. The system of claim 7, wherein generating the one or more position profiles, further comprises, generating a portion of the one or more other unified facts based on one or more natural language phrase fragments included in the position information, wherein the portion of the one or more other unified facts are associated with skills associated with the one or more positions.

13. A processor readable non-transitory storage media that includes instructions for managing data correlation over a network, wherein execution of the instructions by one or more processors performs actions, comprising: providing an ingestion engine that performs actions, including: providing student information based on educational activity of one or more students, wherein one or more portions of the student information is associated with one or more education institutions; providing position information based on one or more potential employers, wherein the position information includes a description of one or more positions associated with the one or more employers; and employing one or more global positioning system (GPS) devices or geolocation protocol to provide geolocation information regarding the student information and the position information; and providing a translation engine that performs actions, including: generating one or more student profiles based on two or more translation models and the student information, wherein the student information is translated into one or more unified facts, wherein each of the one or more unified facts corresponds to two or more values that are differently weighted and included in the one or more student profiles; and generating one or more position profiles based on the two or more translation models and the position information, wherein the position information is translated into one or more other unified facts that are included in the one or more position profiles; and providing a recommendation engine that perform actions, including: correlating the one or more student profiles with the one or more position profiles based on one or more recommendation models, the one or more unified facts, and the one or more other unified facts, wherein each pair of a student profile that correlates with a position profile is associated with a score based on a strength of the correlation between the pair, and wherein each application that employs the one or more unified facts employs the different weights to determine which of the two or more unified fact values are employed to provide a recommendation;

in response to additional position information related to one or more of a career, employment or education being provided by one or more of an institution or an agency, categorizing the additional position information to identify each other unified fact that is included in the additional position information, wherein the two or more translation models are employed to generate one or more match scores for the additional position information and the unified facts, wherein the additional position information corresponding to each match score that exceeds a threshold is used to extract each particular other unified fact from the additional position information and is used to update the one more position profiles and is also used to update the one or more recommendation models, and wherein the one or more student profiles and the one or more updated position profiles are re-correlated based on the one or more updated recommendation models;

employing the geolocation information to select one or more features, including a time zone, spoken language, currency or calendar format, wherein the one or more features are used in one or more of a user interface, a report, an internal process, or a database; and providing one or more reports that use the one or more selected features for display to a user, wherein the one or more reports include each pair of the student profile correlated with the position profile, wherein a plurality of pairs is ordered based on the score associated with each pair.

14. The media of claim 13, wherein providing the student information, further comprises, providing one or more of one or more student transcripts, one or more student resumes, or feedback from the one or more students.

15. The media of claim 13, further comprising:
providing additional student information associated with the one or more students;
updating the one or more student profiles based on the additional student information; and
correlating the one or more updated student profiles and the one or more position profiles based on one or more recommendation models.

16. The media of claim 13, further comprising:
generating a snapshot of the one or more student profiles, wherein the snapshot is stored in a data store;
monitoring the one or more student profiles;
determining one or more updated student profiles based on the monitoring; and
generating another snapshot based on the one or more updated student profiles.

17. The media of claim 13, wherein providing the position information, further comprises, providing employment information that includes projected growth of a type of position associated with the one or more positions, wherein the employment information is provided by one or more of public sources, or non-public sources.

18. The media of claim 13, wherein generating the one or more position profiles, further comprises, generating a portion of the one or more other unified facts based on one or more natural language phrase fragments included in the position information, wherein the portion of the one or more other unified facts are associated with skills associated with the one or more positions.

19. A network computer for managing data correlation over a network, comprising: a transceiver that communicates over the network; a memory that stores at least instructions; and one or more processors that execute instructions that perform actions, including: instantiating an ingestion engine that performs actions, including: providing student information based on educational activity of one or more students, wherein one or more portions of the student information is associated with one or more education institutions; providing position information based on one or more potential employers, wherein the position information includes a description of one or more positions associated with the one or more employers; and employing one or more global positioning system (GPS) devices or geolocation protocol to provide geolocation information regarding the student information and the position information; and instantiating a translation engine that performs actions, including: generating one or more student profiles based on two or more translation models and the student information, wherein the student information is translated into one or more unified facts, wherein each of the one or more unified facts corresponds to two or more values that are differently weighted and included in the one or more student profiles; and generating one or more position profiles based on the two or more translation models and the position information, wherein the position information is translated into one or more other unified facts that are included in the one or more position profiles; and instantiating a recommendation engine that perform actions, including: correlating the one or more student profiles with the one or more position profiles based on one or more recommendation models, the one or more unified facts, and the one or more other unified facts, wherein each pair of a student profile that correlates with a position profile is associated with a score based on a strength of the correlation between the pair, and wherein each application that employs the one or more unified facts employs the different weights to determine which of the two or more unified fact values are employed to provide a recommendation;

in response to additional position information related to one or more of a career, employment or education being provided by one or more of an institution or an agency, categorizing the additional position information to identify each other unified fact that is included in the additional position information, wherein the two or more translation models are employed to generate one or more match scores for the additional position information and the unified facts, wherein the additional position information corresponding to each match score that exceeds a threshold is used to extract each particular other unified fact from the additional position information and is used to update the one more position profiles and is also used to update the one or more recommendation models, and wherein the one or more student profiles and the one or more updated position profiles are re-correlated based on the one or more updated recommendation models; and employing the geolocation information to select one or more features, including a time zone, spoken language, currency or calendar format, wherein the one or more features are used in one or more of a user interface, a report, an internal process, or a database; and providing one or more reports that use the one or more selected features for display to a user, wherein the one or more reports include each pair of the student profile correlated with the position profile, wherein a plurality of pairs is ordered based on the score associated with each pair.

20. The network computer of claim 19, wherein providing the student information, further comprises, providing one or more of one or more student transcripts, one or more student resumes, or feedback from the one or more students.

21. The network computer of claim 19, wherein the one or more processors execute instructions that perform actions, further comprising:
providing additional student information associated with the one or more students;
updating the one or more student profiles based on the additional student information; and
correlating the one or more updated student profiles and the one or more position profiles based on one or more recommendation models.

22. The network computer of claim 19, wherein the one or more processors execute instructions that perform actions, further comprising:
generating a snapshot of the one or more student profiles, wherein the snapshot is stored in a data store;
monitoring the one or more student profiles;
determining one or more updated student profiles based on the monitoring; and
generating another snapshot based on the one or more updated student profiles.

23. The network computer of claim 19, wherein providing the position information, further comprises, providing employment information that includes projected growth of a type of position associated with the one or more positions, wherein the employment information is provided by one or more of public sources, or non-public sources.

24. The network computer of claim 19, wherein generating the one or more position profiles, further comprises, generating a portion of the one or more other unified facts based on one or more natural language phrase fragments included in the position information, wherein the portion of the one or more other unified facts are associated with skills associated with the one or more positions.

* * * * *